(12) United States Patent
Kokko et al.

(10) Patent No.: US 8,404,348 B2
(45) Date of Patent: *Mar. 26, 2013

(54) RESILIENT, WATER DISPERSIBLE POLYURETHANE FOAMS AND PRODUCTS INCORPORATING SAME

(75) Inventors: Bruce J. Kokko, Neenah, WI (US); Lynn M. Daul, Appleton, WI (US); Dinesh M. Bhat, Neenah, WI (US); Joseph H. Miller, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,318

(22) Filed: Mar. 15, 2012

(65) Prior Publication Data

US 2012/0219780 A1 Aug. 30, 2012

Related U.S. Application Data

(62) Division of application No. 12/210,500, filed on Sep. 15, 2008, now Pat. No. 8,173,718.

(60) Provisional application No. 60/994,234, filed on Sep. 18, 2007.

(51) Int. Cl.
*B32B 27/40* (2006.01)

(52) U.S. Cl. .......... 428/425.1; 428/174; 428/318.4; 521/109.1; 521/163; 521/164; 521/167; 521/170; 521/174; 264/45.1

(58) Field of Classification Search ............... 521/109.1, 521/163, 164, 167, 170, 174; 428/174, 318.4, 428/425.1; 264/45.1
See application file for complete search history.

(56) References Cited

U.S. PATENT DOCUMENTS

| | | | |
|---|---|---|---|
| 3,004,934 A | 10/1961 | Dosmann et al. | |
| 3,137,592 A | 6/1964 | Protzman et al. | |
| 3,165,508 A | 1/1965 | Otey et al. | |
| 3,402,170 A | 9/1968 | Fuzesi et al. | |
| 3,405,080 A | 10/1968 | Otey et al. | |
| 3,739,965 A | 6/1973 | Jespersen et al. | |
| 4,506,039 A | 3/1985 | Balle et al. | |
| 4,520,139 A | 5/1985 | Kennedy | |
| 4,863,655 A | 9/1989 | Lacourse et al. | |
| 5,219,092 A | 6/1993 | Morand | |
| 5,506,277 A | 4/1996 | Griesbach, III | |
| 5,616,628 A | 4/1997 | von Bonin et al. | |
| 5,874,485 A | 2/1999 | Milliren et al. | |
| 6,334,931 B1 | 1/2002 | Dwiggins et al. | |
| 6,608,118 B2 | 8/2003 | Kosaka et al. | |
| 6,684,751 B2 | 2/2004 | Kapiloff et al. | |
| 6,685,050 B2 | 2/2004 | Schmidt et al. | |
| 8,173,718 B2 * | 5/2012 | Kokko et al. | 521/167 |
| 2004/0018615 A1 | 1/2004 | Garyantes | |
| 2004/0048759 A1 | 3/2004 | Ribble et al. | |
| 2005/0049358 A1 * | 3/2005 | Dai et al. | 524/589 |

FOREIGN PATENT DOCUMENTS

| | | |
|---|---|---|
| EP | 1162222 A2 | 12/2001 |
| GB | 1245691 | 9/1971 |
| WO | 2007033598 A1 | 3/2007 |

OTHER PUBLICATIONS

Response to Rule 312 Communication for U.S. Appl. No. 12/210,500, filed Sep. 15, 2008; First Named Inventor: Bruce J. Kokko; Mail Date: Mar. 1, 2012.
Chaffanjon, et al., "Use of Real-time FTIR to Characterize Kinetics of Amine Catalysts and to Develop New Grades for Various Polyurethane Applications, Including Low Emission Catalysts", Journal of Cellular Plastics, vol. 39, May 2003, pp. 187,201.
Kirk-Othmer Encyclopedia of Chemical Technology Fourth Edition, John Wiley & Sons, Inc., (1991), vol. 24: pp. Cover page, Content Page; pp. 703-711.
Kirk-Othmer Encyclopedia of Chemical Technology, Fourth Edition, John Wiley & Sons, Inc., (1991), vol. 23, pp. cover, content and pp. 582-606.
Kirk-Othmer Encyclopedia of Chemical Technology, Fourth Edition, John Wiley & Sons, Inc., (1991), vol. 11: pp. cover, content; pp. 730-783.
Kwon et al., "Characterization of Polyurethane Foam Prepared by Using Starch as Polyol", Journal of Applied Polymer Science, (2007): 103, pp. 1544-1553.
Office Action—Non-Final for U.S. Appl. No. 12/210,500, filed Sep. 15, 2008; First Named Inventor: Bruce J. Kokko; Mailing Date: Jun. 16, 2011.
Notice of Allowance for U.S. Appl. No. 12/210,500, filed Sep. 15, 2008; First Named Inventor: Bruce J. Kokko; Mail Date: Jan. 17, 2012.

* cited by examiner

*Primary Examiner* — John Cooney
(74) *Attorney, Agent, or Firm* — Laura L. Bozek

(57) ABSTRACT

A soft and resilient, cold-water dispersible polyurethane foam suitable for disposable personal care products is produced by the combination of corn syrup, glycerin, polyether diamine, PEG, a diisocyanate, water and a catalyst. The formulation and reaction conditions for forming the inventive foam are judiciously selected and carefully controlled to achieve water dispersibility and the desired mechanical properties. The characteristic resiliency, or percent rebound for the foams was generally over 75% and the foams are readily produced as soft foams, exhibiting a relative compression value of from 20% to 150% of that of a commercial polyurethane foam cosmetic pad which is not water dispersible. The foam may be incorporated into webs or stackable products or nestable three-dimensional products.

32 Claims, 14 Drawing Sheets

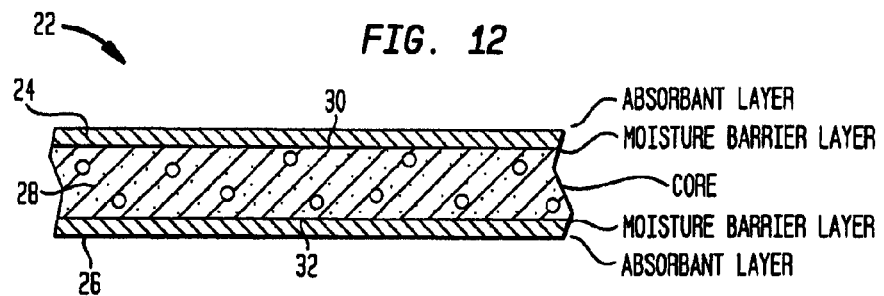
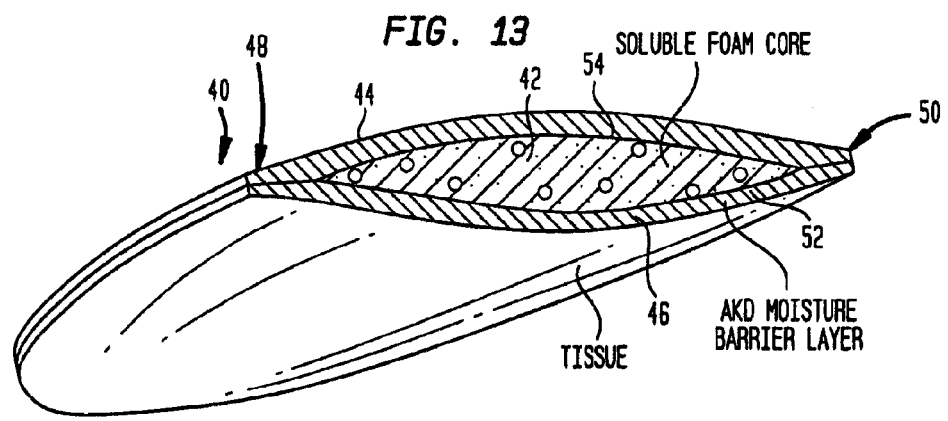

US 8,404,348 B2

RESILIENT, WATER DISPERSIBLE POLYURETHANE FOAMS AND PRODUCTS INCORPORATING SAME

CLAIM FOR PRIORITY

This application is a divisional of U.S. patent application Ser. No. 12/210,500 filed Sep. 15, 2008, now issued as U.S. Pat. No. 8,173,718, which claims benefit of U.S. Provisional Patent Application Ser. No. 60/994,234, entitled "Resilient, Water Dispersible Polyurethane Foams", filed Sep. 18, 2007, both of which are incorporated herein by reference in their respective entireties.

TECHNICAL FIELD

This invention relates generally to cold-water dispersible polyurethane foams and products incorporating them. There is provided, in one embodiment suitable for personal care products, a soft cold-water dispersible polyurethane foam which exhibits a relative compression value of 20% to 150% and a characteristic resilience greater than 75%. Products suitable for pads and packaging may exhibit more stiffness, such as a 50% compression force of from 0.1 kg/cm$^2$ up to 1 kg/cm$^2$ or so.

BACKGROUND

Demand for biodegradability and water dispersibility in disposable products is increasing rapidly with growing concern for the environment along with increasing consumer preference for products which are "flushable" so that they are convenient to dispose of and will not clog plumbing or foul septic equipment.

While low density polyurethane foams are known, these products are generally not water dispersible or soluble. Recent attempts have been made to produce soft and resilient polyurethane foams which are at least biodegradable so that they are more environmentally acceptable. For example, biodegradable starch based polyurethane foams are described by Kwon et al; however, these foams are clearly not water dispersible—as apparent from the reported absorbency results see Kwon, O-J.; Yang, S-R.; Kim, D-H.; Park, J-S. J. Appl. Polym. Sci. (2007), 103, 1544.

Conventional polyurethane foams used in cosmetic pads and other consumer products are typically neither water soluble nor biodegradable.

Foams made from starch and other water-soluble polymers, such as polyethylene glycols and polyvinyl alcohols and the like are sometimes reported to be water dispersible; however, these products do not generally have mechanical properties (softness and resilience) suitable for personal care products or sufficient resilience to be used as a substitute for conventional soft and resilient polyurethane foams used to package fragile electronic products. See Li, X. 2007033598/WO-A1 (Mar. 29, 2007). Moreover, starch based compositions tend to require high levels of plasticizers and the like for softness, are difficult to foam and so forth. See, Griesbach, U.S. Pat. No. 5,506,277 (Apr. 9, 1996). Further information concerning foams generally with or without starch is found in the following U.S. Pat. Nos. 3,004,934 to Dosmann et al.; 3,137,592 to Protzman et al.; 3,165,508 to Otey et al.; 3,402,170 to Fuzesi et al.; 3,405,080 to Otey et al.; 4,863,655 to Lacourse et al; and 6,608,118 to Kosaka et al. as well as Ribble et. al., U.S. Patent Application Publication No. US2004/0048759 wherein a water dispersible foam cleansing bar is described.

It should be noted that starch foams generally, while soft in that they compress easily, also have a stiff hand when flattened out, which makes them ill-suited for foam applications where a soft, supple, resilient flexible hand is desirable such as in cosmetic pads and tissue-like products used for personal cleaning where stiffness of the product is particularly disliked by consumers.

This invention provides foams which are readily cold-water dispersible and have mechanical properties, that is, softness and resilience, suitable for disposable personal care products.

SUMMARY OF INVENTION

The invention is directed generally to cold-water dispersible foams which are made from a mixture of: a polyether diamine; a suitable diisocyanate composition; a mixed saccharide composition, a polyoxyalkylene glycol composition and a polymerizing/foaming catalyst composition. These foams exhibit, in addition to cold-water dispersibility, softness and resilience suitable for personal care products such as cosmetic pads or personal hygiene products, wound dressings and so forth. Moreover, the foam of the invention can be incorporated into composites with tissue, for example, to produce premium personal care composite products as a substitute for conventional facial and bath tissue.

Further features and advantages of the invention will become apparent from the following description.

BRIEF DESCRIPTION OF DRAWINGS

The invention is described in detail below with reference to the various Figures wherein:

In FIG. 1 water dispersibility is rated 1 for good dispersibility, 0 for fair dispersibility and −1 for poor dispersibility and is plotted versus the mole ratio of polyetherdiamine/diiosocyanate. Run numbers are from Table 3 below;

FIG. 2 shows IR spectra of products of polyurethane reactions, Run No. BK-1194-1 with stannous octoate catalyst @60° C. (top); Run No. BK-1194-3 with stannous octoate/triethyleneamine catalyst package @25° C. (middle); and Run No. BK-1195 3 (inventive foam) with stannous octoate/triethyleneamine catalyst package @60° C. (bottom). FIG. 3 shows IR spectra of products of polyurethane reactions, Run No. BK-1201-5 and Run No. BK-1201-6 with triethylenediamine catalyst @25° C. and @60° C., respectively; and FIG. 4 shows IR spectra of inventive foam, Run No. BK-1159-1, made using DBTDL catalyst;

FIGS. 5(a) and 5(b) show compression curves for invention foams Run No. BK-1159-1 and Run No. BK-1155-2, respectively, while FIG. 5(c) shows a compression curve for a control foam;

FIG. 6 is a plot of Compressive Force Deflection (also referred to as CF-50%) versus dosage of PEG-400 and glycerin formulations containing water and HDI, where the levels of Karo-brand light corn syrup and Jeffamine ED-900 had been fixed at 4.3 g, 12 g respectively and the amount of catalyst was varied so that it was maintained at 1.9-2.0 wt. % of the total weight of the glycerin, PEG-400, ED-900 and corn syrup; FIG. 7 is a plot of Hysteresis value versus dosage of PEG-400 and glycerin in formulations containing water and HDI, also where the levels of Karo-brand light corn syrup and Jeffamine ED-900 had been fixed at 4.3 g, 12 g respectively and the amount of catalyst was varied so that it was maintained at 1.9-2.0 wt. % of the total weight of the glycerin, PEG-400, ED-900 and corn syrup; FIG. 8 is a plot of Rebound versus PEG molecular weight in fixed foam formulations; FIG. 9 is a plot of Hysteresis value versus PEG molecular weight in fixed foam formulations; and FIG. 10 is a plot of CF-50% versus PEG molecular weight in fixed foam formulations.

FIG. 12 is a schematic diagram of a cross-sectional structure of another composite product incorporating a foam of the present invention;

FIGS. 13-17 are schematic diagrams of various 3-dimensional products of the invention. Note that the products of FIGS. 14A-14C; 15A, 15B; 16A, 16B; and FIG. 17 are nestable products which are readily stacked for distribution and use.

DETAILED DESCRIPTION

Figure 1:
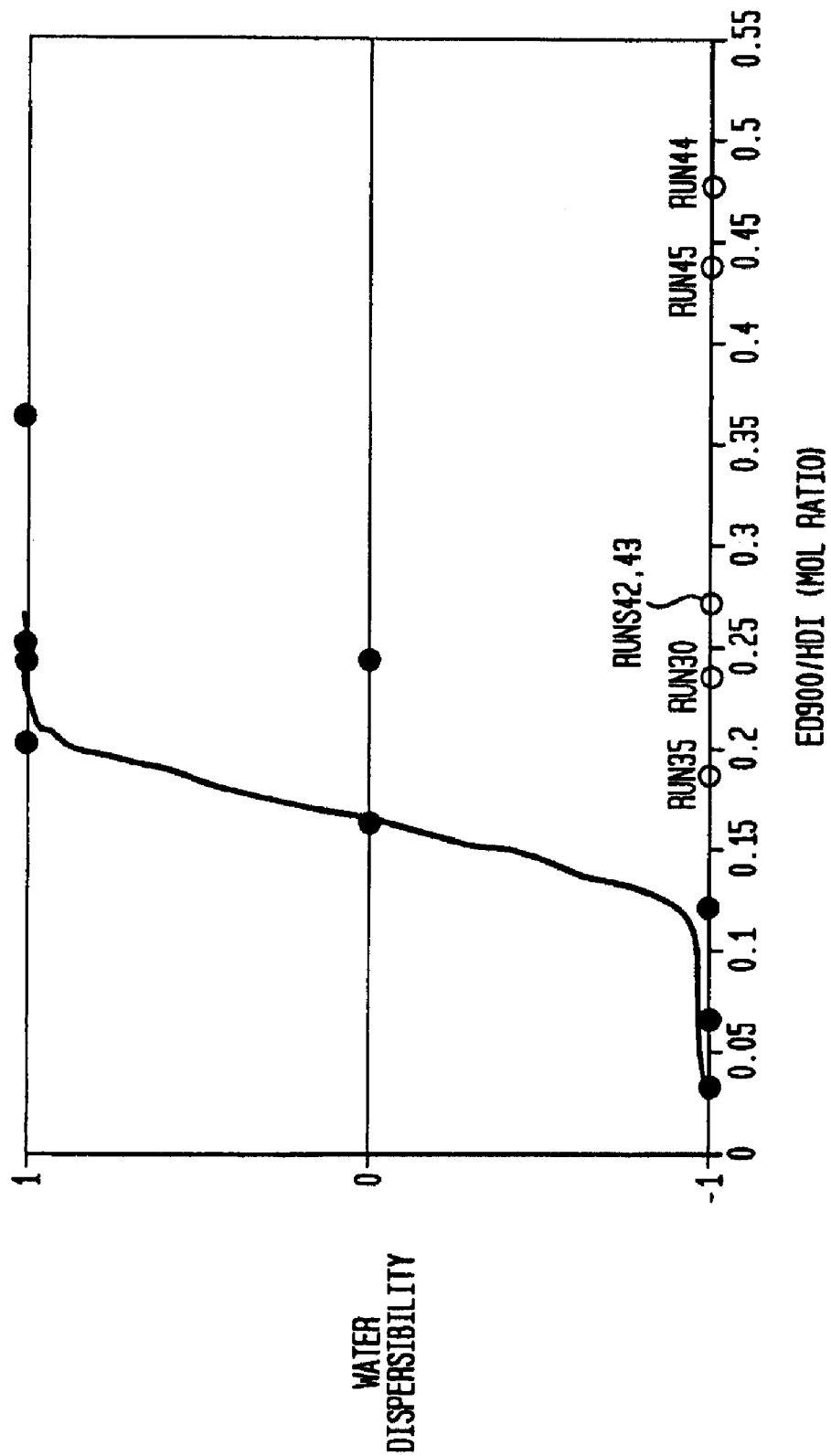
FIG. 1 is a plot of water dispersibility vs. mole ratio of polyetherdiamine/diisoscyanate.

The invention is described in detail below in connection with numerous examples, which description is for purposes of illustration only. Modifications within the spirit and scope of the present invention, set forth in the appended claims, will be readily apparent to those of skill in the art.

Exemplary soft and resilient water dispersible foams are obtained by the combination of corn syrup, glycerin, Jeffamine® polyether diamine, PEG, HDI, catalyst and water. To attain a readily water dispersible foam, the foam formulation preferably contains, 1) polyether diamine, dosed at a mole ratio to HDI of between approx. 0.17 and 0.50 in many embodiments; 2) HDI, such that, in terms of isocyanate groups, the dosage of HDI is set at about <70 eq. % of total equivalents anhydrous polyol alcohol and polyether diamine groups; 3) corn syrup, or an appropriate corn syrup surrogate; 4) a PEG composition; and 5) a suitable catalyst. Jeffamine® ED-900 polyether diamine, because of its balance of hydrophilicity, reactivity, and flexibility, is a preferred polyether diamine. HDI, because of its linear flexible architecture, which leads to absorbent flexible foams, is a preferred diisocyanate. The lower limit for HDI dosage will depend on the structure of the foam and level of strength tolerable for a given foam application.

A polyol ingredient comprised of a diverse combination of homo-, or hetero-monomeric, dimeric, and oligomeric highly water soluble molecules is an important feature in the formulation, and corn syrup is the preferred example of this ingredient. PEG 400, 600, or higher PEGs are preferred over PEG-200 for the inventive foam in order to maximize foam rebound and minimize hysteresis. Glycerin, while not essential to water dispersibility, is recommended for maximizing foam softness. Sufficient heat should be available during the entire course of the foam development process. The amount of water is best adjusted to optimize foam density and strength for a specific foam application. These features are discussed in detail in the description which follows.

As used herein, terminology is given its ordinary meaning as supplemented or explained in the following. Percent, % and so forth means weight percent unless indicated otherwise, as a mole percent or percent equivalent, for example.

"Consisting essentially of" excludes additional components which would alter the basic and novel characteristics of the invention claimed, which includes generally cold water dispersibility. This language also excludes ingredients which would preclude specific attributes appearing in a particular claim. This language does not exclude processing aids, fillers and the like which do not preclude basic and novel characteristics.

"% Equivalent" or % eq. refers to percentage of stoichiometric ratio. For purposes of calculating molar ratios and % eq., the following ingredients have the functionality (moles per gram) indicated in Table 1:

TABLE 1

| Functionality of Selected Components moles OH or NH2 per gram | | | | | | |
|---|---|---|---|---|---|---|
| Glycerol | Corn Syrup | PEG 400 | PEG 200 | ED-900 | ED-600 | ED-2003 |
| 0.0326 | 0.018 | 0.005 | 0.01 | 0.00202 | 0.0032 | 0.000975 |

A 50% eq. of diisocyanate to polyol alcohol and diamine means that 0.5 moles of isocyanate functionality is provided to the mixture per mole of total alcohol and amine functionality as will be appreciated from the examples provided below.

"Predominantly" and like terminology means more than 50%. Thus a "predominantly PEG backbone" refers to a backbone structure where the backbone repeat units are more than 50 mole % oxyethylene repeat units. "Predominantly hardwood fiber" means that more than 50 weight percent of the fiber present in the product is hardwood fiber and so forth.

"Sheet" refers to a structure having length and width much larger than its thickness. Sheet as that term is used herein may have a three dimensional contour, such as an arcuate or domed contour if so desired. An article is referred to as having a "three-dimensional" structure if it has a structure other than a generally planar structure. See FIGS. 13-17.

For convenience, the following abbreviations are sometimes used herein:
AOS—alpha-olefin sulfonate
DBTL—dibutyltindilaurate
DMSO—dimethyl sulfoxide
ED—polyether diamine
FTIR—Fourier transform infrared spectroscopy
HDI—hexamethylene diisocyanate
MDI—4,4' methylenebis(phenylisocyanate) ("MDI")
PEG—polyethylene glycol
PPG—polypropylene glycol
PU—polyurethane
PVOH—polyvinyl alcohol
rt—room temperature
TDI—toluene diisocyanate
Further abbreviations appear in the description below and in the notes to Tables 3 through 6.

Characteristic Resilience (Rebound)

Characteristic resilience or rebound, as percentage of original thickness, was determined by comparing the initial thickness with the thickness after the CF-50% test described immediately below. The specimen's initial thickness was determined at 0.001 kg/cm$^2$ and then compressed to 50% of that thickness for 1 min. whereupon the pressure on the specimen was released. The thickness was then immediately determined at 0.001 kg/cm$^2$ and the percent characteristic resilience or rebound was calculated. Qualitatively, if the compressed foam sprang back as one released the foam, resiliency was rated good. If the foam sprang back slowly to original dimensions after one released the foam, resiliency was rated fair. If the foam would not spring back after one released the foam, resiliency was rated poor.

CF-50%, Relative Compression Value and Hysteresis Value

Softness was gauged by measuring the force, in units kg/cm², required to compress a foam block (approx. 16-25 cm²×1-2 cm thickness) to 50% of its original thickness. This measurement is referred to here as the Compression Force-50%, sometimes the CF-50% value or simply the 50% compression force. All CF-50% s were normalized to 25 cm². The foam CF-50% s were compared with the measured CF-50% of a commercial PU cosmetic pad (Simply Basic® accessories-cosmetic rounds; 00012; marketed by Wal-Mart Stores, Inc.; Made in USA). Foams having CF-50% of less than about 0.076 kg/cm² were adjudged as soft foams in the various tables presented hereinafter. The CF-50% of the control foam is used to calculate a relative compression value, in percent, as follows:

(CF-50% of Specimen/0.076)×100%

The hysteresis value is taken as the percentage of initial force retained, before release, after compressing for one minute. That is, the specimen is compressed to 50% as described above and maintained at that compression. The percentage of the force at one minute relative to the initial force is the hysteresis value. A greater hysteresis value is indicative of less hysteresis in the sample.

Density

Specimen dimensions were measured to the nearest 0.5 mm. The volume was calculated and the specimen was weighed to the nearest 0.0001 g. Density is reported in units of g/cm³ unless otherwise specified.

Water Dispersibility and Absorbency

A foam specimen, approximately 2.5×2.0×0.8 cm was dropped onto the surface of about 250 mL cold tap water (5° C. to 15° C.) in a 500 mL jar. When the piece contacted the water surface a stop watch was started and the time required for the foam to fully absorb the water (i.e., when the white foam color disappeared) was determined and recorded as the absorbency time. The jar was then lidded, and shook firmly one time, and the foam was inspected. This process was repeated until the foam had broken into 2 or more pieces, and the total number of shakes was recorded as needed to disperse the foam. If the foam absorbed water quickly and broke apart easily with shaking, water dispersibility was rated good and was assigned a numeric value of 1. If the foam absorbed water slowly but broke apart easily, or absorbed water quickly, but broke apart reluctantly, water dispersibility was rated fair and was assigned a "0" value. If the foam didn't absorb water, or would not break apart, water dispersibility was rated poor and was assigned a value of −1. See FIG. 1. Some samples were irregularly shaped, so test results in those cases are approximate. A "cold water dispersible" rating means generally a 1 or 0 rating by the foregoing criteria where additionally the sample broke apart in less than 15 and preferably less than 5 shakes of the test jar.

Materials

It will become apparent from the discussion which follows that the judicious selection of components, reaction conditions and catalyst are important aspects of producing soft and resilient polyurethane foams.

Polyetherdiamines are utilized in connection with manufacture of the inventive foams. Suitable products are available from Huntsman Chemicals, sold as Jeffamine® diamines, for example, D series and ED series, which have the structure and properties noted.

JEFFAMINE® D Series

JEFFAMINE® D series products are amine terminated PPGs with the following representative structure:

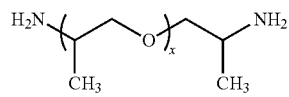

JEFFAMINE® ED Series

JEFFAMINE® ED series products are polyether diamines based on a predominantly PEG backbone. PEG imparts complete water solubility to each of the products in this series. The following JEFFAMINE® ED products have the following representative structure:

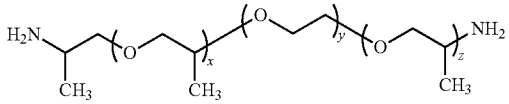

|  | y | x + z | MW* |
|---|---|---|---|
| HK-511 | ~2.0 | ~1.2 | 220 |
| ED-600 (XTJ-500) | ~9.0 | ~3.6 | 600 |
| ED-900 (XTJ-501) | ~12.5 | ~6.0 | 900 |
| ED-2003 (XTJ-502) | ~39 | ~6.0 | 2,000 |

Suitable diisocyanates include hexamethylene diisocyanate ("HDI"), toluene diisocyanate ("TDI"), 4,4' methylenebis (phenylisocyanate) ("MDI"), suitable mixtures of such isocyanates and so forth. Additional diisocyanates are listed in Kirk-Othmer, *Encyclopedia of Chemical Technology*, 4th edition, 1991, Vol. 24, pp. 703-708, the disclosure of which is incorporated herein by reference.

A preferred mixed saccharide composition is corn syrup which has sugars of varying molecular weight. Corn syrups are described in Kirk-Othmer, *Encyclopedia of Chemical Technology*, 4th edition, 1991, Vol. 23, pp. 582-606, the disclosure of which is incorporated herein by reference. Characteristics of corn syrups are noted in Table 2.

TABLE 2

Characteristics of Corn Syrups
Amount of constituent[a,] wt %

| Type | DE | DP-1 | DP-2 | DP-3 | DP-4+ |
|---|---|---|---|---|---|
| Acid-converted syrup | 30 | 9 | 10 | 12 | 69 |
|  | 36 | 14 | 12 | 10 | 64 |
|  | 42 | 19 | 14 | 12 | 55 |
|  | 55 | 31 | 18 | 13 | 48 |
| High maltose syrup | 42 | 6 | 44 | 13 | 37 |
|  | 48 | 9 | 52 | 15 | 24 |
|  | 50 | 3 | 75 | 13 | 9 |
| High conversion syrup | 64 | 37 | 31 | 11 | 21 |
|  | 70 | 43 | 30 | 7 | 20 |

[a]DP refers to degree of polymerization, where DP-1 is dextrose, DP-2 is a disaccharide, etc. DE = dextrose equivalent.

Instead of corn syrup, a suitable mixed saccharide composition can be prepared from different components. For example, a mixed saccharide composition is made from sorbitol, sucrose and starch as described hereinafter. In general, "mixed saccharide" compositions include saccharides of different molecular weight.

Polyoxyalkylene glycol compositions used to make the foams include polyethylene glycol (PEG), polypropylene glycol (PPG), PEG/PPG copolymers and mixtures thereof. PEG/PPG compositions may be used with PEG as the predominant glycol, if so desired.

Catalyst selection is important for achieving the desired balance of density, strength and dispersibility. Polymerizing/foaming catalysts include tin salts of organic acids, organometallic catalysts as well as amine catalysts such as (triethylene diamine) or other suitable tertiary amine catalysts. Triethylene diamine has the structure:

and is referred to as 1,4-diazabicyclo[2,2,2]octane. Catalysts may be employed in combination to provide the appropriate balance between blowing and gel reactions, discussed below.

Before turning to a more specific discussion of the examples and results, a brief discussion of polyurethane foam production provides context and leads to a better appreciation of this invention. Two key reactions are involved in the preparation of polyurethane foams: 1) a blowing reaction and 2) a gel reaction. The simplest and most common blowing agent is water. Water initiates blowing by reacting with the diisocyanate to generate carbon dioxide,

The resulting amines can then react with available isocyanates to generate poly-ureas, which are important structural components of the final foam:

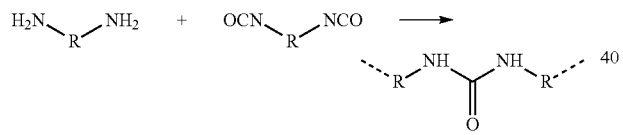

Gelation occurs as the polyol components react with the isocyanates to generate polyurethanes:

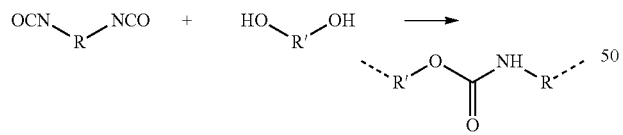

These polyurethanes are important buttressing elements for the walls of cells forming during the blowing reaction. Without sufficient buttressing the foam will either not rise, or ultimately collapse.

Suitable diisocyanates include MDI (methylene-bis-4-phenylisocyanate); TDI (2,4-toluene-diisocyanate or 2,6-toluene-diisocyanate or mixtures thereof); and HDI (1,6-hexanediisocyanate); which, as will be seen, have different reactivity.

The success or failure of foam formation depends on the delicate balancing of the rates of the blowing and gel reactions. Neither of these reactions will go efficiently without a catalyst. Catalysts tested included complexes of tin, titanium, or bismuth, and/or amines (e.g., triethylenediamine). Balance is achieved by the judicious choice of catalyst and catalyst level, temperature, water level, and compositional elements. The composition can also include, in addition to the diamine, polyol and diisocyanate such further ingredients as chain extenders (e.g., butane diol), plasticizers (e.g., glycerin), surfactants, and so forth.

Foam integrity can also be influenced by secondary cross-linking reactions. Branched polyols or other additives, such as triethanolamine, can be employed as cross-linkers. But cross-linking can occur, without adding cross-linkers, from the reaction of ureas and urethanes with isocyanates. Allophanates are formed by the reaction of a urethane with an isocyanate:

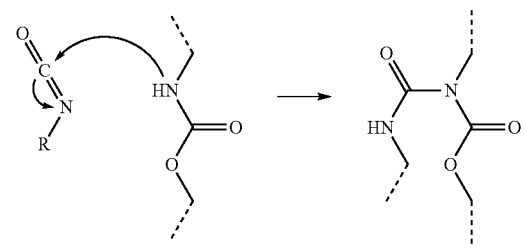

Biurets are formed by the reaction of a urea and an isocyanate:

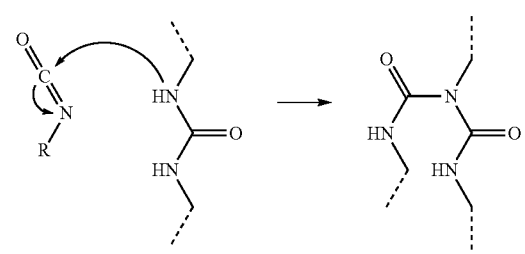

EXAMPLES

Cold-water dispersible, soft and resilient polyurethane foams were produced using the components and procedures discussed below and detailed in Tables 3 through 6 along with comparative examples and accompanying notes to the Tables. Further detailed information as to foam production is found in Kirk-Othmer, *Encyclopedia of Chemical Technology*, 4$^{th}$ edition, 1991, Vol. 11, pp. 730-783, the disclosure of which is incorporated herein by reference.

Polyurethane Foam Production with Corn Syrup (General Procedure)

The polyols, corn syrup (or variants of corn syrup), Jeffamine®, water, and, when applicable, surfactants, were combined and mixed at 620 rpm for 1-3 min (initial mixing). The dibutyltindilaurate catalyst was typically added after this initial mixing and mixed for an additional minute before adding the diisocyanate; the triethylenediamine, stannous octoate, or bismuth catalysts were added to polyol mixture prior to initial mixing; because of their hydrolytic instability, the titanium catalysts were added after initial mixing and mixed for 15-30 sec before adding the diisocyanate. The diisocyanate was added all at once with mixing, and mixing was continued until onset of creaming (typically 30 sec), and the foam was allowed to develop at a given temperature in either the original container, or after transferring the cream to a different container. The resultant foam was conditioned at 40° C. in a forced air oven for 12 hrs before testing.

Polyurethane Foam Production with Corn Starch (or Variants of Corn Starch)

Starch was sifted into a stirring mixture of the polyols, Jeffamine®, and water and stirred for 1 hr@80-100° C., cooled to 30-40° C., catalyst was added followed by additional water and diisocyanate. Foam was allowed to rise as stated above.

Preparation of Jeffamine®/Isocyanate Prepolymer for Use in Foam Production

HDI: A flask was charged with 44 mL (45.98 g=0.273 mol) HDI and 60 mL acetone and, with vigorous stirring, 27 g (10 mol % of HDI) Jeffamine® ED-900 (aka polyetheramine XTJ 501) was added slowly dropwise. The reaction was allowed to proceed for 3 hrs and the acetone was removed un vacuo to yield 67.95 g of water white viscous fluid that had a calculated composition of 37 wt % ED-900 and 63 wt % HDI (Note that over the course of several days this fluid jelled).

TDI: A flask was charged with 7.8 mL (9.56 g=0.055 mol) TDI and 10 mL acetone and, with vigorous stirring, 2.0 g (0.0022 mol) Jeffamine® ED-900 (aka polyetheramine XTJ 501) was added and stirred at rt for 30 min, and the acetone was removed un vacuo to yield 10.44 g of water white viscous fluid that had a calculated composition of 17 wt % ED-900 and 83 wt % TDI.

Preparation of Sorbitol/Sucrose/Starch Solution for Use in Foam Production:

A beaker was charged with 150 g water and, with vigorous stirring, 3.06 g corn starch was sifted in and then cooked for 20 min @90-100° C. Without cooling or cessation of stirring, a pre-ground mixture of 54 g D-sorbitol and 54 g sucrose was slowly sifted in. After complete dissolution, a 50 g aliquot was drawn and with stirring and heating, a pre-ground mixture of 28 g D-sorbitol and 28 g sucrose was slowly sifted in to yield a water white viscous fluid that is 72.9% solids (i.e., 72.3 wt % 1:1 sucrose/sorbitol and 0.6 wt % corn starch).

Details and results appear in Tables 3 through 6 below.

TABLE 3

Free Rise Foam Data

| | | TEGOPREN | Grams | | | | | | | | |
|---|---|---|---|---|---|---|---|---|---|---|---|
| Run | Code | 5843[A] (grams) | Glycerol | Corn Syrup[B] | ED-900[C] | PEG-400 | PEG-200 | PEG-600 | PEG-1000 | DABCO® T-9[D] | DABCO® 33LV[E] |
| 0 | Control | | | | | | | | | | |
| 1 | BK-1048-0 | 0.06 | 1.88 | 4.3 | 16 | 0 | 0 | 0 | 0 | 0 | 0 |
| 2 | BK-1148-1 | 0.00 | 1.88 | 4.3 | 14 | 0 | 2 | 0 | 0 | 0 | 0 |
| 3 | BK-1148-2 | 0.00 | 1.88 | 4.3 | 14 | 0 | 2 | 0 | 0 | 0 | 0 |
| 4 | BK-1148-5 | 0.06 | 1.88 | 4.3 | 14 | 0 | 2 | 0 | 0 | 0 | 0 |
| 5 | BK-1148-6 | 0.07 | 1.88 | 4.3 | 14 | 0 | 2 | 0 | 0 | 0 | 0 |
| 6 | BK-1149-1 | 0.06 | 1.88 | 4.3 | 16 | 0 | 0 | 0 | 0 | 0 | 0 |
| 7 | BK-1151-1 | 0.07 | 1.88 | 4.3 | 16 | 0 | 0 | 0 | 0 | 0 | 0 |
| 8 | BK-1152-1 | 0.07 | 1.88 | 4.3 | 16 | 0 | 0 | 0 | 0 | 0 | 0 |
| 9 | BK-1152-2 | 0.07 | 1.88 | 4.3 | 12 | 4 | 0 | 0 | 0 | 0 | 0 |
| 10 | BK-1152-3 | 0.07 | 1.88 | 4.3 | 12 | 0 | 4 | 0 | 0 | 0 | 0 |
| 11 | BK-1153-1 | 0.07 | 1.88 | 4.3 | 12 | 0 | 2 | 2 | 0 | 0 | 0 |
| 12 | BK-11104-6 | 0 | 5.64 | 12.9 | 30 | 12 | 0 | 1.5 | 4.5 | 0 | 0 |
| 13 | BK-11104-8 | 0 | 1.88 | 4.3 | 6 | 4 | 0 | 1.5 | 4.5 | 0 | 0 |
| 14 | BK-1153-2 | 0 | 1.88 | 4.3 | 12 | 4 | 0 | 0 | 0 | 0 | 0 |
| 15 | BK-1154-1 | 0 | 1.88 | 4.3 | 12 | 0 | 2 | 2 | 0 | 0 | 0 |
| 16 | BK-1155-0 | 0 | 3.76 | 8.6 | 24 | 0 | 4 | 4 | 0 | 0 | 0 |
| 17 | BK-1155-1 | 0 | 1.88 | 4.3 | 6 | 2 | 1 | 6 | 0 | 0 | 0 |
| 18 | BK-1155-2 | 0 | 5.64 | 12.9 | 36 | 0 | 6 | 6 | 0 | 0 | 0 |
| 19 | BK-1156-1 | 0 | 1.88 | 4.3 | 6 | 0 | 0 | 8 | 2 | 0 | 0 |
| 20 | BK-1157-1 | 0 | 1.88 | 4.3 | 8 | 0 | 0 | 8 | 0 | 0 | 0 |
| 21 | BK-1157-1B | 0 | 1.88 | 4.3 | 8 | 0 | 0 | 8 | 0 | 0 | 0 |
| 22 | BK-1159-1 | 0 | 5.64 | 12.9 | 36 | 12 | 0 | 0 | 0 | 0 | 0 |
| 23 | BK-1193-1D | 0 | 1.88 | 4.44[V] | 12 | 4 | 0 | 0 | 0 | 0 | 0 |
| 24 | BK-1193-2D | 0 | 1.88 | 4.3[W] | 12 | 4 | 0 | 0 | 0 | 0 | 0 |
| 25 | BK-1193-3D | 0 | 1.88 | 4.3 | 12 | 4 | 0 | 0 | 0 | 0 | 0 |
| 26 | BK-1194-1 | 0 | 1.88 | 4.3 | 12 | 4 | 0 | 0 | 0 | 0.52 | 0 |
| 27 | BK-1194-2 | 0 | 1.88 | 4.3 | 12 | 4 | 0 | 0 | 0 | 0.19 | 0 |
| 28 | BK-1194-3 | 0 | 1.88 | 4.3 | 12 | 4 | 0 | 0 | 0 | 0.06 | 0.1 |
| 29 | BK-1195-3 | 0 | 1.88 | 4.3 | 12 | 4 | 0 | 0 | 0 | 0.06 | 0.1 |
| 30 | BK-1195-4 | 0 | 1.88 | 4.3 | 12 | 4 | 0 | 0 | 0 | 0.06 | 0.1 |
| 31 | BK-1195-5 | 0 | 1.88 | 4.3 | 12 | 4 | 0 | 0 | 0 | 0.06 | 0.1 |
| 32 | BK-1196-1 | 0 | 1.88 | 4.3 | 9 | 4 | 0 | 0 | 0 | 0 | 0 |
| 33 | BK-1196-2 | 0 | 1.88 | 4.3 | 6 | 4 | 0 | 0 | 0 | 0 | 0 |
| 34 | BK-1196-3 | 0 | 1.88 | 4.3 | 3 | 4 | 0 | 0 | 0 | 0 | 0 |
| 35 | BK-1197-3 | 0 | 2.2 | 5 | 10.4 | 4.6 | 0 | 0 | 0 | 0 | 0 |
| 36 | BK-1197-5 | 0 | 3.2 | 7.2 | 5 | 6.7 | 0 | 0 | 0 | 0 | 0 |
| 37 | BK-1197-1 | 0 | 1.88 | 4.3 | 12 | 4 | 0 | 0 | 0 | 0.06 | 0.03 |
| 38 | BK-1198-5 | 0 | 1.88 | 4.3 | 3 | 4 | 0 | 0 | 0 | 0 | 0 |
| 39 | BK-1199-2[EE] | 0 | 1.88 | 0 | 4 | 0 | 0 | 0 | 0 | 0.06 | 0.1 |
| 40 | BK-1199-3 | 0 | 0 | 4.3 | 12 | 4 | 0 | 0 | 0 | 0 | 0 |
| 41 | BK-11104-1 | 0 | 0 | 4.3 | 12 | 4 | 0 | 0 | 0 | 0 | 0 |
| 42 | BK-1199-4 | 0 | 1.88 | 4.3 | 12 | 0 | 0 | 0 | 0 | 0 | 0 |
| 43 | BK-11100-7 | 0 | 1.88 | 4.3 | 12 | 0 | 0 | 0 | 0 | 0 | 0 |
| 44 | BK-11104-3 | 0 | 0 | 4.3 | 12 | 0 | 0 | 0 | 0 | 0 | 0 |
| 45 | BK-11100-5 | 0 | 0 | 4.3 | 12 | 0 | 0 | 0 | 0 | 0 | 0 |
| 46 | BK-11100-8 | 0 | 1.88 | 4.3 | 12 | 4 | 0 | 0 | 0 | 0 | 0 |

TABLE 3-continued

Free Rise Foam Data

| | | | | | | | | | | | | |
|---|---|---|---|---|---|---|---|---|---|---|---|---|
| 47 | BK-11100-6 | 0 | 1.88 | 4.3 | 12 | 4 | 0 | 0 | 0 | 0.06 | 0.1 | |
| 48 | BK-11100-1 | 0 | 1.88 | 4.3 | 12 | 4 | 0 | 0 | 0 | 0.08 | 0.09 | |
| 49 | BK-11101-3 | 0 | 1.88 | 4.3 | 12 | 4 | 0 | 0 | 0 | 0.06 | 0.1 | |
| 50 | BK-11102-1$^{H}$ | 0 | 1.835 | 1.09 | 11.71 | 3.9 | 0 | 0 | 0 | 0.06 | 0.1 | |
| 51 | BK-11102-2$^{H}$ | 0 | 1.835 | 1.09 | 11.71 | 3.9 | 0 | 0 | 0 | 0.06 | 0.1 | |
| 52 | BK-11103-3$^{H}$ | 0 | 1.835 | 1.09 | 11.71 | 3.9 | 0 | 0 | 0 | 0.06 | 0.1 | |
| 53 | BK-1140-60$^{H}$ | 0 | 1.88 | 3.3 | 16 | 0 | 0 | 0 | 0 | 0 | 0 | |
| 54 | BK-1137-A$^{NN}$ | 0 | 4 | 8.6 | 16 | 0 | 0 | 0 | 0 | 0 | 0 | |

| Run | Code | mL DBTDL$^{F}$ | mL water | mL HDI$^{G}$ | HDI equiv$^{KK}$ | Index$^{H}$ | ED900/HDI mol ratio | Temp °C. | Beaker or Dish$^{I}$ | density (g/cm³) | Resiliency$^{J}$ | Water DBTDL$^{F}$ |
|---|---|---|---|---|---|---|---|---|---|---|---|---|
| 0 | Control | | | | | | | | | 0 | Control | |
| 1 | BK-1048-0 | 0.20 | 1.00 | 6.8 | 54 | 33 | 0.42 | rt | B | 0.11 | poor | |
| 2 | BK-1148-1 | 0.20 | 0.10 | 7.4 | 53 | 41 | 0.34 | rt | B | 0.15 | poor | |
| 3 | BK-1148-2 | 0.20 | 1.00 | 7.4 | 53 | 34 | 0.34 | rt | B | 0.11 | poor | |
| 4 | BK-1148-5 | 0.20 | 0.10 | 7.4 | 53 | 41 | 0.34 | rt | B | P | P | P |
| 5 | BK-1148-6 | 0.20 | 1.00 | 7.4 | 53 | 34 | 0.34 | rt | B | 0.11 | poor | |
| 6 | BK-1149-1 | 0.20 | 0.10 | 8.3 | 66 | 50 | 0.34 | rt | B | 0.19 | good | |
| 7 | BK-1151-1 | 0.20 | 0.50 | 8.3 | 66 | 45 | 0.34 | rt | B | 0.16 | good$^{Q}$ | poor |
| 8 | BK-1152-1 | 0.40 | 0.50 | 8.3 | 66 | 45 | 0.34 | rt | B | 0.12 | good | poor |
| 9 | BK-1152-2 | 0.40 | 0.50 | 8.8 | 65 | 45 | 0.24 | rt | B | 0.10 | good | fair |
| 10 | BK-1152-3 | 0.40 | 0.50 | 8.8 | 58 | 42 | 0.24 | rt | B | 0.14 | poor | N/A |
| 11 | BK-1153-1 | 0.40 | 0.50 | 8.8 | 63 | 44 | 0.24 | rt | B | 0.10 | good | fair |
| 12 | BK-11104-6 | 1.20 | 1.50 | 26.4 | 65 | 45 | 0.20 | rt | B | 0.09 | good | good |
| 13 | BK-11104-8 | 0.40 | 0.50 | 8.9 | 65 | 45 | 0.12 | rt | B | 0.11 | good | poor |
| 14 | BK-1153-2 | 0.40 | 0.50 | 8.8 | 65 | 45 | 0.24 | rt | B | 0.10 | good | good |
| 15 | BK-1154-1 | 0.40 | 0.50 | 8.8 | 63 | 44 | 0.24 | rt | B | 0.10 | good | good |
| 16 | BK-1155-0 | 0.80 | 1.00 | 17.6 | 63 | 44 | 0.24 | rt | B | R | R | R |
| 17 | BK-1155-1 | 0.42 | 0.50 | 8.8 | 62 | 44 | 0.12 | rt | B | 0.28$^{S}$ | | |
| 18 | BK-1155-2 | 1.20 | 1.50 | 26.4 | 63 | 44 | 0.24 | rt | D | 0.115 ± 0.005 | good | good |
| 19 | BK-1156-1 | 0.42 | 0.50 | 8.8 | 66 | 45 | 0.12 | rt | B | 0.16$^{T}$ | good | poor |
| 20 | BK-1157-1 | 0.42 | 0.50 | 8.8 | 66 | 45 | 0.16 | rt | B | R | good$^{U}$ | fair$^{U}$ |
| 21 | BK-1157-1B | 0.42 | 0.50 | 8.8 | 66 | 45 | 0.16 | rt | D | R | R | R |

| Run | Code | mL DBTDL$^{F}$ | mL water | mL HDI$^{G}$ | HDI equiv$^{KK}$ | Index$^{H}$ | ED900/HDI mol ratio | Temp °C. | Beaker or Dish$^{I}$ | density (g/cm³) | Resiliency$^{J}$ | Water Dispersibility$^{K}$ |
|---|---|---|---|---|---|---|---|---|---|---|---|---|
| 0 | Control | | | | | | | | | 0.104 ± 0.001 | good | poor |
| 22 | BK-1159-1 | 1.20 | 1.50 | 26.4 | 65 | 45 | 0.24 | rt | D | 0.111 ± 0.003 | good | good |
| 23 | BK-1193-1D | 0.40 | 0.36 | 8.8 | 64 | 45 | 0.24 | 60 | D | 0.08 | good | fair |
| 24 | BK-1193-2D | 0.40 | 0.50 | 8.8 | 65 | 45 | 0.24 | 60 | D | 0.09 | good | fair |
| 25 | BK-1193-3D | 0.40 | 0.50 | 8.5 | 63 | 44 | 0.25 | 60 | D | 0.08 | good | good |
| 26 | BK-1194-1 | 0.00 | 0.50 | 8.8 | 65 | 45 | 0.24 | 60 | D | X | X | X |
| 27 | BK-1194-2 | 0.00 | 0.50 | 8.8 | 65 | 45 | 0.24 | 60 | D | X | X | X |
| 28 | BK-1194-3 | 0.00 | 0.50 | 8.8 | 65 | 45 | 0.24 | rt | B | 0.08$^{Y}$ | good$^{Y}$ | good$^{Y}$ |
| 29 | BK-1195-3 | 0.00 | 0.50 | 8.8 | 65 | 45 | 0.24 | 60 | D | 0.09 | fair | good |
| 30 | BK-1195-4 | 0.00 | 0.50 | 9.1 | 67 | 47 | 0.24 | 60 | D | 0.08 | good | poor |
| 31 | BK-1195-5 | 0.00 | 0.50 | 8.95 | 66 | 46 | 0.24 | 40 | D | Z | Z | Z |
| 32 | BK-1196-1 | 0.36 | 0.32 | 8.5 | 65 | 47 | 0.19 | 60 | D | P | P | P |
| 33 | BK-1196-2 | 0.30 | 0.14 | 8.2 | 65 | 49 | 0.13 | 60 | D | P | P | P |
| 34 | BK-1196-3 | 0.25 | 0.00 | 8 | 66 | 51 | 0.07 | 60 | D | N/A$^{AA}$ | N/A | poor |
| 35 | BK-1197-3 | 0.40 | 0.38 | 9.9 | 65 | 47 | 0.19 | 60 | D | N/A$^{BB}$ | fair | poor |
| 36 | BK-1197-5 | 0.40 | 0.00 | 13.4 | 66 | 50 | 0.07 | 60 | D | 0.05$^{T,CC}$ | good | poor |
| 37 | BK-1197-1 | 0.00 | 0.50 | 8.8 | 65 | 45 | 0.24 | 60 | D | 0.10 | good$^{DD}$ | fair |
| 38 | BK-1198-5 | 0.25 | 0.00 | 8 | 66 | 51 | 0.07 | 60 | B | 0.05 | good | poor |
| 39 | BK-1199-2$^{EE}$ | 0.00 | 0.70 | 5.2 | 60 | 44 | 0.14 | 60 | D | FF | FF | FF |
| 40 | BK-1199-3 | 0.38 | 0.50 | 5.9 | 69 | 41 | 0.36 | rt | B | 0.12 | good | good |
| 41 | BK-11104-1 | 0.38 | 0.38 | 5.6 | 65 | 40 | 0.38 | rt | B | LL | LL | LL |
| 42 | BK-1199-4 | 0.34 | 0.59 | 7.9 | 66 | 43 | 0.27 | rt | B | 0.12$^{GG}$ | good | poor |
| 43 | BK-11104-7 | 0.34 | 0.45 | 7.9 | 66 | 45 | 0.27 | rt | B | 0.10 | good | poor |
| 44 | BK-11104-3 | 0.31 | 0.13 | 4.5 | 65 | 40 | 0.48 | rt | B | 0.14 | good$^{Q}$ | poor |
| 45 | BK-11100-5 | 0.31 | 0.42 | 4.9 | 70 | 39 | 0.44 | rt | B | 0.13 | good | poor |
| 46 | BK-11100-8 | 0.40 | 0.55 | 8.8 | 65 | 45 | 0.24 | rt | B | 0.11 | good | good |
| 47 | BK-11100-6 | 0.00 | 0.00 | 8.8 | 65 | 51 | 0.24 | 60 | D | HH | HH | HH |
| 48 | BK-11100-1 | 0.00 | 0.25 | 8.8 | 65 | 48 | 0.24 | 60 | D | HH | HH | HH |
| 49 | BK-11101-3 | 0.00 | 0.50 | 8.8 | 65 | 45 | 0.24 | 60 | D | 0.08 | good | good |
| 50 | BK-11102-1$^{H}$ | 0.00 | 0.83 | 6.1 | 62 | 45 | 0.34 | 60 | D | FF | FF | FF |
| 51 | BK-11102-2$^{H}$ | 0.00 | 1.33 | 6.1 | 62 | 39 | 0.34 | 60 | D | FF | FF | FF |
| 52 | BK-11103-3$^{H}$ | 0.00 | 1.33 | 6.1 | 62 | 39 | 0.34 | 60 | D | JJ | JJ | JJ |
| 53 | BK-1140-60$^{H}$ | 0.20 | 1.00 | 6.8 | 55 | 41 | 0.42 | rt | B | MM | MM | MM |
| 54 | BK-1137-A$^{NN}$ | 0.28 | 0.28 | 15 | 59 | 56 | 0.19 | rt | B | | poor | poor |

TABLE 3-continued

Free Rise Foam Data

| Run | Code | Compression$^L$ kg/cm² | Rebound$^M$ % | Water Abs.$^N$ min | Shake test$^O$ |
|---|---|---|---|---|---|
| 0 | Control | 0.076 ± 0.001 | 99.2 ± 0.2 | N/A | N/A |
| 1 | BK-1048-0 | | | | |
| 2 | BK-1148-1 | | | | |
| 3 | BK-1148-2 | | | | |
| 4 | BK-1148-5 | P | P | P | P |
| 5 | BK-1148-6 | | | | |
| 6 | BK-1149-1 | | | | |
| 7 | BK-1151-1 | | | >3 | >34 |
| 8 | BK-1152-1 | | | | |
| 9 | BK-1152-2 | | | | |
| 10 | BK-1152-3 | | | | |
| 11 | BK-1153-1 | | | | |
| 12 | BK-11104-6 | 0.05 | 97 | 0.65 | 1 |
| 13 | BK-11104-8 | 0.07 | 97 | 2.3 | >34 |
| 14 | BK-1153-2 | | | | |
| 15 | BK-1154-1 | | | | |
| 16 | BK-1155-0 | R | R | R | R |
| 17 | BK-1155-1 | | | | |
| 18 | BK-1155-2 | 0.029 ± 0.002 | 86.9 ± 0.7 | 1.5 | 2 |
| 19 | BK-1156-1 | | | | |
| 20 | BK-1157-1 | | | | |
| 21 | BK-1157-1B | R | R | R | R |
| 22 | BK-1159-1 | 0.0871 ± 0.003 | 95.3 ± 2.7 | 1.1 | 2 |
| 23 | BK-1193-1D | 0.08 | 96 | 2 | 10 |
| 24 | BK-1193-2D | 0.08 | 95 | 1 | 12 |
| 25 | BK-1193-3D | 0.04 | 91 | 0.55 | 1 |
| 26 | BK-1194-1 | X | X | X | X |
| 27 | BK-1194-2 | X | X | X | X |
| 28 | BK-1194-3 | | | 0.13 | 1 |
| 29 | BK-1195-3 | 0.04 | 95 | 0.33 | 3 |
| 30 | BK-1195-4 | 0.04 | 96 | 0.15 | >34 |
| 31 | BK-1195-5 | Z | Z | Z | Z |
| 32 | BK-1196-1 | P | P | P | P |
| 33 | BK-1196-2 | P | P | P | P |
| 34 | BK-1196-3 | | | | |
| 35 | BK-1197-3 | | | | >34 |
| 36 | BK-1197-5 | | | >3 | >34 |
| 37 | BK-1197-1 | | | 0.5 | 15 |
| 38 | BK-1198-5 | | | | |
| 39 | BK-1199-2$^{EE}$ | FF | FF | FF | FF |
| 40 | BK-1199-3 | 0.11 | 96 | 0.32 | 1 |
| 41 | BK-11104-1 | LL | LL | LL | LL |
| 42 | BK-1199-4 | 0.12 | 96 | 2.8 | >34 |
| 43 | BK-11100-7 | 0.17 | 96 | >3 | >34 |
| 44 | BK-11104-3 | 0.53 | 97 | 0.9 | >34 |
| 45 | BK-11100-5 | 0.40 | 98 | 1.58 | >34 |
| 46 | BK-11100-8 | 0.06 | 94 | 1.9 | 3 |
| 47 | BK-11100-6 | HH | HH | HH | HH |
| 48 | BK-11100-1 | HH | HH | HH | HH |
| 49 | BK-11101-3 | 0.04 | 95 | 0.10 | 2 |
| 50 | BK-11102-1$^{II}$ | FF | FF | FF | FF |
| 51 | BK-11102-2$^{II}$ | FF | FF | FF | FF |
| 52 | BK-11103-3$^{II}$ | JJ | JJ | JJ | JJ |
| 53 | BK-1140-60$^{II}$ | MM | MM | MM | MM |
| 54 | BK-1137-A$^{NN}$ | | | | |

$^A$PEG substituted silicone surfactant (Degussa) unless otherwise noted.
$^B$Karo-brand Light Corn Syrup unless otherwise noted.
$^C$Polyetheramine XTJ-501 (aka Jeffamine ®) (Huntsman Corporation)
$^D$Stannous octoate catalyst (Air Products)
$^E$Triethylenediamine catalyst (Air Products)
$^F$Dibutyltindilaurate (Aldrich)
$^G$1,6-diisocyanohexane (HDI) (Aldrich)
$^H$isocyanate index = (total moles NCO/sum of total moles OH and NH2 and water in formulation) × 100%.
$^I$The final composition was either left in the beaker to develop or poured into a dish (bath or larger beaker) to develop @ indicated temperature.
$^J$Good = fast easy non-sticky rebound during decompression; Fair = rebounds, but slowly after decompression; Poor = no rebound after decompression;
$^K$Good = absorbs water quickly and easily disperses; Fair = absorbs water quickly but disperses with difficulty, or absorbs slowly but disperses easily; Poor = doesn't absorb water or doesn't disperse.
$^L$Force to compress to 50% of original thickness.
$^M$Percentage of original thickness recovered after 60 sec compression.
$^N$Time for an approx. 2.5 × 2 × 0.8 cm piece of foam, dropped in 250 mL tap water in a 500 mL jar, to fully absorb water.
$^O$Number of shakes to break an approx. 2.5 × 2 × 0.8 cm piece of foam, in 250 mL tap water in a 500 mL jar, into two or more pieces.
P A testable foam was not obtained.
$^Q$A stiff foam.
R Foam cavitated severely due to too rapid reaction, any data based on salvageable portion.

TABLE 3-continued

Free Rise Foam Data

[S] Translucent foam

[T] Large open celled translucent foam not particularly soft.

[U] Based on small sections of foam recovered from the cavitated product.

[V] Corrected-ADM 42/43 Corn Syrup (c-ADM) made by diluting ADM corn syrup to 78.06% solids to simulate Karo-brand light corn syrup solids without sucrose.

[W] s-ADM = simulated Karo-brand light corn syrup made by treating c-ADM with sucrose to final composition = 12 wt % sucrose, 19.3 wt % water, and 68.7 wt % ADM solids.

X A dense rubbery elastic white material was obtained.

[Y] Weak foam strength.

Z Very weak-marginally a foam.

[AA] The coarse large opened cell foam had a thick skin; the latter was cut away before evaluation.

[BB] White dense thick skinned foam; skin was removed before evaluation (note: dressed foam tended to collapse into an I-Beam shape).

[CC] the center of foam was yellow.

[DD] Resiliency appears to improve upon standing.

[EE] 12.0 g glycerol ethoxylate(EO = 20 mol)--Aldrich-- used instead of corn syrup.

FF No rise leaving a gooey residual.

GG Foam column had a hourglass shape; sample cut from bottom section.

HH a foam disc with thick skin collapsed into the inside; not tested.

[II] Corn starch used instead of corn syrup.

JJ Poor rise leaving friable structure. Not tested.

KK (moles NCO/total anhydrous moles of ROH and RNH2) × 100%.

LL Good volume but completely friable.

MM Highly elastic dense fine celled foam, like a rubberball; sheets cut from product were impervious to water.

NN Ecosphere EX-7760-44 nano-starch used instead of corn syrup.

TABLE 4

Free Rise Foam Data

| Run | Code | glycerol (g) | Corn Syrup[A] (g) | ED900[V] (g) | PEG-400 (g) | PEG-200 (g) | PEG-600 (g) | PEG-1000 (g) | GE[B] (g) | Polyol 20[C] (g) | Sucrose (g) | Amine cat (g) | TEA[D] (g) |
|---|---|---|---|---|---|---|---|---|---|---|---|---|---|
| 1 | BK-1157-2 | 1.88 | 4.3 | 12 | 0 | 2 | 2 | 0 | 0 | 0 | 0 | 0 | 0 |
| 2 | BK-1158-1 | 1.88 | 4.3 | 12 | 0 | 2 | 2 | 0 | 0 | 0 | 0 | 0 | 0 |
| 3 | BK-1158-2 | 1.88 | 4.3 | 12 | 4 | 0 | 0 | 0 | 0 | 0 | 0 | 0 | 0 |
| 4 | BK-1160-1 | 1.88 | 4.3 | 12 | 0 | 2 | 2 | 0 | 0 | 0 | 0 | 0 | 0 |
| 5 | BK-1162-1 | 1.88 | 4.3 | 12 | 0 | 2 | 2 | 0 | 0 | 0 | 0 | 0 | 0 |
| 6 | BK-1162-2 | 1.88 | 4.3 | 12 | 0 | 2 | 2 | 0 | 0 | 0 | 0 | 0 | 0 |
| 7 | BK-1162-3 | 1.88 | 4.3 | 12 | 0 | 2 | 2 | 0 | 0 | 0 | 0 | 0 | 0 |
| 8 | BK-1164-A | 1.88 | 4.3 | 12 | 4 | 0 | 0 | 0 | 0 | 0 | 0 | 0 | 0 |
| 9 | BK-1164-B | 1.88 | 4.3 | 12 | 4 | 0 | 0 | 0 | 0 | 0 | 0 | 0 | 0 |
| 10 | BK-1164-C | 1.88 | 4.3 | 12 | 4 | 0 | 0 | 0 | 0 | 0 | 0 | 0 | 0 |
| 11 | BK-1165-A | 1.88 | 4.3 | 12 | 4 | 0 | 0 | 0 | 0 | 0 | 0 | 0 | 0.32 |
| 12 | BK-1165-B | 1.88 | 0 | 12 | 2 | 2 | 0 | 0 | 0 | 0 | 0 | 0 | 0.32 |
| 13 | BK-1165-C | 1.88 | 4.3 | 12 | 4 | 0 | 0 | 0 | 0 | 0 | 0 | 0 | 0 |
| 14 | BK-1165-D | 1.88 | 4.3 | 12 | 4 | 0 | 0 | 0 | 0 | 0 | 0 | 0 | 0 |
| 15 | BK-1166 | 1.88 | 4.3 | 12 | 4 | 0 | 0 | 0 | 0 | 0 | 0 | 0 | 0 |
| 16 | BK-1168-A | 1.88 | 4.3 | 12 | 4 | 0 | 0 | 0 | 0 | 0 | 0 | 0 | 0 |
| 17 | BK-1168-B | 1.88 | 4.3 | 12 | 4 | 0 | 0 | 0 | 0 | 0 | 0 | 0 | 0 |
| 18 | BK-1168-C | 1.88 | 4.3 | 12 | 4 | 0 | 0 | 0 | 0 | 0 | 0 | 0 | 0 |
| 19 | BK-1170-A | 1.88 | 2.3 | 12 | 4 | 0 | 0 | 0 | 2 | 0 | 0 | 0 | 0 |
| 20 | BK-1170-B | 1.88 | 4.3 | 12 | 4 | 0 | 0 | 0 | 0 | 0 | 0 | 0 | 0 |
| 21 | BK-1170-C | 1.88 | 4.3 | 12 | 4 | 0 | 0 | 0 | 0 | 0 | 0 | 0 | 0 |
| 22 | BK-1170-D | 1.88 | 0 | 12 | 0 | 0 | 0 | 0 | 8.3 | 0 | 0 | 0 | 0 |
| 23 | BK-1171-A | 1.88 | 0 | 0 | 4 | 0 | 0 | 0 | 12 | 0 | 0 | 1[O] | 0 |
| 24 | BK-1171-B | 1.88 | 0 | 0 | 4 | 0 | 0 | 0 | 12 | 0 | 0 | .5[P] | 0 |
| 25 | BK-1171-C | 1.88 | 0 | 0 | 4 | 0 | 0 | 0 | 12 | 0 | 0 | .5[P] | 0 |
| 26 | BK-1171-D | 1.88 | 0 | 0 | 4 | 0 | 0 | 0 | 12 | 0 | 0 | .75[P] | 0 |
| 27 | BK-1171-E | 1.88 | 0 | 12 | 4 | 0 | 0 | 0 | 8.3 | 0 | 0 | .62[P] | 0 |
| 28 | BK-1171-F | 1.88 | 0 | 4 | 0 | 0 | 0 | 0 | 12 | 0 | 0 | .28[P] | 0 |
| 29 | BK-1172-A | 1.88 | 0 | 4 | 0 | 0 | 0 | 0 | 12 | 0 | 0 | .42[P] | 0 |
| 30 | BK-1172-B | 1.88 | 0 | 4 | 0 | 0 | 0 | 0 | 12 | 0 | 0 | .20[P] | 0 |
| 31 | BK-1172-C | 1.88 | 0 | 4 | 0 | 0 | 0 | 0 | 12 | 0 | 0 | .28[P] | 0 |
| 32 | BK-1172-D | 1.88 | 0 | 4 | 0 | 0 | 0 | 0 | 0 | 12 | 0 | .42[P] | 0 |
| 33 | BK-1173-A[T] | 1.88 | 0 | 4 | 0 | 0 | 0 | 0 | 0 | 12 | 0 | .28[P] | 0 |
| 34 | BK-1173-B[T] | 1.88 | 0 | 0 | 0 | 0 | 4 | 0 | 0 | 12 | 0 | .20[P] | 0 |
| 35 | BK-1173-C | 1.88 | 0 | 4 | 0 | 0 | 0 | 0 | 12 | 0 | 0 | .17[P] | 0 |
| 36 | BK-1173-D | 1.88 | 0 | 12 | 0 | 0 | 0 | 0 | 4 | 0 | 0 | .20[P] | 0 |
| 37 | BK-1174-A | 1.88 | 0 | 4 | 0 | 0 | 0 | 0 | 12 | 0 | 0 | .17[P] | 0 |
| 38 | BK-1174-B | 1.88 | 0 | 4 | 0 | 0 | 0 | 0 | 12 | 0 | 0 | 0 | 0 |
| 39 | BK-1174-C | 1.88 | 0 | 0 | 0 | 0 | 0 | 0 | 12 | 0 | 0 | 0 | 0 |
| 40 | BK-1174-D | 0 | 0 | 0 | 0 | 0 | 0 | 0 | 12 | 0 | 0 | 0 | 0 |
| 41 | BK-1174-E | 0 | 0 | 4 | 0 | 0 | 0 | 0 | 12 | 0 | 0 | 0 | 0 |
| 42 | BK-1175-A | 0 | 0 | 4 | 0 | 0 | 0 | 0 | 12 | 0 | 0 | .21[P] | 0 |
| 43 | BK-1176-A | 1.88 | 12[U] | 4 | 4 | 0 | 0 | 0 | 0 | 0 | 0 | .25[P] | 0 |

TABLE 4-continued

Free Rise Foam Data

| | | | | | | | | | | | | | | |
|---|---|---|---|---|---|---|---|---|---|---|---|---|---|---|
| 44 | BK-1176-B | 1.88 | 12$^U$ | 4 | 4 | 0 | 0 | 0 | 0 | 0 | 0 | 0 | 0 | 0 |
| 45 | BK-1176-C | 1.88 | 12$^U$ | 4 | 4 | 0 | 0 | 0 | 0 | 0 | 0 | 0 | 0 | 0 |
| 46 | BK-1176-D | 1.88 | 4.3$^U$ | 12 | 4 | 0 | 0 | 0 | 0 | 0 | 0 | 0 | 0 | 0 |
| 47 | BK-1177-A | 1.88 | 4.3$^U$ | 12 | 4 | 0 | 0 | 0 | 0 | 0 | 0 | 0 | 0 | 0 |
| 48 | BK-1177-B | 0 | 12.5$^U$ | 4 | 4 | 0 | 0 | 0 | 0 | 0 | 0 | 0 | 0 | 0 |
| 49 | BK-1177-C | 1.88 | 12$^U$ | 4 | 4 | 0 | 0 | 0 | 0 | 0 | 0 | 0 | 0 | 0 |
| 50 | BK-1177-D | 1.88 | 12$^U$ | 4 | 4 | 0 | 0 | 0 | 0 | 0 | 0 | 0 | 0 | 0 |
| 51 | BK-1177-E | 1.88 | 12$^U$ | 4 | 4 | 0 | 0 | 0 | 0 | 0 | 0 | 0 | 0 | 0 |
| 52 | BK-1177-F | 1.88 | 4.3$^U$ | 12 | 4 | 0 | 0 | 0 | 0 | 0 | 0 | 0 | 0 | 0 |
| 53 | BK-1178-A | 1.88 | 4.3$^U$ | 12 | 4 | 0 | 0 | 0 | 0 | 0 | 0 | 0 | 0 | 0 |
| 54 | BK-1179-A | 1.88 | 4.3$^U$ | 12 | 4 | 0 | 0 | 0 | 0 | 0 | 0 | 0 | 0 | 0 |
| 55 | BK-1179-B | 1.88 | 4.92$^U$ | 12 | 4 | 0 | 0 | 0 | 0 | 0 | 0 | 0 | 0 | 0 |
| 56 | BK-1179-C | 1.88 | 4.3$^U$ | 12 | 0 | 2 | 2 | 0 | 0 | 0 | 0 | 0 | 0 | 0 |
| 57 | BK-1179-D | 1.88 | 4.3$^U$ | 12 | 0 | 2 | 2 | 0 | 0 | 0 | 0 | 0 | 0 | 0 |
| 58 | BK-1179-E | 1.88 | 4.3$^U$ | 12 | 4 | 0 | 0 | 0 | 0 | 0 | 0 | 0 | 0 | 0 |
| 59 | BK-1179-F | 1.88 | 4.3$^U$ | 12 | 4 | 0 | 0 | 0 | 0 | 0 | 0 | 0 | 0 | 0 |
| 60 | BK-1180-A | 1.88 | 4.3$^U$ | 12 | 4 | 0 | 0 | 0 | 0 | 0 | 0 | 0 | 0 | 0 |
| 61 | BK-1180-B | 1.88 | 4.3$^U$ | 12 | 0 | 2 | 2 | 0 | 0 | 0 | 0 | 0 | 0 | 0 |
| 62 | BK-1180-C | 1.88 | 4.3$^U$ | 12 | 0 | 2 | 2 | 0 | 0 | 0 | 0 | 0 | 0 | 0 |
| 63 | BK-1180-D | 1.88 | 4.3$^U$ | 12 | 4 | 0 | 0 | 0 | 0 | 0 | 0 | 0 | 0 | 0 |
| 64 | BK-1180-E | 1.88 | 3.8$^U$ | 12 | 4 | 0 | 0 | 0 | 0 | 0 | 0.52 | 0 | 0 | |
| 65 | BK-1181-A | 0 | 10.56$^U$ | 4 | 0 | 0 | 0 | 0 | 0 | 0 | 1.44 | 0 | 0 | |
| 66 | BK-1181-B | 0 | 17.6$^U$ | 0 | 0 | 0 | 0 | 0 | 0 | 0 | 2.4 | 0 | 0 | |
| 67 | BK-1181-C | 1.88 | 3.8$^U$ | 12 | 4 | 0 | 0 | 0 | 0 | 0 | 0.52 | 0 | 0 | |
| 68 | BK-1181-D | 1.88 | 3.8$^U$ | 12 | 4 | 0 | 0 | 0 | 0 | 0 | 0.52 | 0 | 0 | |
| 69 | BK-1182-A | 1.88 | 3.8$^U$ | 12 | 4 | 0 | 0 | 0 | 0 | 0 | 0.52 | 0 | 0 | |
| 70 | BK-1182-B | 1.88 | 0 | 2 | 2 | 2 | 2 | 0 | 2 | 0 | 3.5 | 0 | 0 | |
| 71 | BK-1183-A$^W$ | 1.88 | 6.2$^U$ | 1.25 | 0 | 2 | 2 | 0 | 0 | 0 | 0.8 | 0 | 0 | |
| 72 | BK-1183-B | 0 | 0 | 3.4 | 2 | 2 | 2 | 0 | 0 | 0 | 0.8 | 0 | 0 | |
| 73 | BK-1184-A | 1.88 | 0 | 3.4 | 2 | 2 | 2 | 0 | 0 | 0 | 0.8 | 0 | 0 | |
| 74 | BK-1184-B | 1.88 | 0 | 3.4 | 2 | 2 | 2 | 0 | 0 | 0 | 0.8 | 0 | 0 | |
| 75 | BK-1184-D$^X$ | 1.88 | 0 | 3.3 | 2 | 2 | 2 | 0 | 0 | 0 | 0.8 | 0 | 0 | |
| 76 | BK-1184-E$^X$ | 1.88 | 0 | 3.26 | 6 | 0 | 0 | 0 | 0 | 0 | 0.8 | 0 | 0 | |
| 77 | BK-1185-A$^{X,Y}$ | 1.88 | 6.2$^U$ | 1.28 | 0 | 2 | 2 | 0 | 0 | 0 | 0.8 | 0 | 0 | |
| 78 | BK-1185--B$^{X,Y}$ | 1.88 | 6.2$^U$ | 1.28 | 4 | 0 | 0 | 0 | 0 | 0 | 0.8 | 0 | 0 | |
| 79 | BK-1186-A | 1.88 | 0 | 12 | 4 | 0 | 0 | 0 | 0 | 0 | 3.48 | 0 | 0 | |
| 80 | BK-1186-B | 1.88 | 3.78$^U$ | 12 | 4 | 0 | 0 | 0 | 0 | 0 | 0.52 | 0 | 0 | |
| 81 | BK-1186-C | 1.88 | 3.78$^U$ | 12 | 4 | 0 | 0 | 0 | 0 | 0 | 0.52 | 0 | 0 | |
| 82 | BK-1186-D | 1.88 | 3.78$^U$ | 12 | 4 | 0 | 0 | 0 | 0 | 0 | 0.52 | 0 | 0 | |
| 83 | BK-1186-E | 1.88 | 3.78$^U$ | 12 | 4 | 0 | 0 | 0 | 0 | 0 | 0.52 | 0 | 0 | |
| 84 | BK-1187-A | 1.88 | 3.78$^U$ | 12 | 4 | 0 | 0 | 0 | 0 | 0 | 0.52 | 0 | 0 | |
| 85 | BK-1187-B | 1.88 | 3.78$^U$ | 12 | 4 | 0 | 0 | 0 | 0 | 0 | 0.52 | 0 | 0 | |
| 86 | BK-1187-C | 1.88 | 4.3 | 12 | 4 | 0 | 0 | 0 | 0 | 0 | 0 | 0 | 0 | |
| 87 | BK-1188-A$^{AA}$ | 1.88 | 4.3 | 12 | 4 | 0 | 0 | 0 | 0 | 0 | 0 | 0 | 0 | |
| 88 | BK-1188-B$^{AA}$ | 1.88 | 4.3 | 12 | 4 | 0 | 0 | 0 | 0 | 0 | 0 | 0 | 0 | |
| 89 | BK-1188-C$^{AA}$ | 1.88 | 4.3 | 12 | 4 | 0 | 0 | 0 | 0 | 0 | 0 | 0 | 0 | |
| 90 | BK-1189-1 | 1.88 | 0 | 4 | 0 | 0 | 0 | 0 | 12 | 0 | 0 | .28$^P$ | 0 | |
| 91 | BK-1189-2 | 1.88 | 0 | 4 | 0 | 0 | 0 | 0 | 12 | 0 | 0 | .17$^P$ | 0 | |
| 92 | BK-1190-1 | 1.88 | 0 | 3.26 | 6 | 0 | 0 | 0 | 0 | 0 | 0.8 | 0 | 0 | |
| 93 | BK-1190-2 | 1.88 | 4.3 | 2 | 1.7 | 0 | 0 | 8.3 | 0 | 0 | 0 | 0 | 0 | |
| 94 | BK-1190-3 | 1.88 | 7 | 1.28 | 4 | 0 | 0 | 0 | 0 | 0 | 0 | 0 | 0 | |
| 95 | BK-1190-4 | 1.88 | 4.3 | 2 | 10 | 0 | 0 | 0 | 0 | 4 | 0 | 0 | 0 | |
| 96 | BK-1198-2 | 3.2 | 7.2 | 5 | 6.7 | 0 | 0 | 0 | 0 | 0 | 0 | 0 | 0 | |
| 97 | BK-1198-3 | 3.2 | 7.2 | 5 | 6.7 | 0 | 0 | 0 | 0 | 0 | 0 | 0 | 0 | |
| 98 | BK-1199-6 | 1.88 | 4.3 | 12 | 4 | 0 | 0 | 0 | 0 | 0 | 0 | 0 | 0 | |
| 99 | BK-11101-2 | 1.88 | 4.3 | 12 | 2 | 2 | 0 | 0 | 0 | 0 | 0 | 0 | 0 | |
| 100 | BK-11102-5 | 1.88 | 4.3 | 12 | 4 | 0 | 0 | 0 | 0 | 0 | 0 | 0 | 0 | |
| 101 | BK-11103-5 | 1.88 | 0 | 12 | 4 | 0 | 0 | 0 | 0 | 0 | 3.72 | 0 | 0 | |
| 102 | BK-11103-4 | 1.88 | 0 | 12 | 4 | 0 | 0 | 0 | 0 | 0 | 3.72 | 0 | 0 | |
| 103 | BK-11103-7 | 1.88 | 0 | 12 | 4 | 0 | 0 | 0 | 0 | 0 | 2.67 | 0 | 0 | |
| 104 | BK-1201-5 | 1.88 | 4.3 | 12 | 4 | 0 | 0 | 0 | 0 | 0 | 0 | 0 | 0 | |
| 105 | BK-1201-6 | 1.88 | 4.3 | 12 | 4 | 0 | 0 | 0 | 0 | 0 | 0 | 0 | 0 | |
| 106 | BK-1201-1 | 1.88 | 4.3 | 12 | 4 | 0 | 0 | 0 | 0 | 0 | 0 | 0 | 0 | |
| 107 | BK-1201-2 | 1.88 | 4.3 | 12 | 4 | 0 | 0 | 0 | 0 | 0 | 0 | 0 | 0 | |
| 108 | BK-1201-3 | 1.88 | 4.3 | 12 | 4 | 0 | 0 | 0 | 0 | 0 | 0 | 0 | 0 | |
| 109 | BK-1201-4 | 1.88 | 4.3 | 12 | 4 | 0 | 0 | 0 | 0 | 0 | 0 | 0 | 0 | |
| 110 | BK-1201-7 | 1.88 | 4.3 | 12 | 4 | 0 | 0 | 0 | 0 | 0 | 0 | 0 | 0 | |
| 111 | BK-1203-1 | 1.88 | 4.3 | 12 | 4 | 0 | 0 | 0 | 0 | 0 | 0 | 0 | 0 | |
| 112 | BK-1203-2 | 1.88 | 4.3 | 12 | 4 | 0 | 0 | 0 | 0 | 0 | 0 | 0 | 0 | |
| 113 | BK-1203-3 | 1.88 | 0 | 12 | 4 | 0 | 0 | 0 | 0 | 16.4 | 0 | 0 | 0 | |
| 114 | BK-1203-4 | 1.88 | 0 | 12 | 4 | 0 | 0 | 0 | 0 | 16.4 | 0 | 0 | 0 | |

TABLE 4-continued

Free Rise Foam Data

| Run | Code | BiCAT 8[E] (g) | BiCAT 8106[E] (g) | Coscat 28[BB] (g) | LICA 44[F] (g) | Proprietary-1[G] (mL) | Proprietary-2[G] (mL) | DBTDL[H] (mL) | % AOS[I] (mL) | Water (mL) | isocyanate (mL) | HDI[J] Index |
|---|---|---|---|---|---|---|---|---|---|---|---|---|
| 1 | BK-1157-2 | 0 | 0 | 0 | 0 | 0.8 | 0 | 0 | 0 | 0.5 | 8.8 | 44 |
| 2 | BK-1158-1 | 0 | 0 | 0 | 0 | 0 | 0.8 | 0 | 0 | 0.5 | 8.8 | 44 |
| 3 | BK-1158-2 | 0 | 0 | 0 | 0 | 1.2 | 0 | 0 | 0 | 0.5 | 8.8 | 45 |
| 4 | BK-1160-1 | 0 | 0 | 0 | 0 | 0 | 0 | 0.4 | 0 | 0.5 | 11.6 | 0 |
| 5 | BK-1162-1 | 0 | 0 | 0 | 0 | 0.4 | 0 | 0 | 0 | 0.5 | 11.6 | 0 |
| 6 | BK-1162-2 | 0 | 0 | 0 | 0 | 0.4 | 0 | 0 | 0 | 0.5 | 5.8 | 0 |
| 7 | BK-1162-3 | 0 | 0 | 0 | 0 | 0.4 | 0 | 0 | 0 | 0.5 | 7.8 | 0 |
| 8 | BK-1164-A | 0.7 | 0 | 0 | 0 | 0 | 0 | 0 | 0 | 0.5 | 8.8 | 45 |
| 9 | BK-1164-B | 0 | 0.6 | 0 | 0 | 0 | 0 | 0 | 0 | 0.5 | 8.8 | 45 |
| 10 | BK-1164-C | 0 | 0.6 | 0 | 0 | 0 | 0 | 0 | 0 | 0.5 | 8.8 | 45 |
| 11 | BK-1165-A | 0 | 0.6 | 0 | 0 | 0 | 0 | 0 | 0 | 0.5 | 8.8 | 45 |
| 12 | BK-1165-B | 0 | 0.4 | 0 | 0 | 0 | 0 | 0 | 0 | 1.3 | 5.8 | 38 |
| 13 | BK-1165-C | 0 | 0.6 | 0 | 0 | 0 | 0 | 0 | 0 | 0.5 | 7.8 | 0 |
| 14 | BK-1165-D | 0 | 0.6 | 0 | 0 | 0 | 0 | 0 | 0 | 0.5 | 8.8 | 45 |
| 15 | BK-1166 | 0 | 0.6 | 0 | 0 | 0 | 0 | 0 | 0 | 0.5 | 9.2 | 47 |
| 16 | BK-1168-A | 0 | 0 | 0 | 0.43 | 0 | 0 | 0 | 0 | 0.5 | 8.8 | 45 |
| 17 | BK-1168-B | 0 | 0 | 0 | 0.43 | 0 | 0 | 0 | 0.5[S] | a | 8.8 | 45 |
| 18 | BK-1168-C | 0 | 0 | 0 | 0.43 | 0 | 0 | 0 | 0.5 | a | 8.8 | 45 |
| 19 | BK-1170-A | 0 | 0.6 | 0 | 0 | 0 | 0 | 0 | 0 | 0.88 | 7.4 | 42 |
| 20 | BK-1170-B | 0 | 0.6 | 0 | 0 | 0.8 | 0 | 0 | 0 | 0.5 | 8.8 | 45 |
| 21 | BK-1170-C | 0 | 0.6 | 0 | 0.44 | 0 | 0 | 0 | 0.5 | a | 8.8 | 45 |
| 22 | BK-1170-D | 0 | 0.6 | 0 | 0.44 | 0 | 0 | 0 | 1.33 | a | 5.4 | 36 |
| 23 | BK-1171-A | 0 | 0.6 | 0 | 0 | 0 | 0 | 0 | 0 | 1.33 | 5.8 | 37 |
| 24 | BK-1171-B | 0 | 0.6 | 0 | 0 | 0 | 0 | 0 | 0 | 1.33 | 5.8 | 37 |
| 25 | BK-1171-C | 0.6 | 0 | 0 | 0 | 0 | 0 | 0 | 0 | 1.33 | 5.8 | 37 |
| 26 | BK-1171-D | 0 | 0.4 | 0 | 0 | 0 | 0 | 0 | 0 | 1.33 | 6.7 | 43 |
| 27 | BK-1171-E | 0 | 0.7 | 0 | 0 | 0 | 0 | 0 | 0 | 1.33 | 6.4 | 39 |
| 28 | BK-1171-F | 0 | 0.4 |  | 0 | 0 | 0 | 0 | 0 | 1.33 | 6.1 | 42 |
| 29 | BK-1172-A | 0 | 0.4 | 0 | 0 | 0 | 0 | 0 | 0 | 1.33 | 7.4 | 51 |
| 30 | BK-1172-B | 0 | 0.4 | 0 | 0 | 0 | 0 | 0 | 0 | 0.97 | 7.4 | 57 |
| 31 | BK-1172-C | 0 | 0.4 | 0 | 0 | 0 | 0 | 0 | 0 | 1.33 | 6.1 | 42 |
| 32 | BK-1172-D | 0 | 0.4 | 0 | 0 | 0 | 0 | 0 | 0 | 1.33 | 6.5 | 43 |
| 33 | BK-1173-A[T] | 0 | 0.4 | 0 | 0 | 0 | 0 | 0 | 0 | 0.67 | 6.5 | 53 |
| 34 | BK-1173-B[T] | 0 | 0.4 | 0 | 0 | 0 | 0 | 0 | 0 | 0.67 | 6.8 | 54 |
| 35 | BK-1173-C | 0 | 0.4 | 0 | 0 | 0 | 0 | 0 | 0 | 1 | 6.7 | 51 |
| 36 | BK-1173-D | 0 | 0.4 | 0 | 0 | 0 | 0 | 0 | 0 | 1 | 6.1 | 49 |
| 37 | BK-1174-A | 0.1 | 0.3 | 0 | 0 | 0 | 0 | 0 | 0 | 1.33 | 6.1 | 42 |
| 38 | BK-1174-B | 0.2 | 0.2 | 0 | 0 | 0 | 0 | 0 | 0 | 1.33 | 4.7 | 0 |
| 39 | BK-1174-C | 0.15 | 0.15 | 0 | 0 | 0 | 0 | 0 | 0 | 0.67 | 4.3 | 0 |
| 40 | BK-1174-D | 0.3 | 0.3 | 0 | 0 | 0 | 0 | 0 | 0 | 0.58 | 1.7 | 0 |
| 41 | BK-1174-E | 0.4 | 0.4 | 0 | 0 | 0 | 0 | 0 | 0 | 1.33 | 2.6 | 27 |
| 42 | BK-1175-A | 0.4 | 0.4 | 0 | 0 | 0 | 0 | 0 | 0 | 1.33 | 2.6 | 27 |
| 43 | BK-1176-A | 0 | 0 | 0 | 0 | 0 | 0 | 0.4 | 0 | 0.5 | 14.6 | 46 |
| 44 | BK-1176-B | 0 | 0 | 0 | 0 | 0 | 0 | 0.4 | 0 | 0.5 | 14.6 | 46 |
| 45 | BK-1176-C | 0 | 0 | 0 | 0 | 0 | 0 | 0.4 | 0 | 0.5 | 14.7 | 46 |
| 46 | BK-1176-D | 0 | 0 | 0 | 0 | 0 | 0 | 0 | 0 | 0.5 | 8.8 | 47 |
| 47 | BK-1177-A | 0 | 0 | 0 | 0 | 0 | 0 | 0 | 0 | 0.5 | 8.8 | 47 |
| 48 | BK-1177-B | 0 | 0 | 0 | 0 | 0 | 0 | 0.4 | 0 | 0.5 | 14.7 | 53 |
| 49 | BK-1177-C | 0 | 0 | 0 | 0 | 0 | 0 | 0.4 | 0 | 0.5 | 14.7 | 46 |
| 50 | BK-1177-D | 0 | 0 | 0 | 0 | 0 | 0 | 0.1 | 0 | 0.5 | 14.7 | 46 |
| 51 | BK-1177-E | 0 | 0 | 0 | 0 | 0 | 0 | 0.15 | 0 | 0.5 | 14.7 | 46 |
| 52 | BK-1177-F | 0 | 0 | 0 | 0 | 0 | 0 | 0.15 | 0 | 0.5 | 8.8 | 47 |
| 53 | BK-1178-A | 0 | 0 | 0 | 0 | 0 | 0 | 0 | 0 | 0.5 | 8.8 | 47 |
| 54 | BK-1179-A | 0 | 0.4 | 0 | 0 | 0 | 0 | 0.1 | 0 | 0.5 | 8.8 | 47 |
| 55 | BK-1179-B | 0 | 0.41 | 0 | 0 | 0 | 0 | 0.11 | 0 | 0.5 | 9.3 | 50 |
| 56 | BK-1179-C | 0 | 0.2 | 0 | 0 | 0 | 0 | 0.1 | 0 | 0.5 | 8.8 | 46 |
| 57 | BK-1179-D | 0 | 0.3 | 0 | 0 | 0 | 0 | 0.1 | 0 | 1 | 8.8 | 41 |
| 58 | BK-1179-E | 0 | 0.4 | 0 | 0 | 0 | 0 | 0.1 | 0 | 3 | 8.8 | 29 |
| 59 | BK-1179-F | 0 | 0.3 | 0 | 0 | 0 | 0 | 0.1 | 0 | 1.5 | 8.8 | 38 |
| 60 | BK-1180-A | 0 | 0.3 | 0 | 0 | 0 | 0 | 0.1 | 0 | 1.5 | 8.8 | 38 |
| 61 | BK-1180-B | 0 | 0.3 | 0 | 0 | 0 | 0 | 0.1 | 0 | 1.5 | 8.8 | 37 |
| 62 | BK-1180-C | 0 | 0.3 | 0 | 0 | 0 | 0 | 0.1 | 0 | 1 | 8.8 | 41 |
| 63 | BK-1180-D | 0 | 0 | 0 | 0 | 0 | 0 | 0.40 | 0 | 0.5 | 8.8 | 47 |
| 64 | BK-1180-E | 0 | 0 | 0 | 0 | 0 | 0 | 0.40 | 0 | 1.5 | 8.8 | 38 |
| 65 | BK-1181-A | 0 | 0.3 | 0 | 0 | 0 | 0 | 0.1 | 0 | 1.5 | 8.8 | 0 |
| 66 | BK-1181-B | 0 | 0 | 0 | 0 | 0 | 0 | 0.2 | 0 | 0.96 | 5.7 | 0 |
| 67 | BK-1181-C | 0 | 0 | 0 | 0 | 0 | 0 | 0.4 | 0 | 1.25 | 8.8 | 40 |
| 68 | BK-1181-D | 0 | 0 | 0 | 0 | 0 | 0 | 0.4 | 0 | 1.5 | 8.8 | 38 |
| 69 | BK-1182-A | 0 | 0 | 0 | 0 | 0 | 0 | 0.4 | 0 | 1.5 | 7.9 | 0 |
| 70 | BK-1182-B | 0 | 0 | 0 | 0 | 0 | 0 | 0.3 | 0 | 1.83 | 7.6 | 0 |
| 71 | BK-1183-A[W] | 0 | 0 | 0 | 0 | 0 | 0 | 0.02 | 0 | 0 | 5.0 | 0 |
| 72 | BK-1183-B | 0 | 0 | 0 | 0 | 0 | 0 | 0.04 | 0 | 0.8 | 5.4 | 63 |
| 73 | BK-1184-A | 0 | 0 | 0 | 0 | 0 | 0 | 0.04 | 0 | 0.8 | 5.6 | 41 |

TABLE 4-continued

Free Rise Foam Data

| Run | Code | | | | | | | | | | | |
|---|---|---|---|---|---|---|---|---|---|---|---|---|
| 74 | BK-1184-B | 0 | 0 | 0 | 0 | 0 | 0 | 0.23 | 0 | 0.8 | 5.6 | 41 |
| 75 | BK-1184-D[X] | 0 | 0 | 0 | 0 | 0 | 0 | 0.04 | 0 | 0.8 | 5.4 | 40 |
| 76 | BK-1184-E[X] | 0 | 0 | 0 | 0 | 0 | 0 | 0.23 | 0 | 0.8 | 5.3 | 41 |
| 77 | BK-1185-A[X,Y] | 0 | 0 | 0 | 0 | 0 | 0 | 0.02 | 0 | 0 | 6.8 | 34 |
| 78 | BK-1185-B[X,Y] | 0 | 0 | 0 | 0 | 0 | 0 | 0.04 | 0 | 0.8 | 6.8 | 29 |
| 79 | BK-1186-A | 0 | 0 | 0 | 0 | 0 | 0 | 0.4 | 0 | 1.29 | 8.8 | 42 |
| 80 | BK-1186-B | 0 | 0 | 0 | 0 | 0 | 0 | 0.4 | 0 | 0.69 | 8.8 | 45 |
| 81 | BK-1186-C | 0 | 0 | 0 | 0 | 0 | 0 | 0.4 | 0 | 0.69 | 8.8 | 45 |
| 82 | BK-1186-D | 0 | 0 | 0 | 0 | 0 | 0 | 0.03 | 0 | 0.69 | 7.8 | 0 |
| 83 | BK-1186-E | 0 | 0 | 0 | 0 | 0 | 0 | 0.03 | 0 | 0.69 | 2.6 | 0 |
| 84 | BK-1187-A | 0 | 0 | 0 | 0 | 0 | 0 | 0.4 | 0 | 1.01 | 8.8 | 42 |
| 85 | BK-1187-B | 0 | 0 | 0 | 0 | 0 | 0 | 0.4 | 0 | 1.5 | 8.8 | 38 |
| 86 | BK-1187-C | 0 | 0 | 0 | 0 | 0 | 0 | 0.40 | 0 | 0.5 | 8.8 | 45 |
| 87 | BK-1188-A[AA] | 0 | 0 | 0 | 0 | 0 | 0 | 0.40 | 0 | 0.5 | 8.8 | 45 |
| 88 | BK-1188-B[AA] | 0 | 0 | 0 | 0 | 0 | 0 | 0.40 | 0 | 0.5 | 8.8 | 45 |
| 89 | BK-1188-C[AA] | 0 | 0 | 0 | 0 | 0 | 0 | 0.40 | 0 | 0.5 | 8.8 | 45 |
| 90 | BK-1189-1 | 0 | 0.4 | 0 | 0 | 0 | 0 | 0.00 | 0 | 1.33 | 6.1 | 42 |
| 91 | BK-1189-2 | 0.1 | 0.3 | 0 | 0 | 0 | 0 | 0.00 | 0 | 1.33 | 6.1 | 42 |
| 92 | BK-1190-1 | 0 | 0 | 0 | 0 | 0 | 0 | 0.23 | 0 | 0.8 | 5.3 | 41 |
| 93 | BK-1190-2 | 0 | 0 | 0 | 0 | 0 | 0 | 0.40 | 0 | 0.5 | 8.1 | 44 |
| 94 | BK-1190-3 | 0 | 0 | 0 | 0 | 0 | 0 | 0.30 | 0 | 0.5 | 6.6 | 28 |
| 95 | BK-1190-4 | 0 | 0 | 0 | 0 | 0 | 0 | 0.40 | 0 | 0.5 | 10.0 | 47 |
| 96 | BK-1198-2 | 0 | 0 | 0 | 0 | 0 | 0 | 0.00 | 0 | 0 | 13.4 | 50 |
| 97 | BK-1198-3 | 0 | 0 | 0 | 0 | 0 | 0 | 0.00 | 0 | 0 | 13.4 | 50 |
| 98 | BK-1199-6 | 0 | 0 | 0.6 | 0 | 0 | 0 | 0.00 | 0 | 0.5 | 8.8 | 45 |
| 99 | BK-11101-2 | 0 | 0 | 0.22 | 0 | 0 | 0 | 0.00 | 0 | 0.5 | 9.2 | 45 |
| 100 | BK-11102-5 | 0 | 0 | 0.4 | 0 | 0 | 0 | 0.00 | 0 | 0.5 | 8.8 | 45 |
| 101 | BK-11103-5 | 0 | 0 | 0 | 0 | 0 | 0 | 0.40 | 0 | 1.38 | 9.1 | 42 |
| 102 | BK-11103-4 | 0 | 0 | 0 | 0 | 0 | 0 | 0.40 | 0 | 1.38 | 8.8 | 41 |
| 103 | BK-11103-7 | 0 | 0 | 0 | 0 | 0 | 0 | 0.40 | 0 | 1.29 | 8.8 | 46 |
| 104 | BK-1201-5 | 0 | 0 | 0 | 0 | 0 | 0 | 0 | 0 | 0.5 | 8.8 | 45 |
| 105 | BK-1201-6 | 0 | 0 | 0 | 0 | 0 | 0 | 0 | 0 | 0.5 | 8.8 | 45 |
| 106 | BK-1201-1 | 0 | 0 | 0 | 0 | 0 | 0 | 0 | 0 | 0.5 | 5.0 | 0 |
| 107 | BK-1201-2 | 0 | 0 | 0 | 0 | 0 | 0 | 0 | 0 | 0.5 | 5.0 | 0 |
| 108 | BK-1201-3 | 0 | 0 | 0 | 0 | 0 | 0 | 0 | 0 | 0.5 | 5.0 | 0 |
| 109 | BK-1201-4 | 0 | 0 | 0 | 0 | 0 | 0 | 0 | 0 | 1 | 5.0 | 0 |
| 110 | BK-1201-7 | 0 | 0 | 0 | 0 | 0 | 0 | 0 | 0 | 1 | 5.0 | 0 |
| 111 | BK-1203-1 | 0 | 0 | 0 | 0.8 | 0 | 0 | 0 | 0 | 0.5 | 8.8 | 45 |
| 112 | BK-1203-2 | 0 | 0 | 0 | 0.8 | 0 | 0 | 0 | 0 | 0.5 | 8.8 | 45 |
| 113 | BK-1203-3 | 0 | 0 | 0 | 0 | 0 | 0 | 0.64 | 0 | 2.14 | 8.8 | 38 |
| 114 | BK-1203-4 | 0 | 0 | 0 | 0 | 0 | 0 | 0.64 | 0 | 2.14 | 8.8 | 38 |

| Run | Code | TDI[J] Index | MDI[J] Index | ED900/HDI mol ratio | TEGOPREN[K] (g) | Dabco 33LV[L] (g) | Dabco BL-11[M] (g) | Dabco-T9[CC] (g) | Dabco DC-198[N] (g) | PEG-900-monooleate (g) |
|---|---|---|---|---|---|---|---|---|---|---|
| 1 | BK-1157-2 | 0 | 0 | 0.24 | 0 | 0 | 0 | 0 | 0 | 0 |
| 2 | BK-1158-1 | 0 | 0 | 0.24 | 0 | 0 | 0 | 0 | 0 | 0 |
| 3 | BK-1158-2 | 0 | 0 | 0.24 | 0 | 0 | 0 | 0 | 0 | 0 |
| 4 | BK-1160-1 | 0 | 44 | | 0 | 0 | 0 | 0 | 0 | 0 |
| 5 | BK-1162-1 | 0 | 44 | | 0 | 0 | 0 | 0 | 0 | 0 |
| 6 | BK-1162-2 | 0 | 22 | | 0 | 0 | 0 | 0 | 0 | 0 |
| 7 | BK-1162-3 | 0 | 30 | | 0.07 | 0 | 0 | 0 | 0 | 0 |
| 8 | BK-1164-A | 0 | 0 | 0.24 | 0 | 0 | 0 | 0 | 0 | 0 |
| 9 | BK-1164-B | 0 | 0 | 0.24 | 0 | 0 | 0 | 0 | 0 | 0 |
| 10 | BK-1164-C | 0 | 0 | 0.24 | 0 | 0 | 0 | 0 | 0 | 0 |
| 11 | BK-1165-A | 0 | 0 | 0.24 | 0 | 0 | 0 | 0 | 0 | 0 |
| 12 | BK-1165-B | 0 | 0 | 0.37 | 0 | 0 | 0 | 0 | 0 | 0 |
| 13 | BK-1165-C | 0 | 30 | | 0 | 0 | 0 | 0 | 0 | 0 |
| 14 | BK-1165-D | 0 | 0 | 0.24 | 0.07[R] | 0 | 0 | 0 | 0 | 0 |
| 15 | BK-1166 | 0 | 0 | 0.23 | 0 | 0 | 0 | 0 | 0 | 0 |
| 16 | BK-1168-A | 0 | 0 | 0.24 | 0 | 0 | 0 | 0 | 0 | 0 |
| 17 | BK-1168-B | 0 | 0 | 0.24 | 0 | 0 | 0 | 0 | 0 | 0 |
| 18 | BK-1168-C | 0 | 0 | 0.24 | 0 | 0 | 0 | 0 | 0 | 0 |
| 19 | BK-1170-A | 0 | 0 | 0.29 | 0 | 0 | 0 | 0 | 0 | 0 |
| 20 | BK-1170-B | 0 | 0 | 0.24 | 0 | 0 | 0 | 0 | 0 | 0 |
| 21 | BK-1170-C | 0 | 0 | 0.24 | 0 | 0 | 0 | 0 | 0 | 0 |
| 22 | BK-1170-D | 0 | 0 | 0.40 | 0 | 0 | 0 | 0 | 0 | 0 |
| 23 | BK-1171-A | 0 | 0 | 0.00 | 0 | 0 | 0 | 0 | 0 | 0 |
| 24 | BK-1171-B | 0 | 0 | 0.00 | 0 | 0 | 0 | 0 | 0 | 0 |
| 25 | BK-1171-C | 0 | 0 | 0.00 | 0 | 0 | 0 | 0 | 0 | 0 |
| 26 | BK-1171-D | 0 | 0 | 0.00 | 0 | 0 | 0 | 0 | 0 | 0 |
| 27 | BK-1171-E | 0 | 0 | 0.34 | 0 | 0 | 0 | 0 | 0 | 0 |
| 28 | BK-1171-F | 0 | 0 | 0.12 | 0 | 0 | 0 | 0 | 0 | 0 |
| 29 | BK-1172-A | 0 | 0 | 0.10 | 0 | 0 | 0 | 0 | 0 | 0 |

TABLE 4-continued

Free Rise Foam Data

| | Name | | | | | | | | | |
|---|---|---|---|---|---|---|---|---|---|---|
| 30 | BK-1172-B | 0 | 0 | 0.10 | 0 | 0 | 0 | 0 | 0 | 0 |
| 31 | BK-1172-C | 0 | 0 | 0.12 | 0.04$^R$ | 0 | 0 | 0 | 0 | 0 |
| 32 | BK-1172-D | 0 | 0 | 0.11 | 0 | 0 | 0 | 0 | 0 | 0 |
| 33 | BK-1173-A$^T$ | 0 | 0 | 0.11 | 0 | 0 | 0 | 0 | 0 | 0 |
| 34 | BK-1173-B$^T$ | 0 | 0 | 0.00 | 0 | 0 | 0 | 0 | 0 | 0 |
| 35 | BK-1173-C | 0 | 0 | 0.11 | 0 | 0 | 0 | 0 | 0 | 0 |
| 36 | BK-1173-D | 0 | 0 | 0.35 | 0 | 0 | 0 | 0 | 0 | 0 |
| 37 | BK-1174-A | 0 | 0 | 0.12 | 0 | 0 | 0 | 0 | 0 | 0 |
| 38 | BK-1174-B | 36 | 0 | | 0 | 0 | 0 | 0 | 0 | 0 |
| 39 | BK-1174-C | 44 | 0 | | 0 | 0 | 0 | 0 | 0 | 0 |
| 40 | BK-1174-D | 34 | 0 | | 0 | 0 | 0 | 0 | 0 | 0 |
| 41 | BK-1174-E | 0 | 0 | 0.28 | 0 | 0 | 0 | 0 | 0 | 0 |
| 42 | BK-1175-A | 0 | 0 | 0.28 | 0 | 0 | 0 | 0 | 0 | 0 |
| 43 | BK-1176-A | 0 | 0 | 0.05 | 0 | 0 | 0 | 0 | 0 | 0 |
| 44 | BK-1176-B | 0 | 0 | 0.05 | 0 | 0 | 0 | 0 | 0 | 0 |
| 45 | BK-1176-C | 0 | 0 | 0.05 | 0 | 0.44 | 0 | 0 | 0 | 0 |
| 46 | BK-1176-D | 0 | 0 | 0.24 | 0 | 0.3 | 0.1 | 0 | 0 | 0 |
| 47 | BK-1177-A | 0 | 0 | 0.24 | 0 | 0.3 | 0 | 0 | 0 | 0 |
| 48 | BK-1177-B | 0 | 0 | 0.05 | 0 | 0.3 | 0 | 0 | 0.22 | 0 |
| 49 | BK-1177-C | 0 | 0 | 0.05 | 0 | 0.3 | 0 | 0 | 0.22 | 0 |
| 50 | BK-1177-D | 0 | 0 | 0.05 | 0 | 0.3 | 0 | 0 | 0.22 | 0 |
| 51 | BK-1177-E | 0 | 0 | 0.05 | 0 | 0.1 | 0 | 0 | 0.22 | 0 |
| 52 | BK-1177-F | 0 | 0 | 0.24 | 0 | 0.15 | 0 | 0 | 0 | 0 |
| 53 | BK-1178-A | 0 | 0 | 0.24 | 0 | 0.06 | 0 | 0 | 0 | 0 |
| 54 | BK-1179-A | 0 | 0 | 0.24 | 0 | 0 | 0 | 0 | 0 | 0 |
| 55 | BK-1179-B | 0 | 0 | 0.23 | 0 | 0 | 0 | 0 | 0 | 0 |
| 56 | BK-1179-C | 0 | 0 | 0.24 | 0 | 0 | 0 | 0 | 0 | 0 |
| 57 | BK-1179-D | 0 | 0 | 0.24 | 0 | 0 | 0 | 0 | 0 | 0 |
| 58 | BK-1179-E | 0 | 0 | 0.24 | 0 | 0 | 0 | 0 | 0 | 0 |
| 59 | BK-1179-F | 0 | 0 | 0.24 | 0 | 0 | 0 | 0 | 0.21 | 0 |
| 60 | BK-1180-A | 0 | 0 | 0.24 | 0 | 0 | 0 | 0 | 0.1 | 0 |
| 61 | BK-1180-B | 0 | 0 | 0.24 | 0 | 0 | 0 | 0 | 0 | 0 |
| 62 | BK-1180-C | 0 | 0 | 0.24 | 0 | 0 | 0.1 | 0 | 0 | 0 |
| 63 | BK-1180-D | 0 | 0 | 0.24 | 0 | 0 | 0 | 0 | 0 | 0 |
| 64 | BK-1180-E | 0 | 0 | 0.24 | 0 | 0 | 0 | 0 | 0 | 0 |
| 65 | BK-1181-A | 34 | 0 | | 0 | 0 | 0 | 0 | 0.17 | 0 |
| 66 | BK-1181-B | 16 | 0 | | 0 | 0 | 0 | 0 | 0.26 | 0 |
| 67 | BK-1181-C | 0 | 0 | 0.24 | 0 | 0.1 | 0 | 0 | 0 | 0 |
| 68 | BK-1181-D | 0 | 0 | 0.24 | 0 | 0 | 0.1 | 0 | 0 | 0 |
| 69 | BK-1182-A | 39 | 0 | | 0 | 0 | 0 | 0 | 0.2 | 0 |
| 70 | BK-1182-B | 37 | 0 | | 0 | 0 | 0 | 0 | 0.2 | 0 |
| 71 | BK-1183-A$^W$ | 28 | 0 | | 0 | 0.03 | 0 | 0 | 0 | 0 |
| 72 | BK-1183-B | 0 | 0 | 0.11 | 0 | 0.05 | 0 | 0 | 0 | 0 |
| 73 | BK-1184-A | 0 | 0 | 0.11 | 0 | 0.05 | 0 | 0 | 0 | 0 |
| 74 | BK-1184-B | 0 | 0 | 0.11 | 0 | 0.03 | 0 | 0 | 0 | 0 |
| 75 | BK-1184-D$^X$ | 0 | 0 | 0.11 | 0 | 0.05 | 0 | 0 | 0 | 0 |
| 76 | BK-1184-E$^X$ | 0 | 0 | 0.11 | 0 | 0 | 0 | 0 | 0 | 0 |
| 77 | BK-1185-A$^{X,Y}$ | 0 | 0 | 0.03 | 0 | 0.03 | 0 | 0 | 0 | 0 |
| 78 | BK-1185--B$^{X,Y}$ | 0 | 0 | 0.03 | 0 | 0.08 | 0 | 0 | 0 | 0.13 |
| 79 | BK-1186-A | 0 | 0 | 0.24 | 0 | 0 | 0 | 0 | 0 | 0 |
| 80 | BK-1186-B | 0 | 0 | 0.24 | 0 | 0 | 0 | 0 | 0 | 0 |
| 81 | BK-1186-C | 0 | 0 | 0.24 | 0 | 0.06 | 0 | 0 | 0 | 0 |
| 82 | BK-1186-D | 45 | 0 | | 0 | 0.08 | 0 | 0 | 0 | 0 |
| 83 | BK-1186-E | 15 | 0 | | 0 | 0.08 | 0 | 0 | 0 | 0 |
| 84 | BK-1187-A | 0 | 0 | 0.24 | 0 | 0 | 0 | 0 | 0 | 0 |
| 85 | BK-1187-B | 0 | 0 | 0.24 | 0 | 0 | 0 | 0 | 0 | 0 |
| 86 | BK-1187-C | 0 | 0 | 0.24 | 0 | 0 | 0 | 0 | 0 | 0 |
| 87 | BK-1188-A$^{AA}$ | 0 | 0 | 0.24 | 0 | 0 | 0 | 0 | 0 | 0 |
| 88 | BK-1188-B$^{AA}$ | 0 | 0 | 0.24 | 0 | 0 | 0 | 0 | 0 | 0 |
| 89 | BK-1188-C$^{AA}$ | 0 | 0 | 0.24 | 0 | 0 | 0 | 0 | 0 | 0 |
| 90 | BK-1189-1 | 0 | 0 | 0.12 | 0 | 0 | 0 | 0 | 0 | 0 |
| 91 | BK-1189-2 | 0 | 0 | 0.12 | 0 | 0 | 0 | 0 | 0 | 0 |
| 92 | BK-1190-1 | 0 | 0 | 0.11 | 0 | 0 | 0 | 0 | 0 | 0 |
| 93 | BK-1190-2 | 0 | 0 | 0.04 | 0 | 0 | 0.09 | 0 | 0 | 0 |
| 94 | BK-1190-3 | 0 | 0 | 0.03 | 0 | 0 | 0.07 | 0 | 0 | 0 |
| 95 | BK-1190-4 | 0 | 0 | 0.04 | 0 | 0 | 0 | 0 | 0 | 0 |
| 96 | BK-1198-2 | 0 | 0 | 0.07 | 0 | 0.1 | 0 | 0.06 | 0 | 0 |
| 97 | BK-1198-3 | 0 | 0 | 0.07 | 0 | 0.11 | 0 | 0.08 | 0 | 0.22 |
| 98 | BK-1199-6 | 0 | 0 | 0.24 | 0 | 0 | 0 | 0 | 0 | 0 |
| 99 | BK-11101-2 | 0 | 0 | 0.23 | 0 | 0.1 | 0 | 0 | 0 | 0 |
| 100 | BK-11102-5 | 0 | 0 | 0.24 | 0 | 0.1 | 0 | 0 | 0 | 0 |
| 101 | BK-11103-5 | 0 | 0 | 0.24 | 0 | 0 | 0 | 0 | 0 | 0 |
| 102 | BK-11103-4 | 0 | 0 | 0.24 | 0 | 0 | 0 | 0 | 0 | 0 |
| 103 | BK-11103-7 | 0 | 0 | 0.24 | 0 | 0 | 0 | 0 | 0 | 0 |
| 104 | BK-1201-5 | 0 | 0 | 0.24 | 0 | 0.1 | 0 | 0 | 0 | 0 |
| 105 | BK-1201-6 | 0 | 0 | 0.24 | 0 | 0.1 | 0 | 0 | 0 | 0 |
| 106 | BK-1201-1 | 29 | 0 | | 0 | 0.1 | 0 | 0.06 | 0 | 0 |
| 107 | BK-1201-2 | 29 | 0 | | 0 | 0.1 | 0 | 0 | 0 | 0 |

TABLE 4-continued

Free Rise Foam Data

| | | | | | | | | | | |
|---|---|---|---|---|---|---|---|---|---|---|
| 108 | BK-1201-3 | 29 | 0 | | 0 | 0.1 | 0 | 0 | 0 | 0.2 |
| 109 | BK-1201-4 | 26 | 0 | | 0 | 0.1 | 0 | 0 | 0 | 0 |
| 110 | BK-1201-7 | 26 | 0 | | 0 | 0.1 | 0 | 0 | 0 | 0 |
| 111 | BK-1203-1 | 0 | 0 | 0.24 | 0 | 0 | 0 | 0.06 | 0 | 0 |
| 112 | BK-1203-2 | 0 | 0 | 0.24 | 0 | 0 | 0 | 0.06 | 0 | 0 |
| 113 | BK-1203-3 | 0 | 0 | 0.24 | 0 | 0 | 0 | 0 | 0 | 0 |
| 114 | BK-1203-4 | 0 | 0 | 0.24 | 0 | 0 | 0 | 0 | 0 | 0 |

| Run | Code | Temp ° C. | density (g/cm$^3$) | Resiliency | Water Dispersibility | Beaker or Dish$^Z$ |
|---|---|---|---|---|---|---|
| 1 | BK-1157-2 | rt | | | | B |
| 2 | BK-1158-1 | rt | | | | B |
| 3 | BK-1158-2 | 60 | | | | D |
| 4 | BK-1160-1 | 40 | | | | B |
| 5 | BK-1162-1 | 40 | | | | B |
| 6 | BK-1162-2 | 40 | | | | B |
| 7 | BK-1162-3 | 50 | | | | B |
| 8 | BK-1164-A | rt | | | | B |
| 9 | BK-1164-B | rt | | | | B |
| 10 | BK-1164-C | 60 | | | | D |
| 11 | BK-1165-A | 60 | | | | D |
| 12 | BK-1165-B | 60 | | | | D |
| 13 | BK-1165-C | 60 | | | | B |
| 14 | BK-1165-D | 60 | | | | B |
| 15 | BK-1166 | 60 | | | | D |
| 16 | BK-1168-A | 60 | | | | B |
| 17 | BK-1168-B | 60 | | | | B |
| 18 | BK-1168-C | 60 | | | | B |
| 19 | BK-1170-A | 60 | | | | D |
| 20 | BK-1170-B | rt | | | | B |
| 21 | BK-1170-C | 60 | | | | B |
| 22 | BK-1170-D | 60 | | | | B |
| 23 | BK-1171-A | 60 | | | | B |
| 24 | BK-1171-B | 60 | | | | B |
| 25 | BK-1171-C | rt | | | | B |
| 26 | BK-1171-D | 60 | | | | B |
| 27 | BK-1171-E | rt | | | | B |
| 28 | BK-1171-F | rt | | | | B |
| 29 | BK-1172-A | rt | | | | B |
| 30 | BK-1172-B | rt | | | | B |
| 31 | BK-1172-C | rt | | | | B |
| 32 | BK-1172-D | rt | | | | B |
| 33 | BK-1173-A$^T$ | rt | | | | B |
| 34 | BK-1173-B$^T$ | rt | | | | B |
| 35 | BK-1173-C | rt | | | | B |
| 36 | BK-1173-D | rt | | | | D |
| 37 | BK-1174-A | rt | | | | D |
| 38 | BK-1174-B | rt | | | | B |
| 39 | BK-1174-C | rt | | | | B |
| 40 | BK-1174-D | rt | | | | B |
| 41 | BK-1174-E | rt | | | | D |
| 42 | BK-1175-A | rt | | | | D |
| 43 | BK-1176-A | rt | | | | D |
| 44 | BK-1176-B | rt | | | | D |
| 45 | BK-1176-C | rt | | | | D |
| 46 | BK-1176-D | rt | | | | D |
| 47 | BK-1177-A | rt | | | | B |
| 48 | BK-1177-B | rt | | | | D |
| 49 | BK-1177-C | rt | | | | D |
| 50 | BK-1177-D | rt | | | | D |
| 51 | BK-1177-E | rt | | | | B |
| 52 | BK-1177-F | rt | | | | B |
| 53 | BK-1178-A | rt | | | | B |
| 54 | BK-1179-A | rt | | | | D |
| 55 | BK-1179-B | rt | | | | D |
| 56 | BK-1179-C | rt | | | | D |
| 57 | BK-1179-D | rt | | | | D |
| 58 | BK-1179-E | rt | | | | D |
| 59 | BK-1179-F | rt | | | | D |
| 60 | BK-1180-A | rt | | | | D |
| 61 | BK-1180-B | rt | | | | D |
| 62 | BK-1180-C | rt | | | | D |
| 63 | BK-1180-D | rt | | | | B |
| 64 | BK-1180-E | rt | 0.08 | good | good | B |
| 65 | BK-1181-A | rt | | | | B |
| 66 | BK-1181-B | rt | | | | D |
| 67 | BK-1181-C | rt | | | | D |

TABLE 4-continued

Free Rise Foam Data

| | | | | | | |
|---|---|---|---|---|---|---|
| 68 | BK-1181-D | rt | | | | D |
| 69 | BK-1182-A | rt | | | | B |
| 70 | BK-1182-B | rt | | | | B |
| 71 | BK-1183-A$^W$ | rt | 0.06 | poor | poor | B |
| 72 | BK-1183-B | rt | | | | D |
| 73 | BK-1184-A | rt | | | | D |
| 74 | BK-1184-B | rt | | | | D |
| 75 | BK-1184-D$^X$ | rt | | | | D |
| 76 | BK-1184-E$^X$ | rt | | | | D |
| 77 | BK-1185-A$^{X,Y}$ | rt | | fair | poor | B |
| 78 | BK-1185--B$^{X,Y}$ | rt | | | | B |
| 79 | BK-1186-A | rt | | | | D |
| 80 | BK-1186-B | rt | N/A | fair | good | D |
| 81 | BK-1186-C | rt | N/A | poor | poor | D |
| 82 | BK-1186-D | rt | | | | B |
| 83 | BK-1186-E | rt | | | | B |
| 84 | BK-1187-A | rt | | | | D |
| 85 | BK-1187-B | rt | | | | D |
| 86 | BK-1187-C | rt | | | | D |
| 87 | BK-1188-A$^{AA}$ | rt | 0.10 | good | fair | B |
| 88 | BK-1188-B$^{AA}$ | rt | | | | D |
| 89 | BK-1188-C$^{AA}$ | 60 | 0.11 | good/fair | good | D |
| 90 | BK-1189-1 | 60 | | | | D |
| 91 | BK-1189-2 | 60 | | | | D |
| 92 | BK-1190-1 | 60 | | | | D |
| 93 | BK-1190-2 | 60 | | | | D |
| 94 | BK-1190-3 | 60 | | | | D |
| 95 | BK-1190-4 | 60 | | | | D |
| 96 | BK-1198-2 | 60 | | | | D |
| 97 | BK-1198-3 | 60 | | | | D |
| 98 | BK-1199-6 | 60 | | good | poor | D |
| 99 | BK-11101-2 | rt | N/A | N/A | N/A | B |
| 100 | BK-11102-5 | 60 | 0.06 | good | good | D |
| 101 | BK-11103-5 | rt | 0.09 | good | poor | B |
| 102 | BK-11103-4 | 60 | 0.22 | good | poor | D |
| 103 | BK-11103-7 | rt | 0.10 | good | poor | B |
| 104 | BK-1201-5 | rt | N/A | N/A | N/A | B |
| 105 | BK-1201-6 | 60 | N/A | N/A | N/A | D |
| 106 | BK-1201-1 | rt | N/A | N/A | N/A | B |
| 107 | BK-1201-2 | rt | N/A | N/A | N/A | B |
| 108 | BK-1201-3 | rt | N/A | N/A | N/A | B |
| 109 | BK-1201-4 | rt | N/A | N/A | N/A | B |
| 110 | BK-1201-7 | 60 | N/A | N/A | N/A | D |
| 111 | BK-1203-1 | rt | N/A | N/A | N/A | B |
| 112 | BK-1203-2 | 60 | N/A | N/A | N/A | D |
| 113 | BK-1203-3 | rt | N/A | N/A | N/A | B |
| 114 | BK-1203-4 | 60 | N/A | N/A | N/A | D |

$^A$Karo-brand Light Corn Syrup unless otherwise noted.
$^B$Glycerol ethoxylate (EO = 20 moles) -- Aldrich
$^C$Sorbitol ethoxylate (EO = 20 moles) -- Ethox Chemicals, LLC.
$^D$Triethanolamine
$^E$Bismuth neodecanoate/Zinc octoate catalyst (BiCAT 8) or Bismuth neodecanoate (BiCAT 8106) catalyst -- Shepherd Chemicals
$^F$Titanium based catalyst -- Kenrich Petrochemicals
$^G$Experimental titanium based catalyst -- Proprietary
$^H$Dibutyltindilaurate -- Aldrich
$^I$Alpha-olefin sulfonate in water (conc = 1.58% unless otherwise noted)
$^J$Hexanediisocyanate (HDI); Toluene diisocyanate (TDI); Methylene-bis-(4-phenylisocyanate) (MDI) -- Aldrich; index = (total moles NCO/sum of total moles OH and NH2 and water in formulation) × 100%.
$^K$PEG substituted silicone surfactant: TEGOPREN 5843 (Degussa) unless otherwise noted.
$^L$Triethylenediamine -- Air Products
$^M$Bis-dimethylaminoethylether -- Air Products
$^N$Silicone surfactant -- Air Products
$^O$Triethylamine
$^P$2,2,6,6-tetramethylpiperidine
$^R$TEGOPREN 5830
$^S$0.6 wt % solution of AOS was used.
$^T$1.10 mL (12 mol % of total added NCO groups) 40 wt % glyoxal -- Aldrich
$^U$ADM Corn 42/43 Syrup -- Archer Daniels Midland Company
$^V$Polyetheramine XTJ-501 -- Huntsman Corporation
$^W$The TDI and ED900 were added as a pre-formed adduct (17 wt % ED900 and 83 wt % TDI) made by adding ED900 dropwise to a stirred solution of TDI in acetone followed by un vacuo removal of acetone.
$^X$The HDI and ED900 were added as a pre-formed adduct (37 wt % ED900 and 63 wt % HDI) made by adding ED900 dropwise to a stirred solution of HDI in acetone, stirring 3 hr, followed by un vacuo removal of HDI.
$^Y$The HDI/ED900 adduct was spiked with extra HDI to achieved indicated HDI dosage.
$^Z$The composition was either left in the beaker to develop or poured into a dish (bath or larger beaker) to develop @ indicated temperature.
$^{AA}$Care was taken to combine ingredients in the order: glycerin, corn syrup, ED900, PEG400, water, DBTDL, HDI.
$^{BB}$Low acid bismuth neodecanoate catalyst -- Vertellus.
$^{CC}$Stannous octoate -- Air Products

TABLE 5

Free Rise Foam Data

| Run[A] | Code | Grams | | | | | | | | | | |
|---|---|---|---|---|---|---|---|---|---|---|---|---|
| | | Glycerol | Corn Syrup[B] | ED-900[C] | ED-600[D] | ED-2003[E] | PEG-400 | PEG-200 | PEG-600 | PEG-1000 | DABCO® T-9[F] | DABCO® 33LV[G] |
| 0 | Control | | | | | | | | | | | |
| 1 | BK-1204-1-1 | 1.88 | 4.3 | 0 | 12 | 0 | 4 | 0 | 0 | 0 | 0 | 0 |
| 2 | BK-1204-8 | 1.88 | 4.3 | 0 | 12 | 0 | 4 | 0 | 0 | 0 | 0.06 | 0.1 |
| 3 | BK-1204-2 | 1.88 | 4.3 | 0 | 12 | 0 | 4 | 0 | 0 | 0 | 0.06 | 0.1 |
| 4 | BK-1205-6 | 1.88 | 4.3 | 0 | 12 | 0 | 0 | 0 | 4 | 0 | 0.06 | 0.1 |
| 5 | BK-1206-1 | 1.88 | 4.3 | 0 | 12 | 0 | 4 | 0 | 0 | 0 | 0.06 | 0.1 |
| 6 | BK-1206-5 | 1.88 | 4.3 | 0 | 7.22 | 0 | 4.13 | 0 | 0 | 0 | 0 | 0 |
| 7 | BK-1206-6 | 1.88 | 4.3 | 0 | 7.22 | 0 | 0 | 0 | 0 | 10.33 | 0 | 0 |
| 8 | BK-1205-3 | 1.88 | 4.3 | 12 | 0 | 0 | 4 | 0 | 0 | 0 | 0 | 0 |
| 9 | BK-1205-4 | 1.88 | 4.3 | 12 | 0 | 0 | 0 | 0 | 4 | 0 | 0 | 0 |
| 10 | BK-1205-5 | 1.88 | 4.3 | 12 | 0 | 0 | 0 | 4 | 0 | 0 | 0 | 0 |
| 11 | BK-1206-2 | 1.88 | 4.3 | 12 | 0 | 0 | 4 | 0 | 0 | 0 | 0 | 0 |
| 12 | BK-1204-10 | 1.88 | 4.3 | 0 | 0 | 3 | 8.58 | 0 | 4.42 | 0 | 0 | 0 |
| 13[T] | BK-1206-3 | 1.88 | 4.3 | 0 | 0 | 12 | 0 | 4 | 0 | 0 | 0.06 | 0.1 |
| 14[T] | BK-1206-4 | 1.88 | 4.3 | 0 | 0 | 3 | 8.58 | 0 | 4.42 | 0 | 0 | 0 |
| 15 | BK-1159-1[V] | 5.64 | 12.9 | 36 | 0 | 0 | 12 | 0 | 0 | 0 | 0 | 0 |

| Run[A] | Code | mL | | | HDI | | Jeffamine®/HDI mol ratio | density (g/cm³) | Resiliency[L] | Water Dispersibility[M] | Compression[N] kg/cm² |
|---|---|---|---|---|---|---|---|---|---|---|---|
| | | DBTDL[H] | water | HDI[I] | equiv[J] | Index[K] | | | | | |
| 0 | Control | | | | | | | 0.104 ± 0.001 | good | poor | 0.076 ± 0.001 |
| 1 | BK-1204-1-1 | 0.40 | 0.50 | 9.6 | 65 | 46 | 0.34 | 0.18 | good | fair | 0.12 |
| 2 | BK-1204-8 | 0.00 | 0.50 | 9.6 | 65 | 46 | 0.34 | 0.10 | fair | fair | 0.03 |
| 3 | BK-1204-2 | 0.00 | 0.50 | 7.3 | 49 | 35 | 0.44 | R | R | R | R |
| 4 | BK-1205-6 | 0.00 | 0.50 | 9.2 | 65 | 46 | 0.35 | 0.17 | good | fair | 0.15 |
| 5 | BK-1206-1 | 0.00 | 0.00 | 7.3 | 49 | 40 | 0.44 | S | S | S | S |
| 6 | BK-1206-5 | 0.40 | 0.50 | 8.8 | 65 | 45 | 0.22 | 0.09 | good | poor | nd |
| 7 | BK-1206-6 | 0.40 | 0.50 | 8.8 | 65 | 45 | 0.22 | 0.13 | good | poor | nd |
| 8 | BK-1205-3 | 0.40 | 0.50 | 6.7 | 50 | 34 | 0.32 | R | R | R | R |
| 9 | BK-1205-4 | 0.40 | 0.50 | 8.4 | 65 | 44 | 0.26 | 0.10 | good | good | 0.06 |
| 10 | BK-1205-5 | 0.40 | 0.50 | 9.8 | 65 | 46 | 0.22 | 0.11 | good | good | 0.03 |
| 11 | BK-1206-2 | 0.40 | 0.00 | 6.7 | 50 | 39 | 0.32 | R | R | R | R |
| 12 | BK-1204-10 | 0.40 | 0.50 | 10.0 | 67 | 48 | 0.02 | 0.40 | poor | poor | nd |
| 13[T] | BK-1206-3 | 0.00 | 0.50 | 9.2 | 65 | 46 | 0.10 | 0.11 | good | poor | nd |
| 14[T] | BK-1206-4 | 0.40 | 0.50 | 9.6 | 65 | 46 | 0.03 | U | U | U | U |
| 15 | BK-1159-1[V] | 1.2 | 1.5 | 26.4 | 65 | 45 | 0.24 | 0.111 ± 0.003 | good | good | 0.0871 ± 0.003 |

| Run[A] | Code | Rebound[O] % | Water Abs.[P] min | Shake test[Q] |
|---|---|---|---|---|
| 0 | Control | 99.2 ± 0.2 | N/A | N/A |
| 1 | BK-1204-1-1 | 84 | >3 | 7 |
| 2 | BK-1204-8 | 86 | >3 | 2 |
| 3 | BK-1204-2 | R | R | R |
| 4 | BK-1205-6 | 92 | >3 | 2 |
| 5 | BK-1206-1 | S | S | S |
| 6 | BK-1206-5 | nd | >3 | >34 |
| 7 | BK-1206-6 | nd | >3 | >34 |
| 8 | BK-1205-3 | R | R | R |
| 9 | BK-1205-4 | 98 | 0.77 | 4 |
| 10 | BK-1205-5 | 94 | 1 | 1 |
| 11 | BK-1206-2 | R | R | R |
| 12 | BK-1204-10 | nd | nd | >34 |
| 13[T] | BK-1206-3 | nd | 0.08 | >34 |
| 14[T] | BK-1206-4 | U | U | U |
| 15 | BK-1159-1[V] | 95.3 ± 2.7 | 1.1 | 2 |

[A]In all experiments foam was allowed to develop in original beaker @ room temperature unless otherwise stated.
[B]Karo-brand Light Corn Syrup
[C]Jeffamine® ED-900 (aka polyetheramine XTJ-501)--Huntsman
[D]Jeffamine® ED-600 (aka Polyetheramine XTJ-500)--Huntsman
[E]Jeffamine® ED-2003 (aka Polyetheramine XTJ-502)--Huntsman
[F]Stannous octoate -- Air Products
[G]Triethylenediamine -- Air Products
[H]Dibutyltindilaurate (Aldrich)
[I]1,6-diisocyanohexane (HDI) (Aldrich)

TABLE 5-continued

Free Rise Foam Data

[J] (moles NCO/total anhydrous moles of ROH and RNH2 groups) × 100%.
[K] isocyanate index = total moles NCO/sum of total moles OH and NH2 and water in formulation.
[L] Good = fast easy non-sticky rebound during decompression; Fair = rebounds, but slowly after decompression; Poor = no rebound after decompression.
[M] Good = absorbs water quickly and easily disperses; Fair = absorbs water quickly but disperses with difficulty, or absorbs slowly but disperses easily; Poor = doesn't absorb water or doesn't disperse.
[N] Force to compress to 50% of original thickness.
[O] Percentage of original thickness recovered after 60 sec compression.
[P] Time for an approx. 2.5 × 2 × 0.8 cm piece of foam, dropped in 250 mL tap water in a 500 mL jar, to fully absorb water.
[Q] Number of shakes to break an approx. 2.5 × 2 × 0.8 cm piece of foam, in 250 mL tap water in a 500 mL jar, into two or more pieces.
R Foam too weak to warrant testing.
S Rose but receded to yield a product with gooey center-not tested.
[T] Allowed to rise in original container @ 60° C.
U Very rigid structure with large open cells, similar to BK-1204-10, not tested.
[V] Example of inventive foam

TABLE 6

Sheet Foam Data

| Run[A] | Code | Glycerol | Corn Syrup[B] | ED-900[C] | ED-600[D] | PEG-400 | PEG-600 | ED-2003[E] | PEG-200 | DBTDL[F] (mL) | water | HDI[G] |
|---|---|---|---|---|---|---|---|---|---|---|---|---|
| 1 | BK-1143-3 | 1.88 | 4.3 | 16 | 0 | 0 | 0 | 0 | 0 | 0.2 | 0.1 | 6.8 |
| 2 | BK-1143-4 | 1.88 | 4.3 | 8 | 0 | 0 | 0 | 0 | 0 | 0.2 | 0.1 | 6.2 |
| 3 | BK-1140-2 | 1.88 | 4.3 | 14 | 0 | 0 | 2 | 0 | 0 | 0.2 | 0.1 | 6.9 |
| 4 | BK-1140-3 | 1.88 | 4.3 | 0 | 10 | 0 | 0 | 0 | 0 | 0.15 | 0.1 | 6.8 |
| 5 | BK-1142-1 | 1.88 | 4.3 | 16 | 0 | 0 | 0 | 0 | 0 | 0.2 | 0.1 | 6.8 |
| 6 | BK-1138-2 | 1.88 | 4.3 | 0 | 16 | 0 | 0 | 0 | 0 | 0.2 | 0.1 | 7.5 |
| 7 | BK-1143-5 | 1.88 | 4.3 | 14 | 0 | 2 | 0 | 0 | 0 | 0.2 | 0.1 | 7.0 |
| 8 | BK-1142-2 | 1.88 | 4.3 | 8 | 0 | 0 | 0 | 0 | 0 | 0.2 | 0.1 | 6.8 |
| 9 | BK-1143-1 | 1.88 | 4.3 | 0 | 0 | 0 | 0 | 8 | 0 | 0.2 | 0.1 | 5.8 |
| 10 | BK-1143-2 | 1.88 | 4.3 | 0 | 4 | 0 | 0 | 8 | 0 | 0.2 | 0.1 | 6.3 |

| Run[A] | Code | HDI equiv. %[H] | Jeffamine ®/HDI mol ratio | Caliper[I] (cm) | density (g/cm$^3$) | Resiliency | Water dispersibility |
|---|---|---|---|---|---|---|---|
| 1 | BK-1143-3 | 54 | 0.42 | 0.20 | 0.26 | good | good |
| 2 | BK-1143-4 | 55 | 0.23 | 0.19 | 0.17 | good | fair[J] |
| 3 | BK-1140-2 | 54 | 0.36 | | | good | fair |
| 4 | BK-1140-3 | 54 | 0.40 | | | good | poor |
| 5 | BK-1142-1 | 54 | 0.42 | 0.28 | 0.22 | good | good |
| 6 | BK-1138-2 | 54 | 0.57 | K | K | K | K |
| 7 | BK-1143-5 | 54 | 0.36 | 0.21 | 0.23 | good | good |
| 8 | BK-1142-2 | 60 | 0.21 | | | | poor |
| 9 | BK-1143-1 | 55 | 0.11 | | | | poor[L] |
| 10 | BK-1143-2 | 55 | 0.27 | | | good | poor |

[A] In all experiments, foam was allowed to develop between Plexiglas ® sheets, bolted to a set gap, at room temperature.
[B] Karo-brand Light Corn Syrup
[C] Jeffamine ® ED-900 (aka Polyetheramine XTJ-501)--Huntsman
[D] Jeffamine ® ED-600 (aka Polyetheramine XTJ-500)--Huntsman
[E] Jeffamine ® ED-2003 (aka Polyetheramine XTJ-502)--Huntsman
[F] Dibutyltindilaurate (Aldrich)
[G] 1,6-diisocyanohexane (Aldrich)
[H] (Equiv. NCO groups/total anhydrous ROH and RNH$_2$ groups) × 100%
[I] Foam sheet thickness
[J] Likely mostly due to the fact that the foam was very weak
K Flat non-foam flexible elastomer.
[L] Weak open celled foam Water dispersible foam (e.g., Run 22 of Table 3) having similar softness and resiliency to a cosmetic foam pad control (Run 0, Table 3) was prepared from the combination of corn syrup, glycerin, Jeffamine® ED-900 (aka Polyetheramine XTJ-501), PEG, catalyst, water and HDI as well as various other formulations. As is apparent from the data, the judicious choice of materials and control of reaction conditions are important to achieving the desired properties.

Influence of Polyetherdiamine

In FIG. 1, water dispersibility is digitized such that 1=good, 0=fair, and −1=poor. Runs in Table 3, are plotted in terms of their water dispersibility values versus the mole ratios of Jeffamine® ED-900/HDI in their respective formulations. Clearly, water dispersibility was lost at a mole ratio ≦0.17 in these cases. Three different approaches were taken to lower Jeffamine® content while attempting to maintain water dispersibility. First, in Runs 12 and 13 of Table 3 (having mole ratios of 0.20 and 0.12, respectively), the Jeffamine® was replaced by PEGs such that the overall polyether chain length distribution of the formulation was kept constant; only Run 12 foam was water dispersible. Second, in Run 35 (having mole ratio=0.19) and Runs 34, 36, and 38 (mole ratio=0.07), the reduced Jeffamine® content was compensated by changing HDI dosage; none of the resultant foams were water dispersible. The poor water dispersibility of foam of Run 35, which can be considered a borderline case (mole ratio=0.19), likely reflects the quality of the foam (see Table 3). Third, in Run 77 of Table 4 (mole ratio=0.03), the Jeffamine® content was reduced by making a prepolymer of Jeffamine® and HDI; the resultant foam wasn't water dispersible. Note that while none of these formulations utilizing Jeffamine® ED-900/HDI mole ratios ≦0.17 yielded water dispersible foams, several formulations having mole ratios exceeding 0.17 yielded foams that weren't water dispersible. Foam water dispersibility depends, in part, on the level of Jeffamine® ED-900 in the foam formulation. In terms of mole ratio of Jeffamine® ED-900/HDI, a preferred range of Jeffamine® ED-900 content in the inventive foam formulation is about 0.17-0.50, with a most preferred range of about 0.20-0.40.

Changing Jeffamine® chain length affects the quality of the resultant foam. As evidenced by Runs 1-7 of Table 5, substituting ED900 with the lower molecular weight version, Jeffamine® ED-600, significantly reduced water absorbency rate. And significantly more ED-600 than ED-900 was used to achieve water dispersibility; thus the threshold mole ratio of ED-600/HDI was between 0.22 and 0.34. The foams based on ED-600 were consistently coarser than those based on ED-900 because the cells of the ED-600 foams were larger than those of the ED-900 foams. This large cell structure and the reduced chain length with ED-600, which diminishes its inherent hydrophilicity, likely account for the observed poor water absorbency rate.

Foams using the high molecular weight version of Jeffamine®ED 2003, which has a chain length about 2.4 times longer than that of ED-900 were also tested. ED-2003 is disadvantaged because of its higher melting point (43° C.) and low equivalence of amine groups. As evidenced by Runs 12-14 of Table 5, even at equal weight dosages as ED-900, the resultant foam with ED-2003, while very soft and absorbent, was not water dispersible. Water dispersible foam may be attained with ED-2003 if its dosage was increased to even higher ED-2003/HDI mole ratios, but this would be expensive.

Without intending to be bound by theory, it is hypothesized that a certain critical population of HDI-Jeffamine® polyurea blocks facilitates foam water dispersibility. As discussed above, the isocyanate will form poly-ureas,

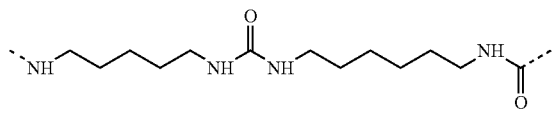

as it reacts with water. Such homo-polymeric urea species are hydrophobic. The Jeffamine® will compete with this homo-polymerization reaction to create hetero-polymeric ureas

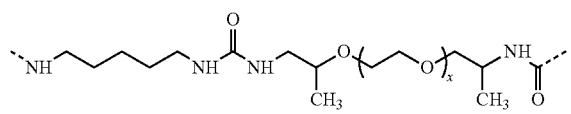

that are more hydrophilic, and, therefore contribute to the overall water dispersibility of the resultant foam. Jeffamine® ED-900, because of its balance of hydrophilicity, reactivity, and flexibility, is a preferred version of Jeffamine®.

Influence of Glycerin and PEGs

The importance of the PEG and glycerin components was assessed through Runs 40-46 of Table 3. As long as the formulation contains sufficient HDI, the glycerin does not appear to be critical to water dispersibility. PEG or its equivalent is used to achieve water dispersibility. The absence of PEG in the foam formulations of Runs 42-45 of Table 3 explains the poor water dispersibility of the corresponding resultant foams—even though the mole ratio of Jeffamine® ED-900/HDI was within the acceptable range (see FIG. 1).

Foam water dispersibility is not affected by the PEG chain length. As evidenced from Runs 15 and 46 of Table 3 and Runs 9, 10, and 15 of Table 5, dispersible foam was obtained regardless of PEG chain length, or combinations of PEG chain lengths. Obviously, melting point increases with PEG molecular weight; so, handling of the PEGs becomes increasingly difficult as molecular weight increases.

Influence of Corn Syrup and Surrogates Thereof

The corn syrup used in these experiments was Karo—brand light corn syrup, which is known to be a mixture Archer Daniels Midland Company corn syrup 42/43, sucrose, and vanilla—where sucrose and vanilla are 12 and <1 wt % of composition, respectively. As evidenced by Runs 23-25 of Table 3, the inventive foam was obtained with the corn syrup solids with or without the inclusion of sucrose; although, foams made with the simulated Karo (s-ADM) and c-ADM (see Table 3), neither of which contained vanilla, appeared to be a little less water dispersible than the foam made with Karo light corn syrup (compare Runs 23 and 24 with Run 25). Considering the paucity of vanilla in the Karo product, the observed variation in water dispersibilities likely resulted from variations in the saccharide distributions of the source corn syrups.

Testing the idea that the diverse size distribution of saccharides in corn syrup are key to its effectiveness in making the inventive foam, a solution of sucrose/sorbitol/corn starch (see procedures described above) was tried as a surrogate for corn syrup. Thus, 4.76 g of the sucrose/sorbitol/corn starch solution was mixed with 1.88 g glycerin, 12 g Jeffamine® ED-900, 4 g PEG-400, 0.10 g Dabco 33LV, 0.06 g Dabco T-9, stirred for 1 min, and with stirring, 8.8 mL HDI was added and stirring was continued until onset of creaming, and the cream was transferred to a dish preheated to 60° C. and allowed to develop at 60° C. for 1 hour. The product had an elastic skin over a fine open-celled foam, giving the product a quality like batting. When a piece of this product was placed in water it expanded by about three times and became easily dispersible. While clearly not optimized, this experiment shows that other combinations of highly water soluble molecules of diverse sizes could be used as substitutes for corn syrup in making foam.

When the corn syrup was substituted with pure sucrose, as in Runs 101-103 of Table 4, soft resilient foams were obtained that were not water dispersible.

The use of glycerol or sorbitol ethoxylates was investigated as possible adjuncts, or surrogates for corn syrup. As evidenced by Runs 19, 22-42, 70, 90-91, 95, and 113-114 of Table 4, no conditions were identified that yielded foams, let alone, water dispersible, resilient foam.

Suitable conditions for successfully forming the water dispersible, resilient foam were not found for substituting corn syrup with either corn starch or Ecosphere EX-7760-44 nanoparticle-starch (obtained from Ecosynthetix, Lansing, Mich.). As evidenced by Runs 50-54 of Table 4, either dense foam elastomers, low resiliency foam, or friable products, none of which being water dispersible, were obtained. In can be hypothesized that the starch properties of, high molecular weight, narrow poly-dispersity, and inability to fully unfurl polymers, all contribute to the failure of using starch as a corn syrup surrogate. Surprisingly, a diverse combination of homo-, or hetero-monomeric, dimeric, and oligomeric highly water soluble molecules appears to be a very significant aspect to the formulation of dispersible and resilient foams. Corn syrup is the preferred source of this water soluble molecular soup.

The foam formulation thus suitably contains: 1) polyether diamine, dosed at an appropriate mole ratio to HDI, suitably between about 0.17 and 0.50 in the samples tested; 2) corn syrup, or an appropriate corn syrup surrogate; and 3) PEG or an equivalent.

Influence of Temperature

Successful fabrication of the inventive foam also generally involves a modicum of heat throughout the foam forming process. This conclusion is supported specifically by Runs 86-89 of Table 4, but also by comparing foams from Run 79 and Run 101 of Table 4, or from Runs 28-31 of Table 3. In initial experiments, allowing a foam to develop in the beaker used to mix the formulation, allows the developing foam to retain enough heat, if the reaction is sufficiently exothermic, to complete the necessary reactions (see below). However, if the creamed formulation is transferred to a larger dish and developed at room temperature, much of the generated heat is dissipated before the necessary reactions are sufficiently advanced. This effect can be circumvented by simply increasing the amount of creamed formulation being transferred (see Run 18 of Table 3), or developing the foam at higher temperatures. Developing the foam on the laboratory scale at about 60° C. is sufficient to complete the necessary reactions for attaining the inventive foam without adding heat.

Salient Reactions

As with any flexible PU foam, the timing of the urea and urethane reactions and achieving the proper proportions of ureas and urethanes at foam maturation critically influence final foam properties. If urea formation occurs too fast, then the blowing reaction will predominate and there will be an exothermic generation of large volumes of $CO_2$ without any foam rise, or there will be post-rise collapse. If urethane formation predominates there will be little foam rise, because of reduced $CO_2$ evolution, and a dense closed-celled rubbery/elastic material results. In addition to these chemical reactions, various physical processes also occur. A significant physical process is the precipitation of poly-urea chains (aka. hard segments) into para-crystallinel micro-domains that become dispersed in the polyol matrix. These micro-domains likely cross-link with the polyol matrix, usually via urethane bonds, to make a stable foam. Also, the catalyst can prefer one phase over another phase during foam development, which can radically affect catalyst performance. How all these chemical and physical processes play out is not well understood.

FT-IR can be used to study the foam reactions. The wavenumber assignments of the key functional groups involved in the foam reactions are listed in Table 7. These assignments will be referred to in subsequent discussions.

TABLE 7

IR Assignments for Groups in PU Foams

| Wavenumber (cm$^{-1}$) | Functional Group Assignment |
| --- | --- |
| 2265-2278 | Isocyanate asymmetric stretching |
| 1725-1735 | Non-H-bonded urethane carbonyl stretch |
| 1705-1715 | Non-H-bonded urea carbonyl stretch |
| 1690-1715 | H-bonded urethane carbonyl stretch |
| 1690-1715 | Free urea carbonyl stretch |
| 1690-1715 | Allophanate and biuret carbonyl stretches |
| 1660-1670 | Weakly H-bonded (disordered/mondentate) urea carbonyl stretch |
| 1625-1650 | Strongly H-bonded (ordered/bidentate) urea carbonyl stretch |

Figure 2:
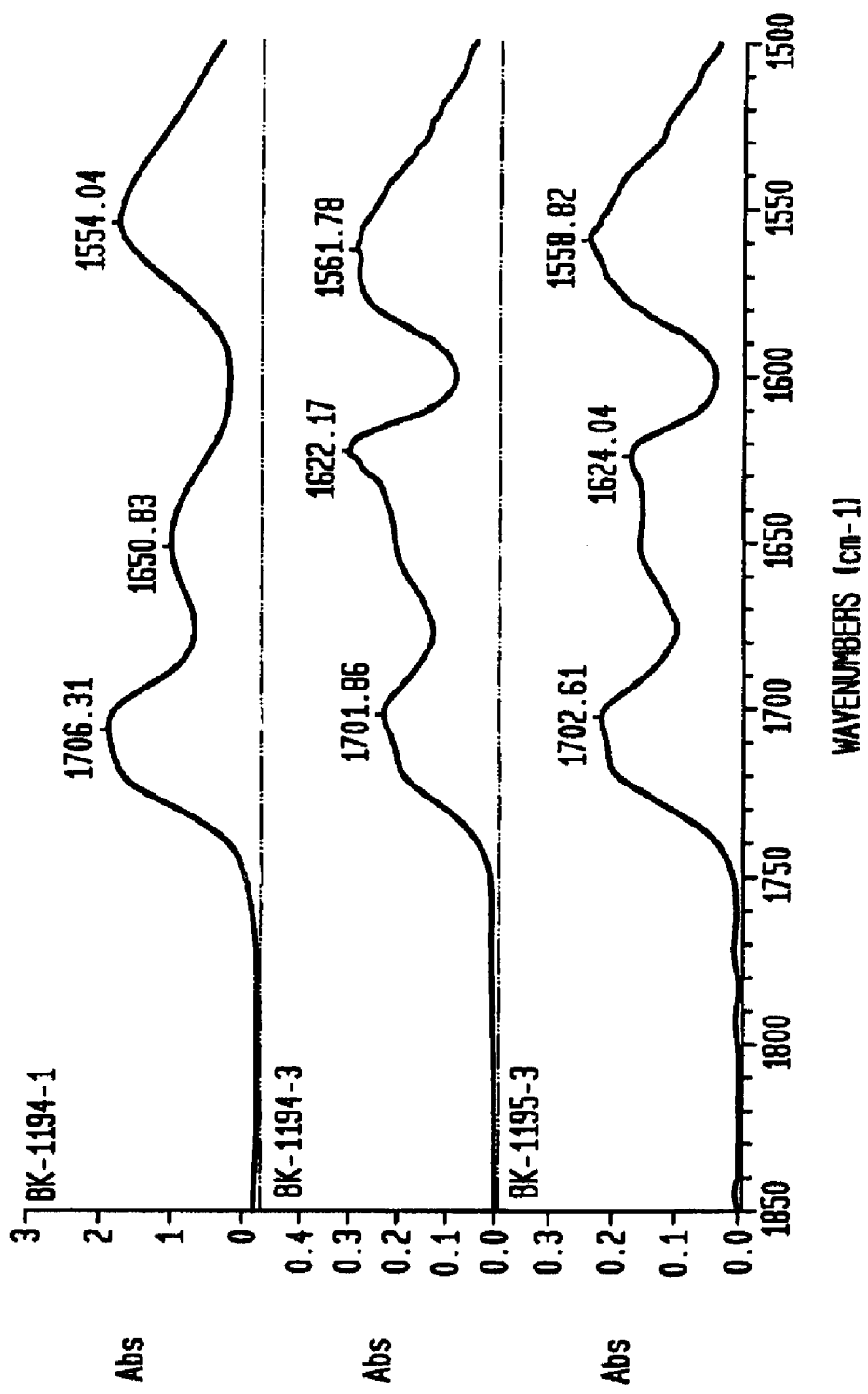
FIGS. 2, 3 and 4 are IR spectra of products of polymerization and foaming using various catalysts, temperatures and reactants. In particular.

Analysis of the products of Runs 26-31 of Table 3 provides insight into the necessary reactions for attaining the inventive foam. The FT-IR spectra of some of these finished products are shown in FIG. 2. Run 26 (BK-1194-1) used stannous octoate as the sole catalyst and a development temperature of 60° C. The lack of bands within the 1640-1600 cm$^{-1}$ region of the spectrum in FIG. 2 of the product of Run 26 could mean that little if any urea precipitation occurred before substantial amounts of urethane formation. It appears, then, that gelation occurred faster than blowing under these conditions and could explain the observed rheology of the product and its low volume. Adding triethylenediamine catalyst to the stannous octoate catalyst, as in Runs 28-31, appeared to enhance urea production and precipitation. The product of Run 31, which was run after transferring the cream to a dish at 40° C., was too weak to test. The products of Runs 28 and 29 were true inventive foams—BK-1195-3 being the stronger of the two. The IR spectrum of the foam product of Run 28 (BK-1194-3), which was formed in original beaker at room temperature, shows a dominant band at around 1622 cm$^{-1}$. The latter could mean that BK-1194-3 foam has a preponderance of urea micro-domains. Based on the IR spectrum of the product foam of Run 29 (BK-1195-3), which was made at 60° C. after transferring cream to a dish, it appears that this urea microdomain population shrank with a concomitant rise of groups absorbing in the 1702 cm$^{-1}$ region. The observed shift of molecular species going from BK-1194-3 to BK-1195-3 can be most simply attributed to the difference in amount of heat available in the corresponding runs. In these cases, anyway, heat was needed to fully form and strengthen the foam; so, BK-1195-3 was stronger than BK-1194-3. Because no band (2265-2278 cm$^{-1}$) for unreacted isocyanate groups was found in the IR spectra of BK-1194-1, BK-1194-3, and BK-1195-3, it is difficult to explain the late stage effects. Some disordering of ureas could explain the data, but this is unlikely. The simplest explanation would be the further reaction of residual levels of isocyanates (i.e., below IR detection limits) to generate additional urethanes and disordered ureas.

Catalysts

Figure 3:
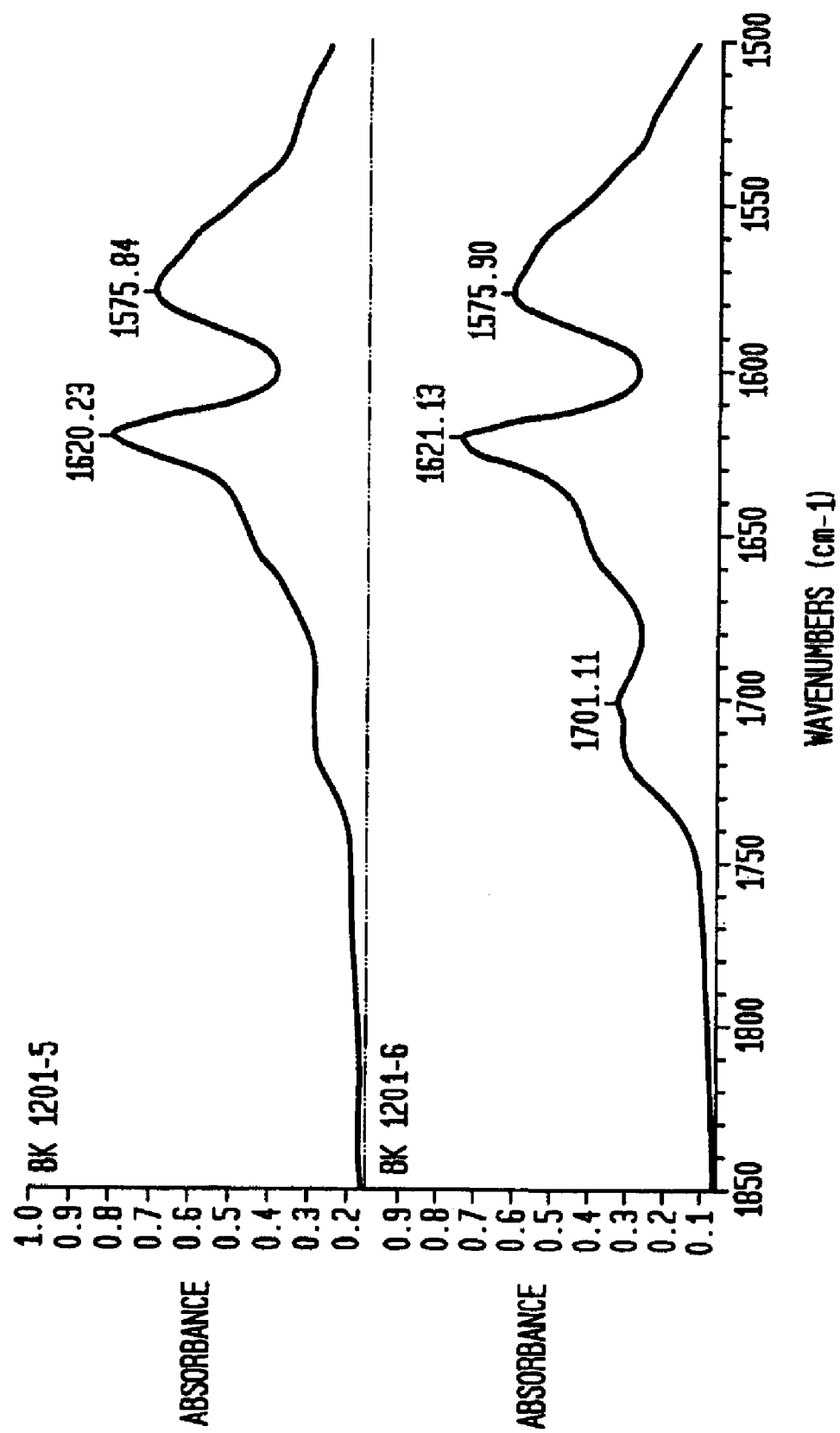

While heat is desirable for making the foam—particularly late in foam development—the aforementioned discussion also demonstrates the importance of the catalyst(s) selected. Thus, stannous octoate was a better catalyst for urethane formation than triethylenediamine—although, the latter is known to be a good gel catalyst (see Chaffanjon, P.; Grisgby, R. A.; Rister, E. L.; Zimmerman, R. L. J. Cell. Plastics (2003), 39, 187). However, dispersible foams with acceptable properties were not obtained using stannous octoate alone. Nor, as evidenced by Runs 47 and 104-105 of Table 4, were acceptable foams obtained when triethylenediamine was used alone. Based on the IR spectra in FIG. 3 of two of these products, BK-1201-5 and BK-1201-6, which had completely friable rheologies, it can be proposed that the triethylenediamine catalyst favored urea formation over urethane formation under these conditions. But, as was discussed above, the correct combination of these two catalysts, stannous octoate and triethylendiamine, yielded a very effective catalyst package for making the inventive foam (Runs 28-29 of Table 3).

Figure 4:
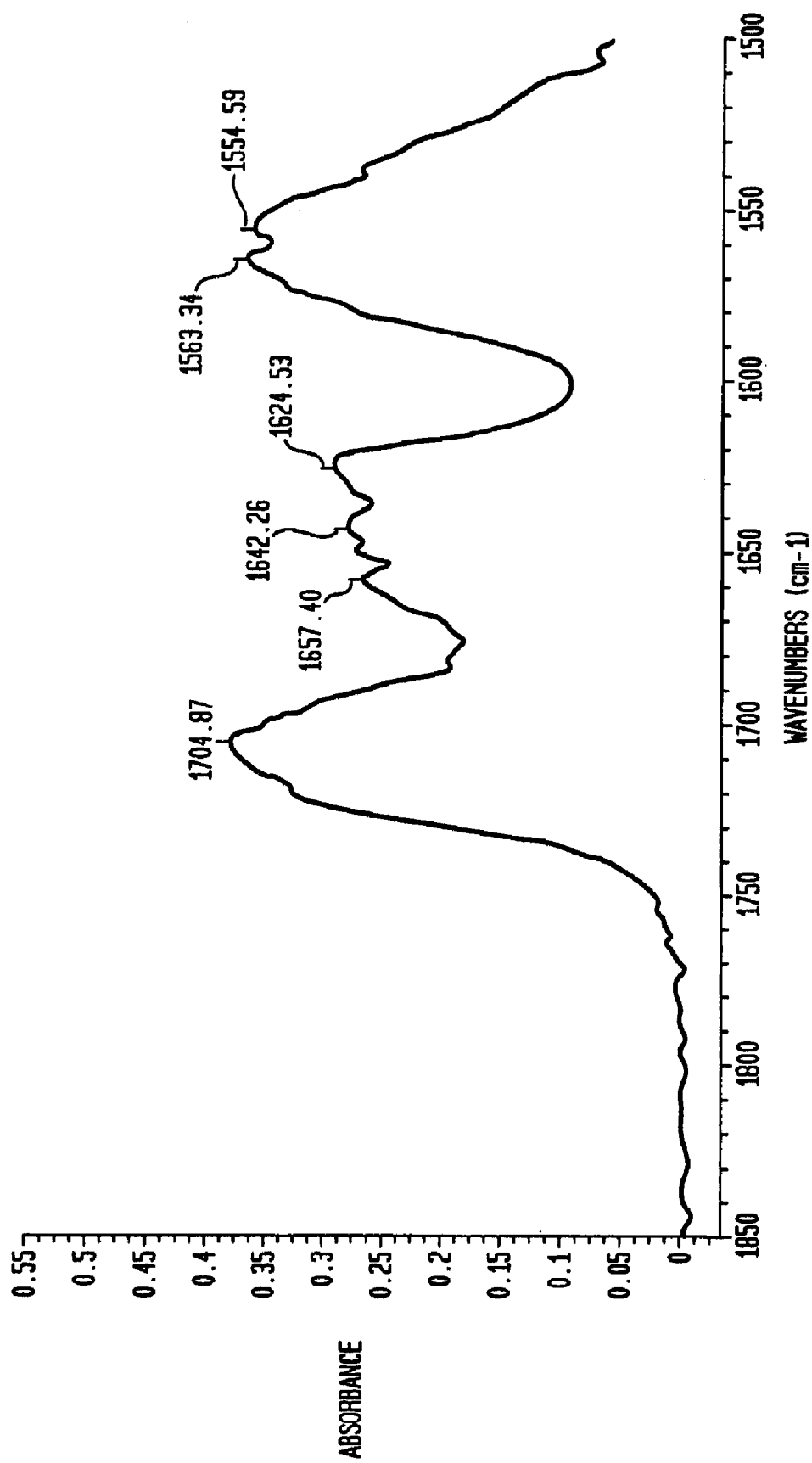

As evidenced by Runs 14, 15, 18, 22, and 46 of Table 3, dibutyltin-dilaurate (DBTDL) is also an effective catalyst for generating suitable foams. The FT-IR spectrum of the inventive foam, BK-1159-1 of Run 22 of Table 3, is shown in FIG. 4. Note the similar pattern and intensity of bands as with another version of the inventive foam, BK-1195-3, in FIG. 2. While DBTDL is an effective catalyst for making the inventive foam, high dosages (i.e., 1-2 wt % of total polyol and amine components) were better than low dosages.

Interestingly, replacing the stannous octoate in the inventive foam formulation, BK-1195-3 of Run 29 of Table 3, with DBTDL did not result in a dispersible and resilient foam (see Run 52 of Table 4). Instead, while there was excellent volume, a foam having a marshmallow-like rheology was obtained. The marshmallow-like rheology suggests that there was a disproportionate amount of urethane formation, or lack of late-stage cross-linking using the triethylene-diamine/DBTDL catalyst package versus the triethylenediamine/stannous octoate catalyst package. Dispersible and resilient foams were not obtained using titanium catalysts under the conditions tested, see Runs 1-3, 5-7, 16-18 and 20-22 of Table 4. Generally, good volume was often obtained with titanium catalysis, but without post-rise stability, leading to collapse.

Bismuth catalysts can be used to make the inventive foam as long as the bismuth catalyst has been purified of excessive amounts of free acids. The bismuth catalysts are complexes of bismuth with neodecanoic acid and some of the latter can remain non-complexed and interfere with the flexible foam forming process. This interference can be readily seen by comparing BiCAT® 8106, a bismuth catalyst containing up to 35 wt % neodecanoic acid, with Coscat® 28, which contains <1 wt % neodecanoic acid. As evidenced by Runs 8-15, 19-42, 54-62, 65, and 90-91 of Table 4, BiCAT® 8106 was tried under a plethora of conditions—including various combinations with other catalysts—but would not catalyze successful generation of a foam of the invention. On the other hand, inventive foam was prepared using Coscat® 28 (see Run 100 of Table 4); although, triethylenediamine was needed to fully expand the foam (compare Runs 98 and 100).

It should be noted that foams made with stannous octoate/triethylene-diamine or bismuth neodecanoate (low acid)/triethylenediamine formed in many cases with some bottom cavitations. The latter were eliminated by increasing catalyst level. Thus, a uniform, soft, resilient foam—having density of 0.10 g/cm$^3$—was obtained by repeating Run 29 of Table 3, except using double the catalyst levels. Unfortunately, while this foam absorbed water quickly—having an average rate of 0.49 min—it had poor water dispersibility. However, water dispersibility was restored to a fair rating by incrementally reducing the dosage of HDI (see Influence of Diisocyanate on Foam, below).

One particularly suitable composition is made generally in accordance with Run 29 of Table 3 by doubling catalyst levels relative to the monomers and adjusting HDI dosage in the range of 63 to 65 eq. % of total equivalents anhydrous polyol alcohol and Jeffamine® amine groups. Other ingredients may include: 17.4 parts PEG 400; 8.18 parts glycerine; 0.91 parts DI water; 1.4 parts F-88 (BASF) which is 10% aqueous solution of a pluronic surfactant believed to be a PEG/PPG block copolymer; 18.68 parts corn syrup; and 52.17 parts Jeffamine® ED 900 polyether diamine.

Influence of Diisocyanate

TDI or MDI will decrease the water absorbency of flexible foams made with them as opposed to using an alkylene diisocyanate. This is because of the rigid aromatic architectures of MDI and TDI. On the other hand, foams made with HDI have better water absorbency because of HDI's linear and flexible architecture. Consequently, much of the focus of the data in Tables 3-6 has been on foams made with HDI. MDI and TDI are more reactive than HDI, which complicates their usage. This inherent reactivity may be mitigated by pre-reacting TDI or MDI with Jeffamine®. As evidenced by Run 71 of Table 4, a foam having fine open celled structure was obtained using this approach. This foam, however, was very rigid and virtually impervious to water.

As might be anticipated from the discussion of the effects of Jeffamine® dosage on inventive foam properties (above), the dosage of HDI or other suitable diisocyanate is also an important aspect of manufacture of the foams of this invention. One can envision moderating foam strength and volume by adjusting HDI dosage up or down. While this is true, increasing HDI dosage, even a little, can render the foam non-dispersible in water depending on the other components selected, operating conditions and temperature. This effect is clearly seen by comparing foams from Runs 29 and 30 of Table 3, and explains the poor water dispersibility of the foam of Run 30-even though the mole ratio of Jeffamine®/HDI fell within the acceptable range (see FIG. 1).

On the other hand, reducing HDI dosage—even though water dispersibility is maintained or even enhanced—will increase foam softness because the foam becomes progressively weaker. In some cases, HDI dosage can be reduced incrementally to effect water dispersibility without affecting the other foam properties. For example, when Run 29 of Table 3 was repeated using double the catalyst levels, the usual bottom cavitations were eliminated, but at the cost of water dispersibility (see above). However, the water dispersibility was recovered to a fair rating—without affecting other foam properties—by reducing the HDI isocyanate group dosage from 65 to 64 eq. % of total equivalents anhydrous polyol alcohol and Jeffamine® amine groups. A HDI isocyanate dosage somewhere between 63 and 50 eq. % of total equivalents anhydrous polyol alcohol and Jeffamine® amine groups will catastrophically reduce foam strength in some cases (compare Run 18 of Table 3 with Runs 8 and 11 of Table 5). While the optimum dosage of HDI will depend somewhat on the composition of the polyol/amine mix, the HDI isocyanate group dosage for the inventive foam should be about <70 eq. % of total equivalents anhydrous polyol alcohol and Jeffamine® amine groups under "free rise" manufacturing conditions with the compositions tested. The lower limit will depend on the structure of foam and level of strength tolerable for a given foam application. For example, foam sheets were made with about 55 eq. % HDI isocyanate groups and still had usable strength (see Table 6).

Therefore, to attain a water dispersible, resilient foam, the foam formulation preferably contains, 1) Jeffamine®, dosed at an appropriate mole ratio to HDI, suitably between approx. 0.17 and 0.50; 2) HDI or equivalent, such that, in terms of isocyanate groups, the dosage of HDI is set at about <70 eq. % of total equivalents anhydrous polyol alcohol and Jeffamine® amine groups; 3) corn syrup, or an appropriate corn syrup surrogate; 4) PEG; and 5) catalyst. Sufficient heat should be available throughout the foam development process to obtain the desired product.

Influence of Water

Water is essentially an "add to taste" ingredient. The foam density can be decreased by adding more water to the foam formulation, but if too much water is used, the foam will collapse. If too little water is used, there won't be sufficient blowing reaction and foam density will increase. The amount of water is best adjusted to optimize foam density and strength for a specific foam application.

Mechanical Properties

Foam softness is an important property, especially for personal care applications. As noted above, softness was gauged by the force required to compress the foam to 50% of its initial thickness (CF-50%) and then comparing this with the CF-50% for a typical commercial personal care foam product which was not water dispersible. If the CF-50% was the same or less than that for the Control foam, the inventive foam was adjudged as being soft. As evidenced by Runs 12, 18, 22-25, 29, 46, and 49 of Table 3, and 9-10 of Table 5, the CF-50% s for examples of the inventive foam ranged 37-115% of that for the control (Run 0 of Table 2). In general, the inventive foam could be made as soft, or softer than the control foam at equal density.

Ease of compression is only part of the overall impression of a personal care foam product. The more completely a foam rebounds after compression and the number of times it will rebound over successive compression cycles contribute to the overall perception of foam softness and suppleness. The rebound is quantitatively the percentage of the original thickness that the foam rebounds to after a compressive force has been removed. As evidenced by Runs 12, 18, 22-25, 29, 46, and 49 of Table 3, and 9-10 of Table 5, preferred foams typically had rebounds within 86-98% of that of the Control foam.

Figure 5:
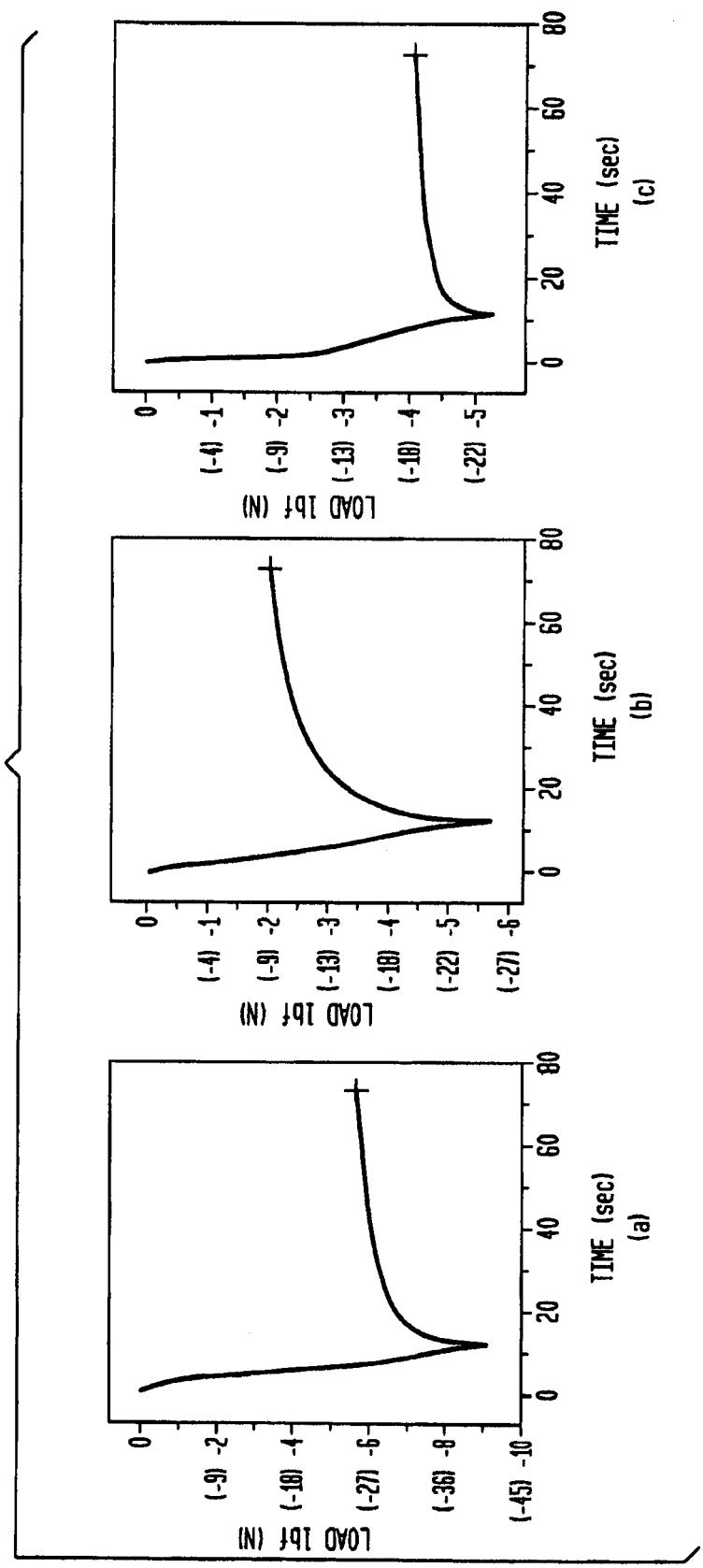
FIGS. 5a-5c are compression curves for various foams.

The loss of rebound over successive compression cycles is a type of hysteresis. A ready measure of the latter is the percentage of initial compressive force (push-back) that remains after the compression has been held for a given length of time before release. This percentage of retained initial compressive force shall hereafter be called, hysteresis value. The higher the hysteresis value, the less the effect of hysteresis. This phenomenon is readily seen by comparing the timed compression curves of two examples of the inventive foam, BK-1159-1 and BK-1155-2, with that of the Control foam in FIG. 5. The hysteresis values for these three foams were, 66, 37, and 79%, respectively. Thus, of the three foams, BK-1155-2 is predicted to show the greatest loss of rebound over successive compression cycles; that is, BK-1155-2 foam should exhibit the greatest hysteresis of the three foams. Hysteresis values for various foams are listed in Table 8. While preferred foams exhibited more hysteresis than the control foam, resilient foams with generally desirable properties typically exhibited hysteresis values of 30% or greater. Hysteresis values of 40%, 50% and more are readily achieved; hysteresis values between 30% and 90% are desirable.

Depending on the foam application, hysteresis can be a critical factor. For example, if the foam product will be stored in a compressed state, or used in a compressed state over long time periods, then the foam needs to test to hysteresis values as close to 100% as possible. The hysteresis value can also predict how well a foam will hold up under warm humid conditions—a property critical to the inventive foam. Thus, after storing the inventive foams BK-1159-1 and BK-1155-2 at 106° F. (41° C.) and 98% humidity for 4 weeks, the BK-1155-2 foam, which had a hysteresis value of 37%, was noticeably degraded—exhibiting little to no rebound; whereas, the BK-1159-1 foam, which had a hysteresis value of 66%, was not noticeably degraded.

Figure 6:
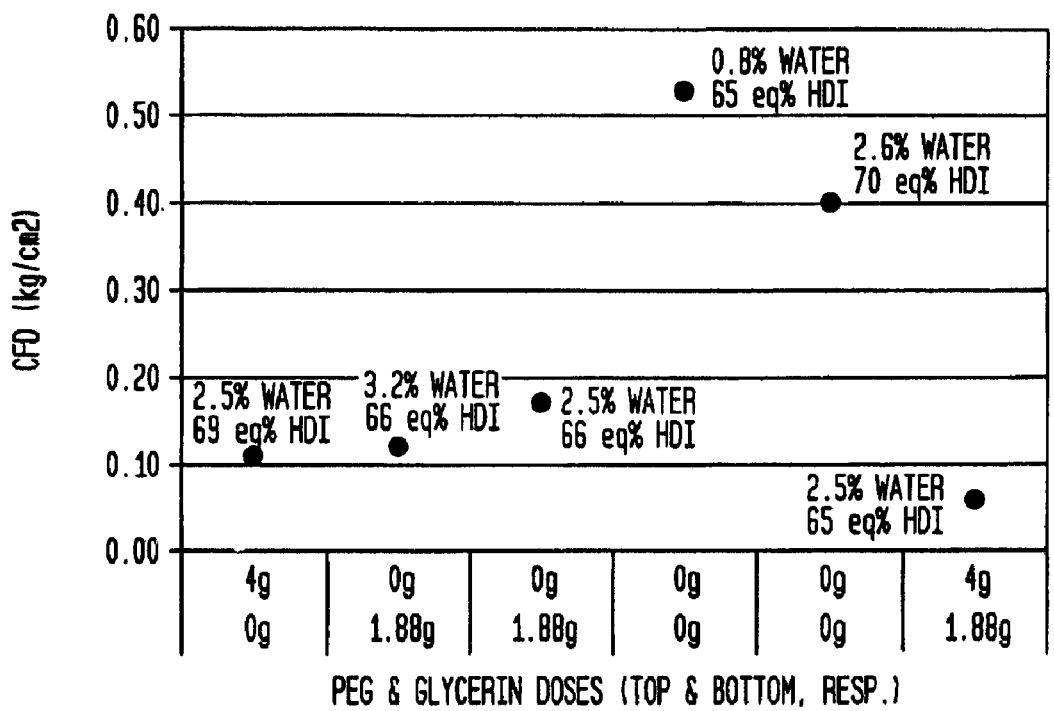
FIGS. 6-10 are plots illustrating the effect of PEG and glycerol content on mechanical properties. In particular.
Figure 7:
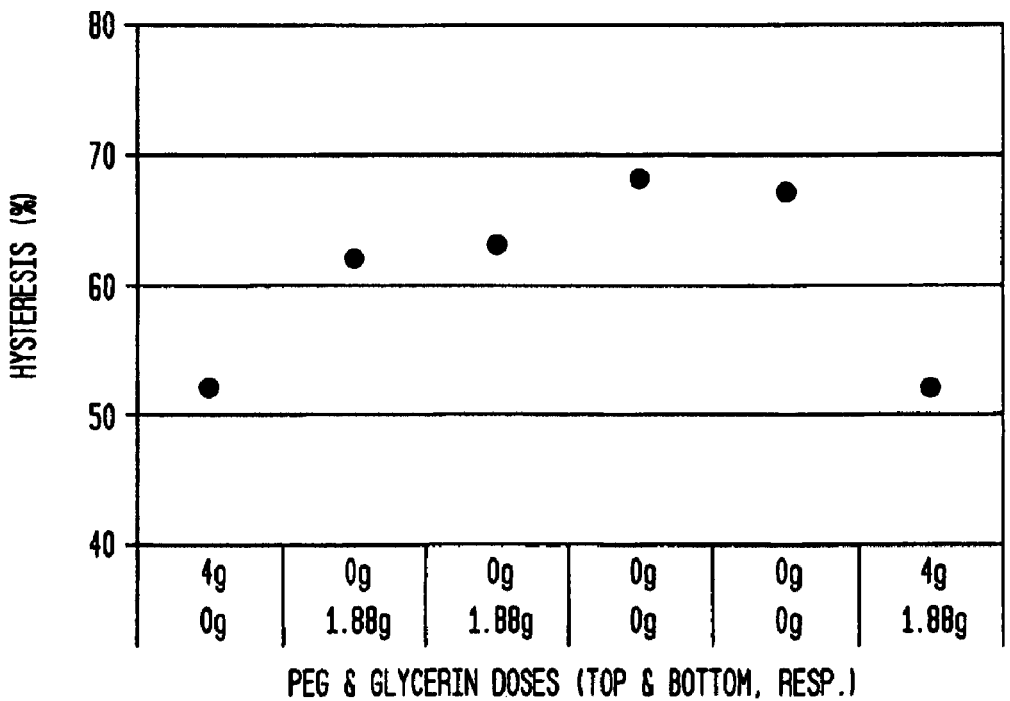

As stated earlier, the inventive foam formulation employs PEG or equivalent to enhance water dispersibility. However, both PEG and glycerin are important additives for softening the inventive foam. As seen in FIG. 6, the foam stiffened significantly when the PEG and glycerin components were removed from the formulation. It can be hypothesized that glycerin and PEG act as hydrophilic chain extenders that impart flexibility to, or plasticize the foam. It is seen in FIG. 7 that hysteresis value increased upon removing PEG and glycerol from the formulation.

TABLE 8

Hysteresis Values for Various Foams

| | Ref. Table[A] | | Hysteresis value[B] |
|---|---|---|---|
| Code | Run | Number | (%) |
| Control | 0 | 3 | 79 |
| BK-1155-2 | 18 | 3 | 37 |
| BK-1159-1 | 22 | 3 | 66 |
| BK-1193-1-D | 23 | 3 | 60 |
| BK-1193-2-D | 24 | 3 | 58 |
| BK-119303-D | 25 | 3 | 37 |
| BK-1195-3 | 29 | 3 | 61 |
| BK-1195-4 | 30 | 3 | 67 |
| BK-1199-3 | 40 | 3 | 52 |
| BK-1199-4 | 42 | 3 | 62 |
| BK-11100-5 | 45 | 3 | 67 |
| BK-11100-7 | 43 | 3 | 63 |
| BK-11100-8 | 46 | 3 | 52 |
| BK-11101-3 | 49 | 3 | 56 |
| BK-11102-5 | 100 | 4 | 37 |
| BK-11103-5 | 101 | 4 | 67 |
| BK-11103-7 | 103 | 4 | 65 |
| BK-11104-3 | 44 | 3 | 68 |
| BK-11104-6 | 12 | 3 | 56 |
| BK-11104-8 | 13 | 3 | 61 |
| BK-1204-1-1 | 1 | 5 | 36 |
| BK-1204-8 | 2 | 5 | 36 |
| BK-1205-4 | 9 | 5 | 64 ± 2 |
| BK-1205-5 | 10 | 5 | 34 ± 4 |
| BK-1205-6 | 4 | 5 | 55 |

[A]Run x of Table y where formulation etc. are entered
[B]Percentage of initial compressive force retained, before release, after compressing for 1 min The greater the H value the less the hysteresis.

Figure 8:
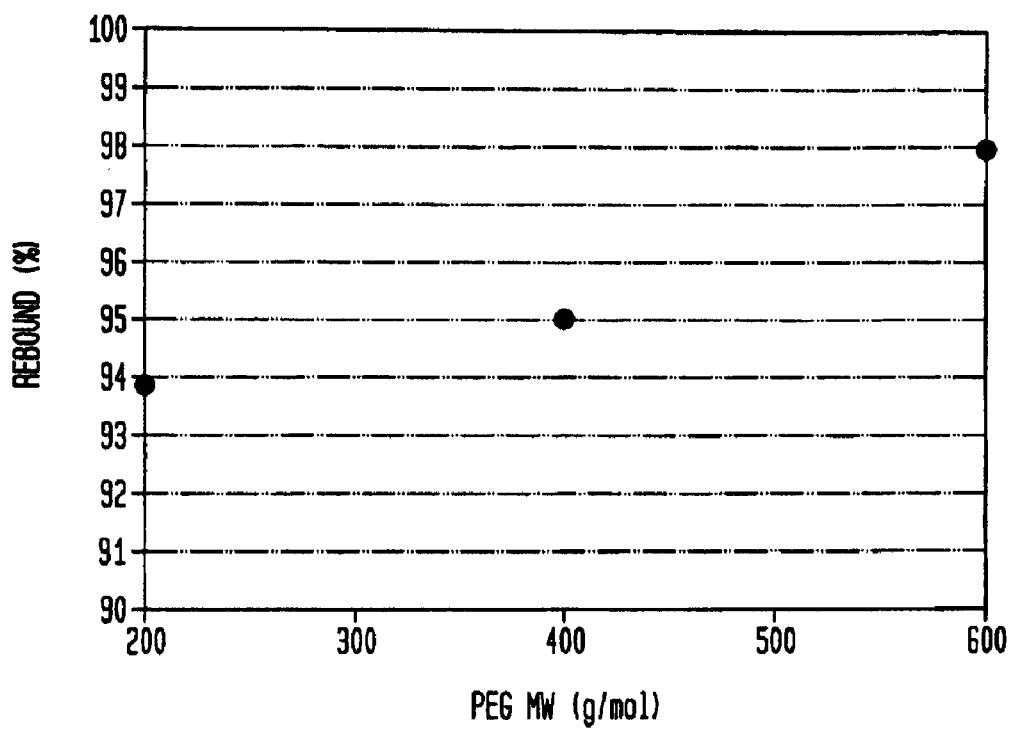
Figure 9:
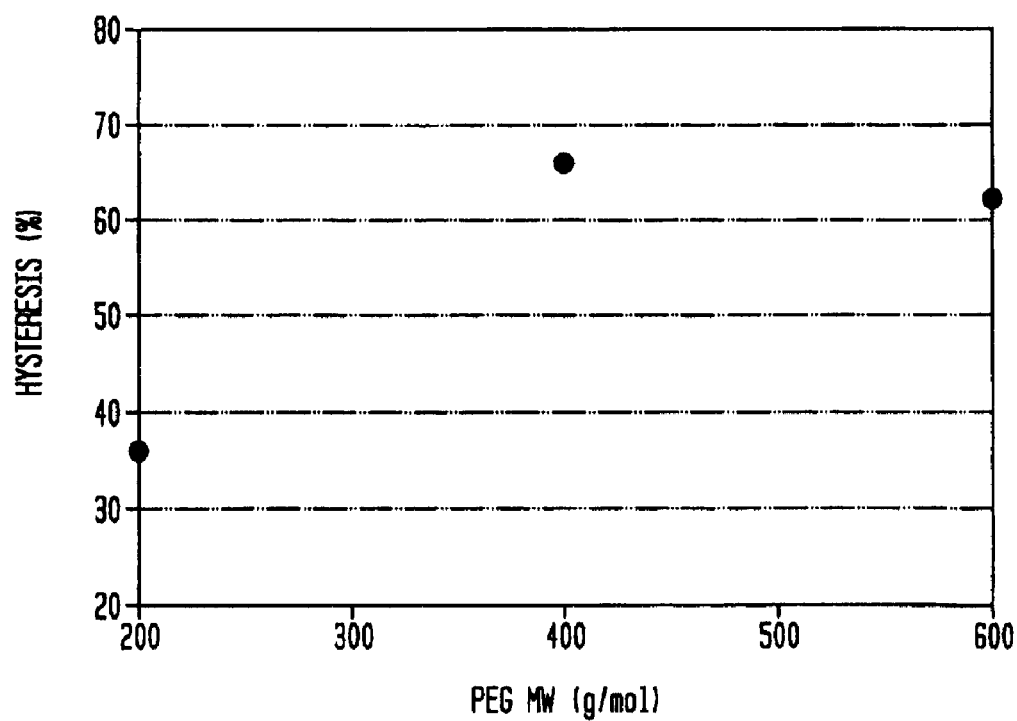
Figure 10:
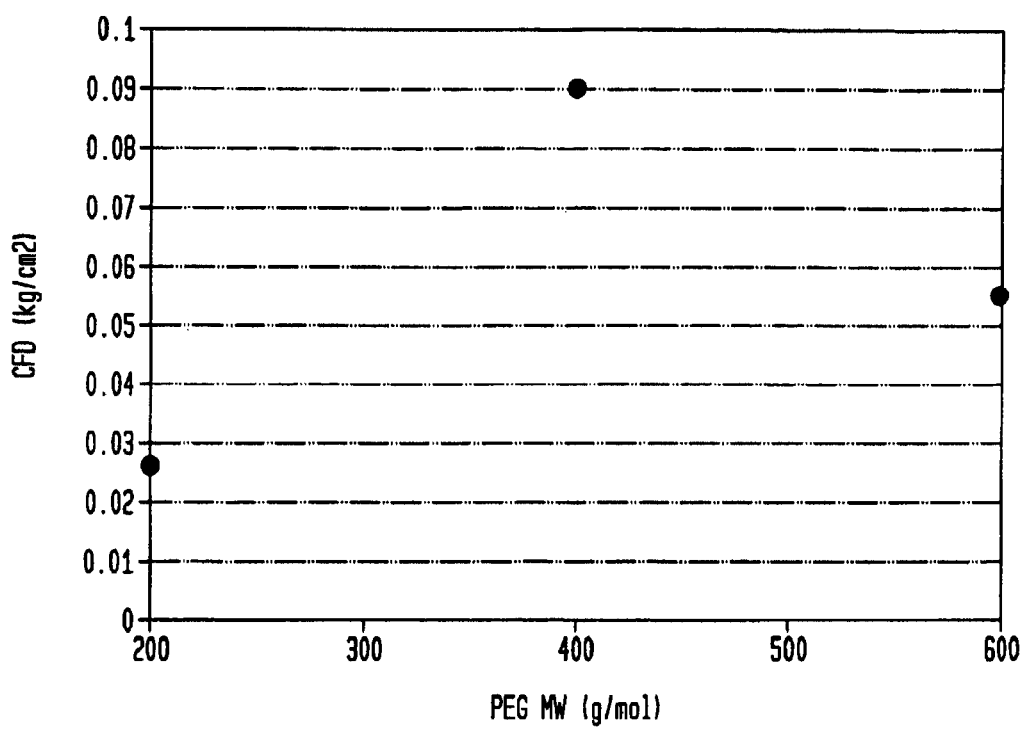

Water dispersibility was not generally affected by PEG molecular weight. But, PEG molecular weight does affect the mechanical properties of the foam. As seen with the plots in FIGS. 8-10, increasing PEG molecular weight increased rebound and hysteresis value along with some loss in softness. Based on these results, PEG-400, 600, or higher molecular weight are preferred over PEG-200.

Foam Sheet

The foam formulations of this present study can also be developed into sheets having a preset thickness by letting the foam rise in a constricted cavity, such as between Plexiglas® plates locked in place. The resultant foam sheets had foam cores and closed skin surfaces. Based on the IR spectra of the skin and core of the foam sheet from Run 7 of Table 6, the compositions of the skin and core were identical (i.e., 3340, 2933, 2868-2871, 1717, 1623, 1570, 1464, 1349, 1254, and 1108 cm$^{-1}$). As evidenced with Runs 1 and 5 of Table 6, sheet thickness could be easily controlled using this method by changing the gap between the Plexiglass® plates.

The foam sheets, while flexible, were stiffer than the free rising foams, and, because of the skin surfaces, tended toward higher densities. The foam sheet structure appeared to allow for less HDI to maintain strength than needed in free rising foams (i.e., about 55 eq. % versus about 65 eq. % of total anhydrous hydroxyl and amine groups, respectively). The Jeffamine® ED900/HDI mole ratio operational range, approximately 0.17-0.50 for free-rising foams (see above), applied to these foam sheets as well. As evidenced by Runs 2 and 8 of Table 6, as with the free rising foams, too much HDI in the formulation will undermine the water dispersibility of the foam sheets. In terms of equivalents isocyanate groups, the recommended HDI level in foam sheet formulations is about <60 eq. % of total anhydrous hydroxyl and amine groups. As evidenced by Runs 1 and 2 of Table 6, PEG may not be as critical to achieving water dispersibility with foam sheets as it is with free rising foam.

Foam/Tissue Composites

Figure 11:
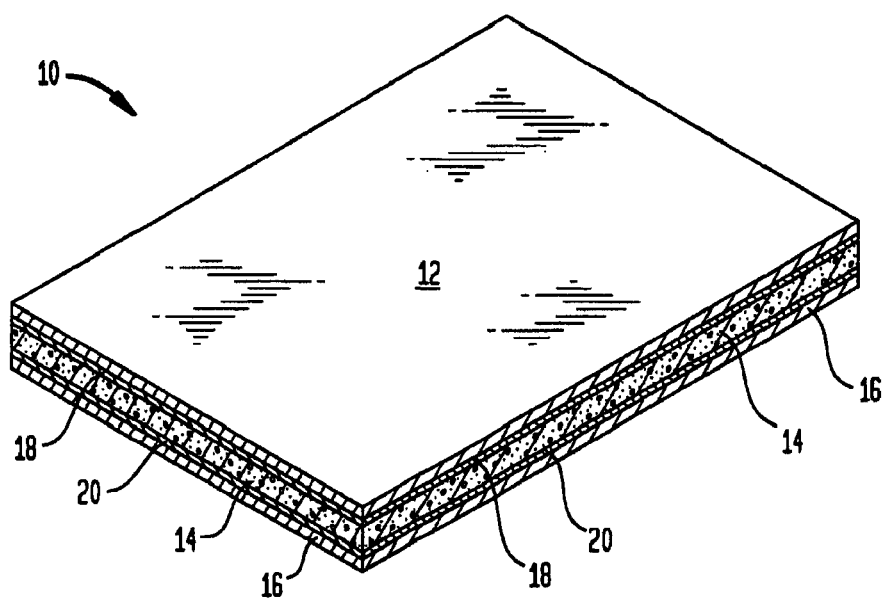
FIG. 11 is a schematic diagram of a composite article of the invention.

Foams of the present invention are particularly suitable to produce absorbent composites useful for personal care. In this respect, there is shown in FIG. 11, a composite 10 including a first tissue ply 12, a core ply 14 formed of the cold-water dispersible foam of the present invention and another ply of tissue 16. There is optionally provided adhesive layers 18 and 20 between the tissue plies and the foam core. The adhesive layers may be selected to be operable as a sizing if so desired to impart a modicum of water resistance; while the tissue plies are predominantly hardwood Kraft fiber in one embodiment. Suitable tissue layers may be manufactured in accordance with U.S. Pat. No. 6,334,931 to Dwiggins et al., the disclosure of which is incorporated herein by reference if so desired. Generally, the composite and its various layers are cold water dispersible such that the product is flushable. Instead of a planar configuration as shown, the composite may be made in any suitable shape such as a three dimensional contoured shape inasmuch as the foam is readily moldable into a desired shape.

There is shown in FIG. 12 a composite in cross-section including absorbent layers, moisture barrier layers and a foam core. In FIG. 12, composite 22 has a top tissue layer 24, a lower tissue layer 26 as well as a water-dispersible polyurethane foam core 28. Composite structure 22 may have a moisture barrier feature at 30, 32, if so desired; the moisture barrier may be a separate layer or may be incorporated into the sheet. In many cases it is preferred to use a cellulosic sheet with moisture barrier properties; non-limiting examples of moisture barrier materials are: sizes (e.g., alkyl and alkenyl ketene dimer (AKD) technology, alkenyl succinic anhydride (ASA) technology) and wax polymer emulsion technology.

Structures employing the inventive foam as the material or a layer of material in a perineal cleaning product may suitably have a grip portion or portions, provide hand protection and are suitably constructed such that tactile signals are readily transmitted through the product; that is, one can feel the surface opposite the hand when the product is used as opposed to thicker, stiffer products where sensation is not transmitted easily. Likewise, instead of sheet products, three-dimensional structures incorporating water dispersible polyurethane foams may be provided.

Referring to FIG. 13, there is shown in perspective and section 3-D cleaning pad 40 provided with a water dispersible core 42 of polyurethane foam and two water-dispersible outer tissue sheets 44, 46 which are joined at 48, 50 to form the three-dimensional structure shown. The composite may have AKD moisture barrier at 52, 54, if so desired in order to delay decomposition of the structure upon contact with water, if so desired.

Figure 14A:
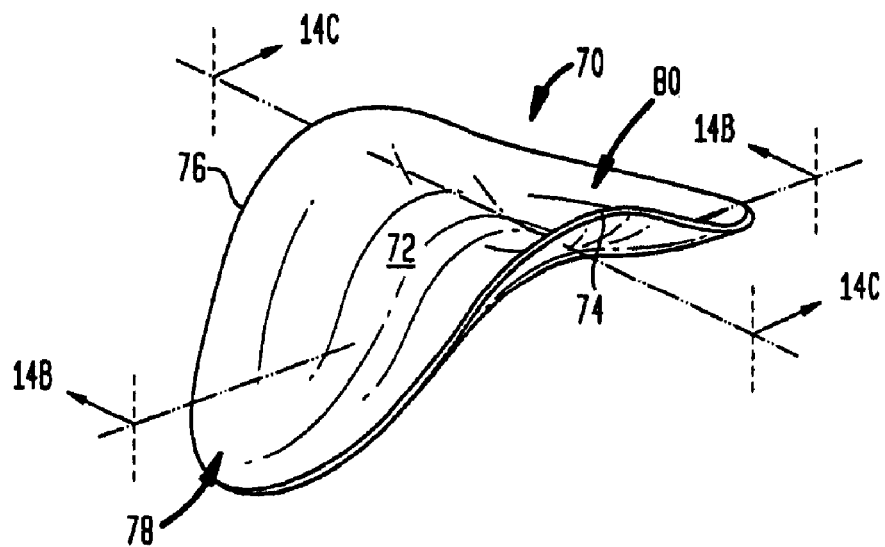
Figure 14B:
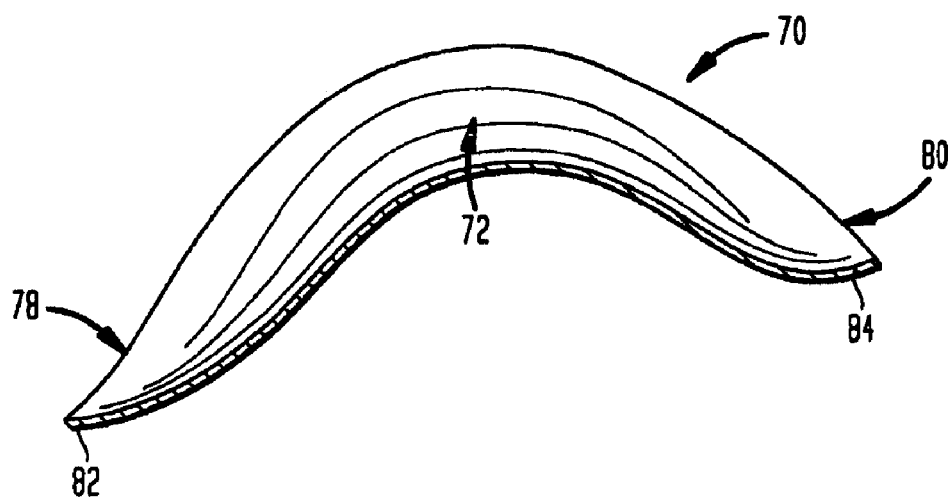
Figure 14C:
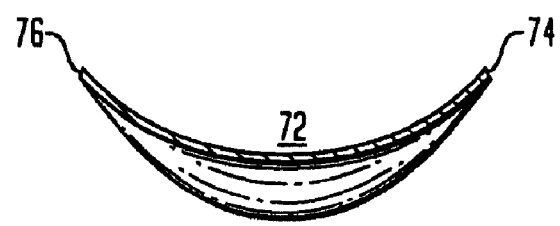

In FIGS. 14A-14C there is shown an ergonomic "saddle shape" personal care pad with inverted curvatures extending along transverse axes of the pad. That is, pad 70 is concave downwardly along section 14B-14B and convex downwardly along section 14C-14C. The saddle shape has the advantage that its containers shield the fingers and thumb of a user which may be especially useful as a perineal wiper. Wiper 70 thus has a central recessed portion 72 as well as upwardly projecting edges 74, 76 as well as longitudinal extremities 78, 80 which are provided with arcuate portions at 82, 84.

If so desired, the saddle shape structure of FIGS. 14A-14C may be provided with finger and thumb grip features as shown in FIGS. 15A through 16B.

Figure 15A:
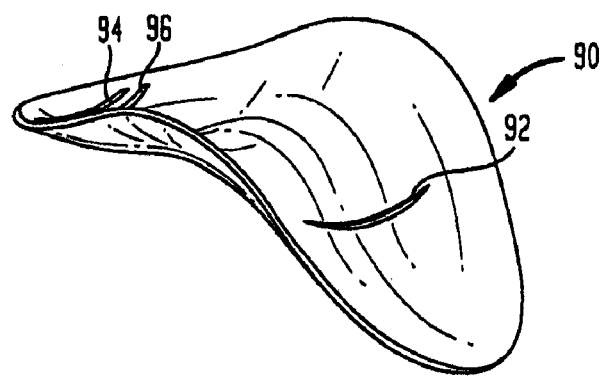
Figure 15B:
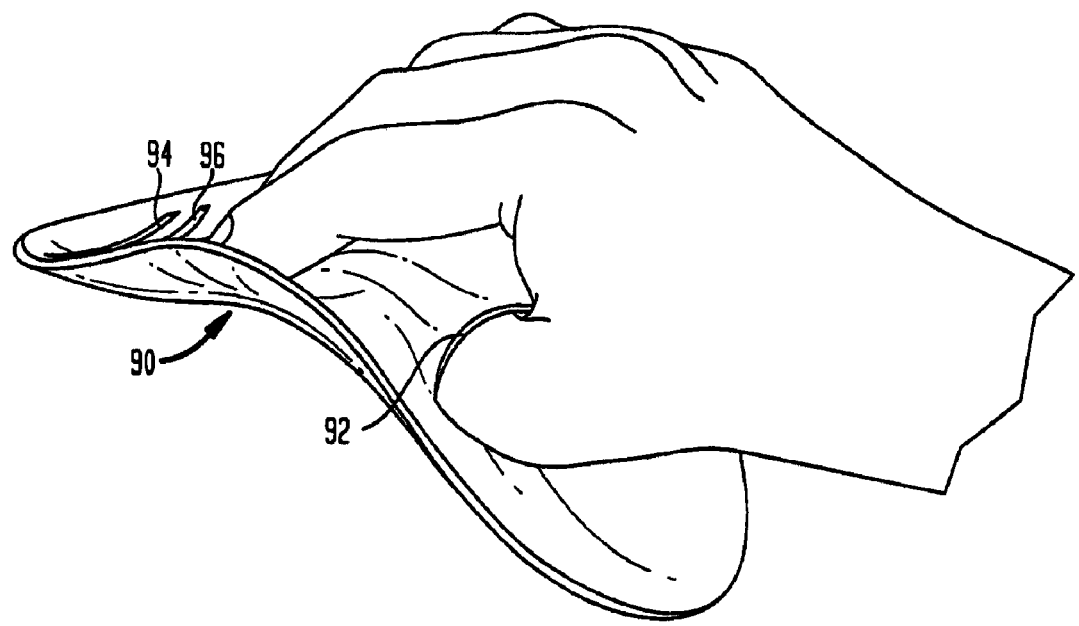
Figure 16A:
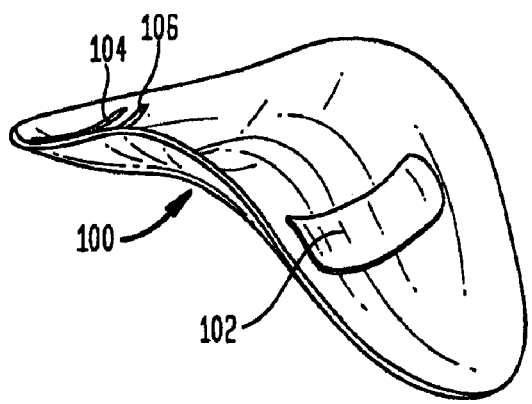
Figure 16B:
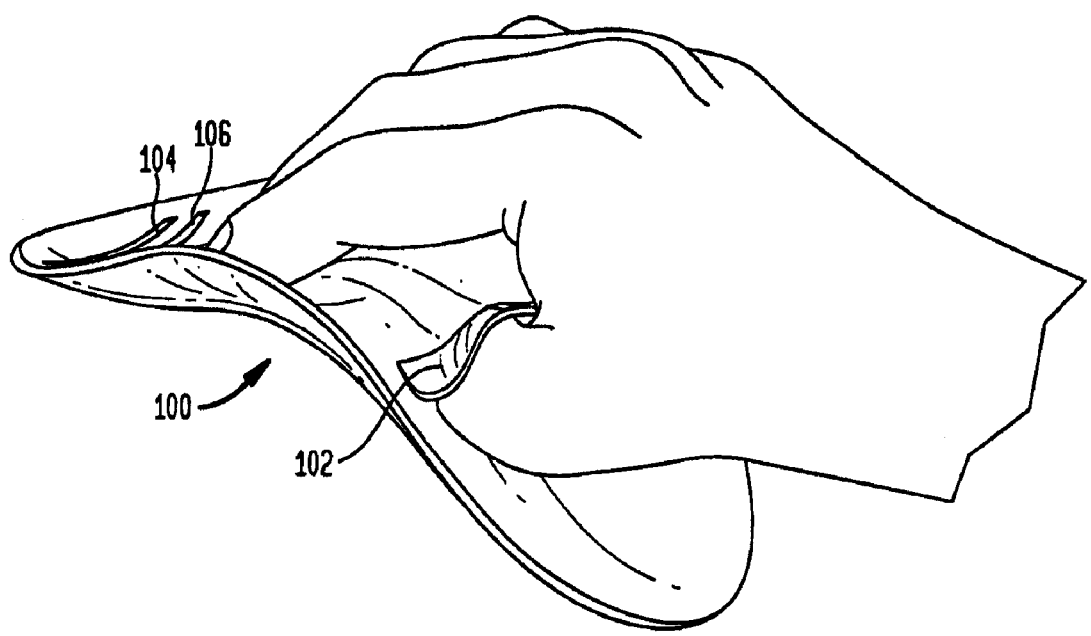
Figure 17:
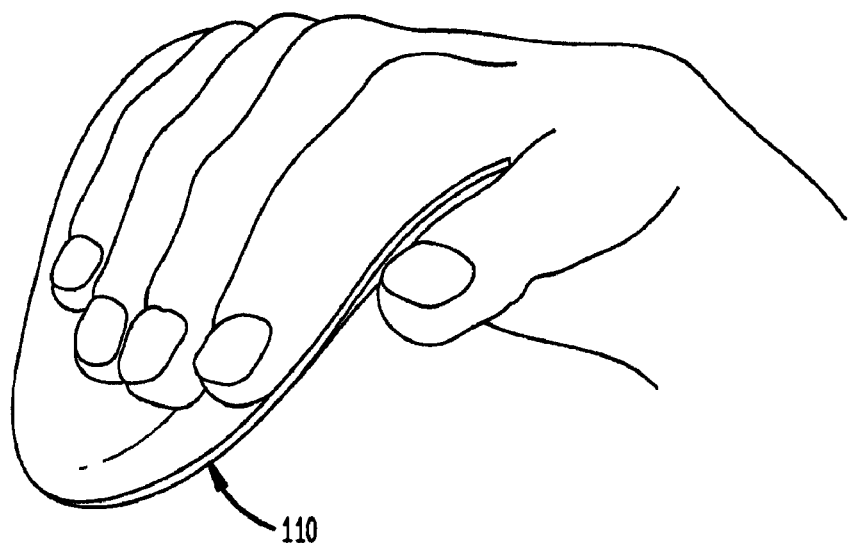

In FIGS. 15A and 15B personal care pad 90 has the saddle shape shown in FIGS. 14A-14C and additionally has a thumb slot 92 and finger grip ridges 94, 96. Similarly pad 100 of FIGS. 16A and 16B includes a flap 102 of material as well as finger grip ridges 104, 105 to accommodate the hand of a user as shown in the diagrams.

a. The "saddle" shape also included a "half" saddle as shown in FIG. 17 which shows pad 110 which may be made in the shape along section 14C of FIG. 14A. Pad 110 has many of the contour advantages of the full saddle shape discussed above and is even more easily produced.

The saddle shapes are readily stackable and nestable with adjacent pads such that they can be efficiently stacked, stored and dispersed with a minimal amount of wasted space.

The three-dimensional shapes of FIGS. 13 though 17 may have the composite structure of FIGS. 11 and 12 or have a two-layer composite structure or may be made simply of water dispersible polyurethane foam. Likewise, the sheet may be made in composite form or simply consist of a single water dispersible foam layer.

Figure 18:
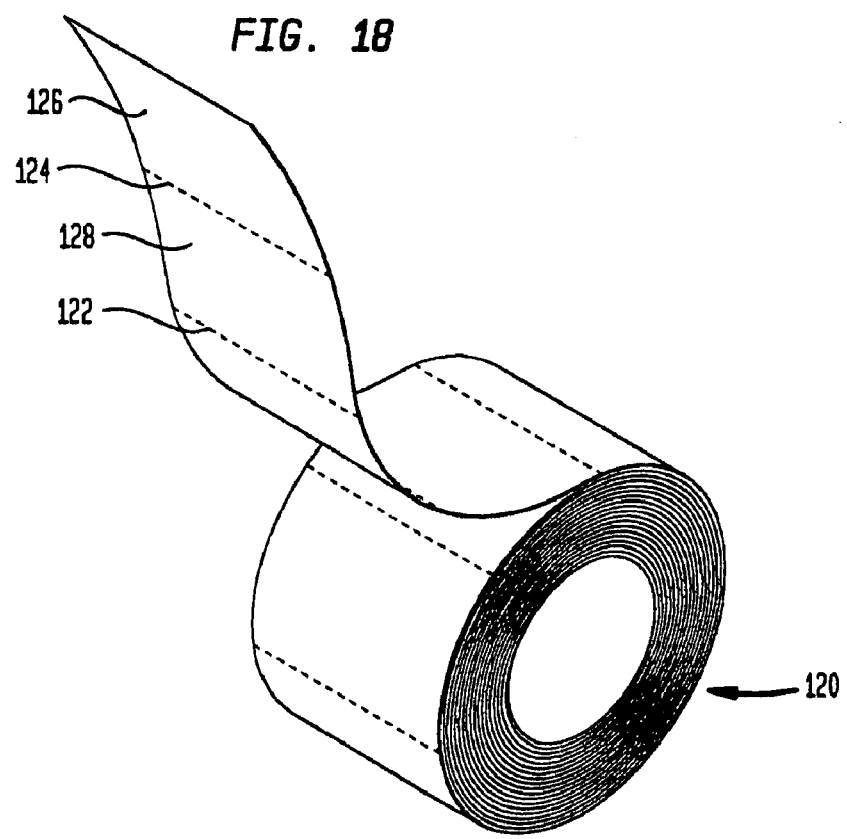
FIGS. 18-20 show various sheet product formats for dispersible polyurethane products.
Figure 19:
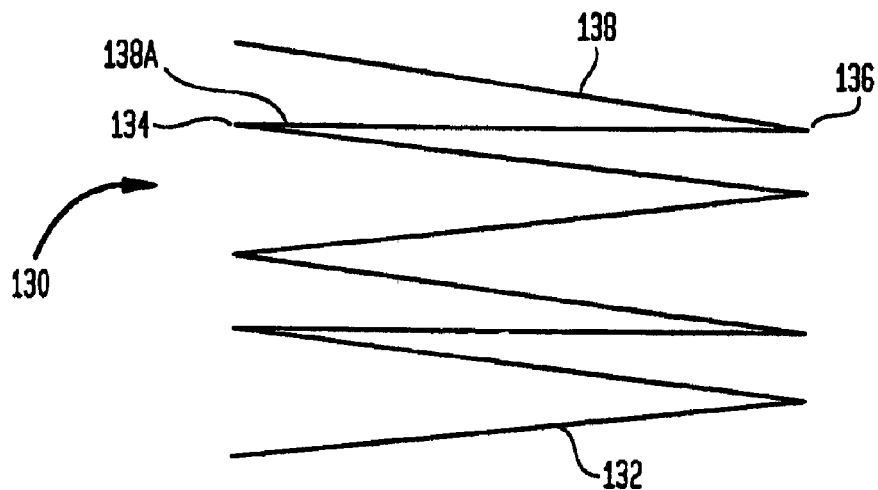
Figure 20:
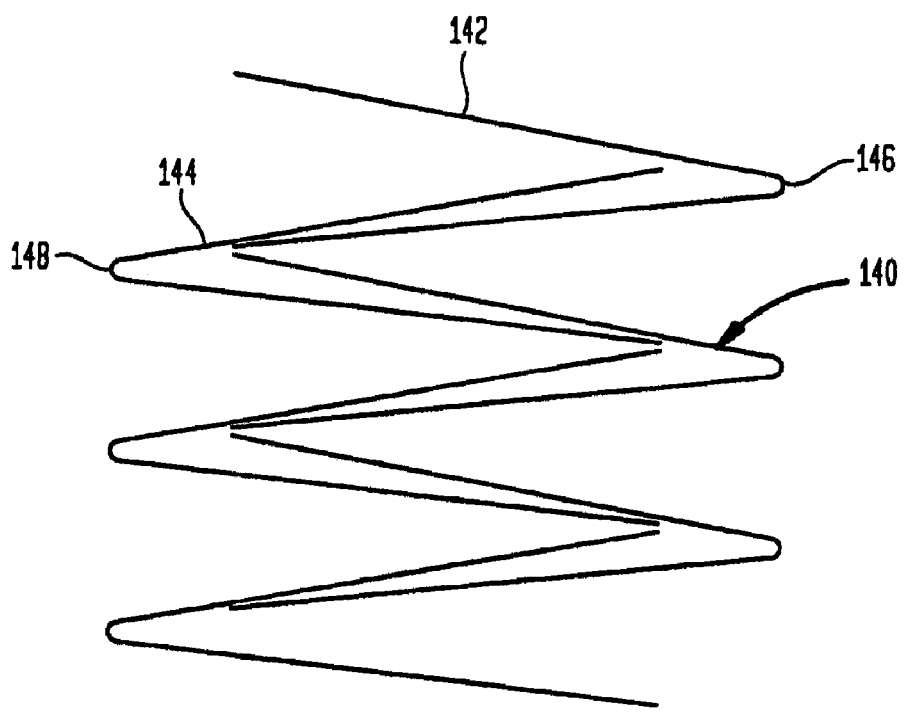

Whether of single or multilayer construction, sheet may be provided in a variety of product formats such as a web of sheets in roll format; a web of sheets in stack format; or as a stack of individual sheets such as interfolded sheets. There is shown in FIG. 18, for example, a roll 120 of a web of the sheet of the invention which includes perforations 122, 124 between separable sheets 126, 128 of the web, for example. Likewise, FIG. 19 shows a web 130 in stack format where web 132 is provided perforations at 134, 136 so that individual sheets such as sheets 138, 138A are readily separated from web 130. Alternatively, individual sheets can be provided in interfolded format as shown in FIG. 20. In FIG. 20 there is shown a stack 140 of single sheets, such as sheets 142, 144 which have a single fold at 146,148, for example.

The foregoing product formats are readily adapted to existing manufacturing, distributing and dispensing systems as are seen, for example, in U.S. Pat. Nos. 6,685,050, issued Feb. 3, 2004, entitled "Folded Sheet Product, Dispenser and Related Assembly", to Schmidt et al.; 6,684,751, issued Feb. 3, 2004, entitled "Rolled Web Dispenser and Cutting Apparatus", to Kapiloff et al.; 5,219,092, issued Jun. 15, 1993, entitled "Dispenser for Folded Paper Towels", to Morand; and 3,739,965, issued Jun. 19, 1973, entitled "Dispenser for Flexible Sheet Material and a Perforating Mechanism Adapted to be Used Therein", to Jespersen et al. The disclosures of the foregoing patents are incorporated herein by reference.

There is thus provided in accordance with the invention in its many aspects a polyurethane foam formed from the polymerized, foamed residue of a mixture of: (a) a polyether diamine; (b) a suitable diisocyanate composition; (c) a mixed saccharide composition; (d) a polyoxyalkylene glycol composition and (e) a polymerizing/foaming catalytic composition. The components (a), (b), (c) and (d) are selected, utilized in amounts and polymerized and foamed under conditions such that the foam is cold-water dispersible. The foam may consist of these components or include optional additional components which do not alter the basic and novel characteristics of the invention, that is, do not adversely impact resilience or cold water dispersibility. In cases where the foam is intended for personal care products, the foam typically exhibits a relative compression value of from 20% to 150%, such as a relative compression value of from 30% to 100% or a relative compression value of from 50% to 98%. So also, the foam exhibits a characteristic resilience of greater than 75% in most cases such as a characteristic resilience of from 80 to 100% and more typically exhibits a characteristic resilience of from 85 to 100%. In cases where more stiffness is desired, the foam is made so as to exhibit a 50% compression force of from about 0.1 kg/cm² to about 1 kg/cm² such as in the range of from about 0.25 kg/cm² to about 0.75 k/cm². The foam generally has a density of from 0.01 g/cm³ to 0.2 g/cm³ such as from 0.05 g/cm³ to 0.15 g/cm³.

The molar ratio of polyether diamine to diisocyanate is from about 0.15 to about 0.65 in the mixture in one manufacture; in many cases the molar ratio of polyether diamine to diisocyanate is from about 0.2 to about 0.4. A suitable polyether diamine is a polyethylene glycol (PEG) diamine having a molecular weight of from about 400 to about 1600. A typical molecular weight of the PEG diamine is from about 400 to about 1000. A PEG diamine may have the structure:

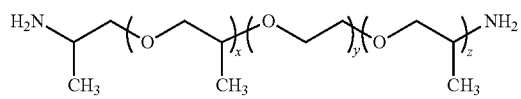

where x, y and z represent numbers in the formula, y is from about 4 to about 15 and x+z together total from about 2 to about 7.

The polyoxyalkylene glycol composition may include a polyethylene glycol with a molecular weight of 400 or more or the polyethylene glycol has a molecular weight of 600 or more. The polyethylene glycol may have a molecular weight of up to about 10,000 or so and perhaps more.

A suitable mixed saccharide composition is a corn syrup; while a typical diisocyanate is an alkylene diisocyanate such as 1,6 hexanediisocyanate. In general, the diisocyanate composition includes diisocyanate functionality in an amount of from about 50% eq. to about 80% eq. of the amount of polyol alcohol and polyether diamine functionality present in the mixture. In one embodiment, the diisocyanate composition includes diisocyanate functionality in an amount of from about 55% eq. to about 70% eq. of the amount of polyol alcohol and polyetheramine functionality present in the mixture.

The mixture may additionally include glycerol as component (f). Typical weight percents of various components in such cases are as follows: (1) polyether diamine composition is present in an amount of from about 35% by weight to about 65% by weight based on the dry weight of components (a), (c), (d) and (f) in the mixture; (ii) mixed saccharide composition is present in an amount of from about 15% by weight to about 25% by weight based on the dry weight of components (a), (c), (d) and (f) in the mixture; (iii) polyalkylene glycol composition is present in an amount of from about 10% by weight to about 30% by weight based on the dry weight of components (a), (c), (d) and (f) in the mixture; and (iv) glycerol composition is present in amount of from about 5% by weight to about 15% by weight based on the dry weight of components (a), (c), (d) and (f) in the mixture.

The polyurethane foam may be produced in the form of a sheet with or without the inclusion of a polyoxyalkylene diol in the composition if so desired.

Another aspect of the invention is a polyurethane foam composition comprising or consisting essentially of the polymerized, foamed residue of a mixture of: (a) a polyether diamine with a predominantly PEG backbone; (b) an alkylene diisocyanate composition; (c) corn syrup; (d) a PEG composition; and (e) glycerol; and (f) a polymerizing/foaming catalytic composition, wherein components (a), (b), (c), (d), (e) and (f) are selected, utilized in amounts and polymerized and foamed under conditions such that the polyurethane foam is cold-water dispersible, exhibits a relative compression value of from 20% to 150% and a characteristic resilience value of greater than 75%.

Still yet another aspect of the invention is a polyurethane foam composition comprising or consisting essentially of the polymerized, foamed residue of a mixture of: (a) a suitable diamine, preferably a flexible, linear or branched, aliphatic or heteroaliphatic diamine which allows dispersibility; (b) an alkylene diisocyanate composition; (c) corn syrup; (d) a PEG composition; and (e) glycerol, as well as a catalytic composition, wherein components (a), (b), (c), (d) and (e) and the catalytic composition are selected, utilized in amounts and polymerized and foamed under conditions such that the polyurethane foam is cold-water dispersible, exhibits a relative compression value of from 20% to 150% and a characteristic resilience value of greater than 75%. Suitable diamines may be aliphatic or heteroaliphatic or other functionalized structures which do not adversely impact the basic and novel characteristics of the invention.

A method of making the water dispersible, polyurethane foam includes or consists essentially of: (a) preparing a mixture of (i) a polyether diamine, (ii) a suitable diisocyanate composition, (iii) a mixed saccharide composition, (iv) a polyoxyalkylene glycol composition, (v) water and (vi) a polymerizing/foaming catalytic composition; and (b) concurrently polymerizing and foaming the mixture at a temperature above about 30° C. to produce a polyurethane foam, wherein the temperature is controlled and components (i), (ii), (iii), (iv), (v) and (vi) are selected, utilized in amounts, polymerized and foamed under conditions such that the foam is cold-water dispersible and has a density of less than 0.2 g/cm3. The catalytic composition may include a mixture of a metallic salt of an organic acid and an amine catalyst, for example a tertiary amine or a diazo catalyst wherein the metallic salt is selected from tin salts, bismuth salts and zinc salts. An exemplary composition is stannous octoate and triethylenediamine and another exemplary composition is a bismuth-neodecanoate/triethylenediamine combination. Alternatively, the catalytic composition comprises an organometallic catalyst such as dibutyltindilaurate with or without an amine catalyst such as a tertiary amine catalyst.

In general, polymerizing and foaming the mixture is initiated at a temperature of at least about 40° C. or at a temperature of at least about 50° C. in order to provide sufficient heat. It has been found that a starting temperature of about 60° C. is suitable.

In one application, there is provided a water dispersible composite sheet comprising at least one cellulosic ply and attached thereto a water dispersible polyurethane foam ply, wherein the cellulosic ply and the polyurethane foam ply and other components are selected such that the composite is cold-water dispersible, the cellulosic ply is cold-water dispersible and the polyurethane foam ply is cold-water dispersible. The composite may further include a second cellulosic ply attached to the foam ply such that the foam ply defines a core layer, and wherein the second cellulosic ply is cold-water dispersible. In typical embodiments, the composite has a basis weight of from about 5 (8 gsm) to about 40 (65 gsm), 50 (81 gsm) or 60 lbs/3000 square feet (98 gsm) such as a basis weight of from about 7.5 (12 gsm) to about 20 lbs/3000 square feet (33 gsm) or a basis weight of from about 9 (15 gsm) to about 15 lbs/3000 square feet (24 gsm). The cellulosic ply may be a tissue ply formed predominantly of hardwood Kraft fiber based on the fiber weight.

While the invention has been described in connection with numerous examples, modifications to those examples within the spirit and scope of the invention will be readily apparent to those of skill in the art. In view of the foregoing discussion, relevant knowledge in the art and references including copending applications discussed above in connection with the Background and Detailed Description, the disclosures of which are all incorporated herein by reference, further description is deemed unnecessary.

What is claimed is:

1. A method of making a water dispersible, polyurethane foamed shaped article comprising:
   (a) preparing a mixture of (i) a polyether diamine, (ii) a diisocyanate composition, (iii) a mixed saccharide composition, (iv) a polyoxyalkylene glycol composition, (v) water and (vi) a polymerizing/foaming catalytic composition; and
   (b) concurrently polymerizing and foaming the mixture at a temperature above about 30° C. while constraining and shaping foam development to produce a polyurethane foam shaped article;
   wherein the temperature is controlled and components (i), (ii), (iii), (iv) and (v) are selected, utilized in amounts, polymerized and foamed under conditions such that the foamed shaped article is cold water dispersible.

2. The method of making the shaped article according to claim 1, wherein the article is provided with a grip suitable for grasping by a user.

3. The method of making the shaped article according to claim 1, wherein the article of manufacture has a three-dimensional saddle like shape.

4. The method of making the shaped article according to claim 1, wherein the article is configured as a web of separable sheets in a roll format.

5. The method of making the shaped article according to claim 1, wherein the article is configured as a web of separable sheets in a stack format.

6. The method of making the shaped article according to claim 1, wherein the article is configured as a sheet incorporated into a stack of interfolded sheets.

7. A water dispersible composite sheet comprising at least one cellulosic ply and attached thereto a water dispersible polyurethane foam ply, wherein the cellulosic ply and the polyurethane foam ply are selected such that the cellulosic ply is cold water dispersible and the polyurethane foam ply is cold water dispersible and wherein the cold water dispersible polyurethane foam ply is formed of the polymerized, foamed residue of a mixture of (i) a polyether diamine, (ii) a diisocyanate composition, (iii) a mixed saccharide composition and (iv) a polyoxyalkylene glycol composition.

8. The composite sheet according to claim 7, configured as a web of separable sheets in a roll format.

9. The composite sheet according to claim 7, configured as a web of separable sheets in a stack format.

10. The composite sheet according to claim 7, configured as a sheet incorporated into a stack of interfolded sheets.

11. The water dispersible composite according to claim 7, further comprising a second cellulosic ply attached to the foam ply such that the foam ply defines a core layer, and wherein the second cellulosic ply is cold water dispersible.

12. The composite sheet according to claim 11, configured as a web of separable sheets in a roll format.

13. The composite sheet according to claim 11, configured as a web of separable sheets in a stack format.

14. The composite sheet according to claim 11, configured as a sheet incorporated into a stack of interfolded sheets.

15. The composite sheet according to claim 7, wherein the composite has a basis weight of from about 5 to about 60 lbs/3000 square feet (about 8 to about 98 grams per square meter).

16. The composite sheet according to claim 7, wherein the composite has a basis weight of from about 5 to about 50 lbs/3000 square feet (about 8 to about 81 grams per square meter).

17. The composite sheet according to claim 7, wherein the composite has a basis weight of from about 5 to about 40 lbs/3000 square feet (about 8 to about 65 grams per square meter).

18. The composite sheet according to claim 7, wherein the composite has a basis weight of from about 7.5 to about 20 lbs/3000 square feet (about 12 to about 33 grams per square meter).

19. The composite sheet according to claim 7, wherein the composite has a basis weight of from about 9 to about 15 lbs/3000 square feet (about 15 to about 24 grams per square meter).

20. The water dispersible composite according to claim 7, wherein the cellulosic ply is a tissue ply formed predominantly of hardwood Kraft fiber.

21. The water dispersible composite sheet according to claim 7, wherein the foam ply exhibits a relative compression value of from 20% to 150%.

22. The water dispersible composite sheet according to claim 7, wherein the foam ply exhibits a relative compression value of from 30% to 100%.

23. The water dispersible composite sheet according to claim 7, wherein the foam ply exhibits a relative compression value of from 50% to 98%.

24. The water dispersible composite sheet according to claim 7, wherein the foam ply exhibits a characteristic resilience of greater than 75%.

25. The water dispersible composite sheet according to claim 7, wherein the foam ply exhibits a characteristic resilience of from 80 to 100%.

26. The water dispersible composite sheet according to claim 7, wherein the foam ply exhibits a characteristic resilience of from 85 to 100%.

27. The water dispersible composite sheet according to claim 7, wherein the foam ply has a density of from 0.01 g/cm$^3$ to 0.2 g/cm$^3$.

28. The water dispersible composite sheet according to claim 7, wherein the foam ply has a density of from 0.05 g/cm$^3$ to 0.15 g/cm$^3$.

29. A three dimensional article of manufacture suitable as a perineal cleaning product having a three dimensional structure and at least one layer formed from a cold water dispersible polyurethane foam formed of the polymerized, foamed residue of a mixture of (i) a polyether diamine, (ii) a diisocyanate composition, (iii) a mixed saccharide composition, (iv) a polyoxyalkylene glycol composition; and (v) a polymerizing/foaming catalyst composition.

30. The three-dimensional article of manufacture according to claim 29, wherein the article of manufacture is provided with a grip suitable for grasping by a user.

31. The three-dimensional article of manufacture according to claim 29, wherein the article of manufacture has a saddle like shape.

32. The three dimensional article of manufacture according to claim 29, wherein the article of manufacture has a foam layer and a cellulosic layer.

* * * * *